US011330279B2

(12) United States Patent
Hannuksela

(10) Patent No.: US 11,330,279 B2
(45) Date of Patent: *May 10, 2022

(54) APPARATUS, A METHOD AND A COMPUTER PROGRAM FOR VIDEO CODING AND DECODING

(71) Applicant: NOKIA TECHNOLOGIES OY, Espoo (FI)

(72) Inventor: Miska Matias Hannuksela, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/679,851

(22) Filed: Nov. 11, 2019

(65) Prior Publication Data

US 2020/0077105 A1 Mar. 5, 2020

Related U.S. Application Data

(63) Continuation of application No. 14/982,558, filed on Dec. 29, 2015, now Pat. No. 10,499,068.

(Continued)

(51) Int. Cl.
*H04N 19/33* (2014.01)
*H04N 19/46* (2014.01)
(Continued)

(52) U.S. Cl.
CPC .......... *H04N 19/33* (2014.11); *H04N 19/105* (2014.11); *H04N 19/136* (2014.11);
(Continued)

(58) Field of Classification Search
CPC .. H04N 19/105; H04N 19/136; H04N 19/172; H04N 19/33; H04N 19/46; H04N 19/70
See application file for complete search history.

(56) References Cited

U.S. PATENT DOCUMENTS

| 2003/0165274 A1 | 9/2003 | Haskell et al. |
| 2007/0086521 A1 | 4/2007 | Wang et al. |

(Continued)

FOREIGN PATENT DOCUMENTS

| CN | 103026721 | 4/2013 |
| CN | 104205839 | 12/2014 |

(Continued)

OTHER PUBLICATIONS

Summons to Attend Oral Proceedings for European Application No. 15 875 349.1 dated Jun. 16, 2020, 15 pages.

(Continued)

*Primary Examiner* — Anner N Holder
(74) *Attorney, Agent, or Firm* — Alston & Bird LLP

(57) ABSTRACT

There is provided methods, apparatuses and computer program products for video coding and decoding. A first part of a first coded video representation is decoded, and information on decoding a second coded video representation is received and parsed. The coded second representation differs from the first coded video representation in chroma format, sample bit depth, color gamut and/or spatial resolution, and the information indicates if the second coded video representation may be decoded using processed decoded pictures of the first coded video representation as reference pictures. If the information indicates that the second coded video representation may be decoded using processed decoded pictures of the first coded video representation as a prediction reference, decoded picture(s) of the first part is/are processed into processed decoded picture(s) by resampling and/or sample value scaling; and decoding a second part of a second video representation using said processed decoded picture(s) as reference pictures.

30 Claims, 16 Drawing Sheets

Related U.S. Application Data

(60) Provisional application No. 62/098,919, filed on Dec. 31, 2014.

(51) Int. Cl.
  *H04N 19/105* (2014.01)
  *H04N 19/136* (2014.01)
  *H04N 19/70* (2014.01)
  *H04N 19/172* (2014.01)

(52) U.S. Cl.
  CPC ........... *H04N 19/172* (2014.11); *H04N 19/46* (2014.11); *H04N 19/70* (2014.11)

(56) References Cited

U.S. PATENT DOCUMENTS

| | | |
|---|---|---|
| 2012/0023250 A1 | 1/2012 | Chen et al. |
| 2012/0185570 A1 | 7/2012 | Bouazizi et al. |
| 2013/0272402 A1 | 10/2013 | Tu et al. |
| 2014/0119440 A1 | 5/2014 | Lee et al. |
| 2014/0211849 A1 | 7/2014 | Deshpande |
| 2014/0219346 A1 | 8/2014 | Ugur et al. |
| 2014/0301485 A1 | 10/2014 | Ramasubramonian et al. |
| 2014/0317308 A1 | 10/2014 | Zhang et al. |
| 2016/0182927 A1 | 6/2016 | Denoual et al. |
| 2016/0191957 A1 | 6/2016 | Teixeira et al. |
| 2016/0353115 A1 | 12/2016 | Samuelsson et al. |

FOREIGN PATENT DOCUMENTS

| | | |
|---|---|---|
| EP | 2723079 | 4/2014 |
| EP | 2 82 2276 A1 | 1/2015 |
| EP | 2934010 | 10/2015 |
| JP | 2004517569 | 6/2004 |
| JP | 2009512306 | 3/2009 |
| RU | 2406254 | 12/2010 |
| WO | WO 02/054776 | 7/2002 |
| WO | WO 2013/129878 | 9/2013 |
| WO | WO 2014/092515 | 6/2014 |
| WO | WO 2014/106692 | 7/2014 |

OTHER PUBLICATIONS

Office Action for Japanese Application No. 2017-535052 dated Jun. 23, 2020, 10 pages.
Office Action for Indonesia Application No. PID 2017 04861 dated Sep. 16, 2020, 4 pages.
U.S. Appl. No. 14/982,558, filed Dec. 29, 2015, U.S. Pat. No. 10,499,068, Patented.
3rd Generation Partnership Project; Technical Specification Group Services and System Aspects; Transparent end-to and packet switched streaming service (PSS); 3GPP file format (3GP) (Release 13), 3GPP TS 26.244, V13.3.0, Dec. 2015, pp. 1-66.
Advanced Video Coding for Generic /Audiovisual services, Series H: Audiovisual and Multimedia Systems, Infrastructure of audiovisual services—Coding of moving Video, Recommendation ITU-T H.264, Feb. 2014, 790 gages.
Decision of Refusal for Japanese Application No. 2017-535052 dated Mar. 1, 2019, 2 pages.
Deshpande, "On Inter-Layer Reference Picture Set", Joint Collaborative Team on Video Coding (JCT-VC) of ITU-T 5G16 WP3 and ISO/IEC JTC1/SC29NVG11, JCTVC-00120, 15th Meeting, Oct. 23-Nov. 1, 2013, pp. 1-8.
Extended European Search Report received for corresponding European Patent Application No. 15875349.1, dated Apr. 26, 2018, 12 pages.
Farber et al., "Robust H.263 Compatible Video Transmission for Mobile Access to Video Servers", Proceedings of International Conference on Image Processing, vol. 2, 1997, pp. 73-76.
Gellens et al., "The 'Codecs' and 'Profiles' Parameters for "Bucket" Media Types", RFC 6381, Qualcomm Inc., Aug. 2011, pp. 1-19.
High Efficiency Video Coding, Series 1-1: Audiovisual and Multimedia Systems, Infrastucture of audiovisual services—Coding of moving video, Recommendation ITU-T H.265, Oct. 2014, 540 pages.
Information Technology—Coding of Audio-Visual Objects—Part 12: ISO Base Media File Format, ISO/IEC 14496-12, Third edition, Oct. 15, 2008, 120 pages.
Information Technology—Coding of Audio-Visual Objects—Part 14: MP4 File Format, ISO/IEC 14496-14, First addition, Nov. 15, 2003, 18 pages.
Information Technology—Coding of Audio-Visual Objects—Part 15: Advanced Video Coding (AVC) file format, ISO/ EC 14496-15, First edition, Apr. 15, 2004, 29 pages.
Information technology—Dynamic adaptive streaming over HTTP (DASH)—Part 1: Media presentation description and segment formats, ISOIIEC FDIS 23009-1:2013(E), Aug. 2, 2013, 150 pages.
International Search Report and Written Opinion received for corresponding Patent Cooperation Treaty Application No. PCT/IB2015/060036, dated May 18, 2016, 16 pages.
Karczewicz et al., "The SP- and SI-Frames Design for H.264/AVC", IEEE Transactions on Circuits and Systems or Video Technology, vol. 13, No. 7, Jul. 2003, pp. 637-644.
Lee et al., "Uniform Resource Identifier (URI): Generic Syntax", RFC 3986, Adobe Systems, Jan. 2005, pp. 1-55.
Moats, "URN Syntax", RFC 2141, AT&T, May 1997, pp. 1-10.
Notice of Allowance for U.S. Appl. No. 14/982,558 dated Jul. 5, 2019.
Office Action for European Application No. 15 875 349.1 dated Jul. 29, 2019, 5 pages.
Office Action for Mexican Application No. MX/a/2017/008774 dated Jul. 25, 2019, 5 pages.
Office Action for Russian Application No. 2017125451/08 dated Aug. 31, 2018, 15 pages.
Office Action for U.S. Appl. No. 14/982,558 dated Feb. 5, 2019.
Office Action for U.S. Appl. No. 14/982,558 dated Jun. 28, 2018.
Office action received for corresponding Canadian Patent Application No. 2972332, dated Jan. 22, 2018, 4.
Office Action received for corresponding Japanese Patent Application No. 2017-535052, dated Jun. 26, 2018, 4 pages.
Pantos et al., "HTTP Live Streaming Draft-Pantos-Http-Live-Streaming-13", Informational Internet-Draft, Apple Inc., Apr. 16, 2014, pp. 1-37.
Parameter Values for the HDTV Standards for Production and International Programme Exchange, Recommendation TU-R BT 709-6, Jun. 2015, 19 pages.
Parameter Values for Ultra-High Definition Television Systems for Production and International Programme xchange, Recommendation ITU-R BT.2020-1, Jun. 2014, 8 pages.
Samuelsson et al., "SHVC Skip Pictures", Joint Collaborative Team on Video Coding (JCT-VC) of ITU-T SG 16 W' 3 and ISOIIEC JTC 1/SC 291WG 11, JCIVC-00199, 15th meeting, Oct. 23-Nov. 1, 2013, pp. 1-5.
U.S. Appl. No. 62/017,072, filed Jun. 25, 2014; In re: Hannuksela, entitled an Apparatus, A Method and a Computer Program for Video Coding and Decoding.
Ugur et al., "Scalable HEVC (SHVC) for DASH", ISO/IEC JTC1/SC291WG11, Mar. 28, 2014.
Yan et al., "Seamless Switching of H.265/HEVC-Coded Dash Representations With Open GOP Prediction Structure", EEE International Conference on Image Processing, Sep. 27-30, 2015, pp. 4121-4125.
Office Action for Indonesia Application No. PID 2017 04861 dated Aug. 21, 2019, 4 pages.
Office Action for Russian Application No. 2017125451/08 dated Nov. 27, 2019, 12 pages.
Office Action for Korean Application No. 2017-7021515 dated Dec. 19, 2019, 12 pages.
Office Action for Chinese Patent Application No. 201580077308.9 dated Dec. 15, 2020, with English translation, 18 pages.
Office Action for Chinese Patent Application No. 201580077308.9 dated Jul. 13, 2021, 6 pages.
Office Action for Chinese Patent Application No. 201580077308.9 dated Sep. 24, 2019, 22 pages.

(56) References Cited

OTHER PUBLICATIONS

Decision to Grant for Russian Patent Application No. 2017125451/08 dated Feb. 19, 2021, 38 pages.
Notice of Allowance for Indonesian Patent Application No. PID201704861 dated Nov. 9, 2020, 4 pages.

APPARATUS, A METHOD AND A COMPUTER PROGRAM FOR VIDEO CODING AND DECODING

CROSS-REFERENCE TO RELATED APPLICATIONS

This application is a continuation of U.S. application Ser. No. 14/982,558, filed Dec. 29, 2015, which claims priority to U.S. Provisional Application No. 62/098,919, filed Dec. 31, 2014, the entire contents of which are incorporated herein by reference.

TECHNICAL FIELD

The present invention relates to an apparatus, a method and a computer program for video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Scalable video coding refers to coding structure where one bitstream can contain multiple representations of the content at different bitrates, resolutions or frame rates. In these cases the receiver can extract the desired representation depending on its characteristics. Alternatively, a server or a network element can extract the portions of the bitstream to be transmitted to the receiver depending on e.g. the network characteristics or processing capabilities of the receiver. A scalable bitstream typically consists of a base layer providing the lowest quality video available and one or more enhancement layers that enhance the video quality when received and decoded together with the lower layers. In order to improve coding efficiency for the enhancement layers, the coded representation of that layer typically depends on the lower layers.

In order to support a client switching between different qualities and resolutions during a streaming session, encoded random access point pictures at the segment boundaries may be utilized. Conventionally, only instantaneous random access point (RAP) pictures, like the instantaneous decoding refresh (IDR) picture, that start a so-called closed group of pictures (GOP) prediction structure have been used at segment boundaries of dynamic adaptive streaming over HTTP (DASH) representations. The use of intra pictures starting open GOPs, e.g. clean random access (CRA) pictures in H.265/HEVC, has been improved in H.265/HEVC when compared to older standards, as a decoding process starting from a CRA picture has been normatively specified. When the decoding starts from a CRA picture, some pictures, referred to random access skipped leading (RASL) pictures, following the CRA picture in decoding order but preceding the CRA picture in output order may not be decodable. Consequently, if open GOPs were used at segment boundaries in DASH, representation switching might result into the inability to decode the RASL pictures and hence a picture rate glitch in the playback. For example, if a prediction hierarchy of 8 pictures were used and the picture rate were 25 Hz, the video would be frozen for about one third of a second.

SUMMARY

Now in order to at least alleviate the above problems, methods for encoding and decoding skip pictures are introduced herein.

A method according to a first embodiment comprises
decoding a first part of a first coded video representation;
receiving and parsing information on decoding a second coded video representation,
wherein the coded second representation differs from the first coded video representation in one or more of the following: chroma format, sample bit depth, color gamut, spatial resolution, and the information indicates if the second coded video representation may be decoded using processed decoded pictures of the first coded video representation as reference pictures that may be used for prediction;
provided that the information indicates that the second coded video representation may be decoded using processed decoded pictures of the first coded video representation as a reference for prediction, the method further comprises:
processing one or more decoded pictures of the first part into one or more processed decoded pictures, wherein the processing comprises one or both of resampling and sample value scaling; and
decoding a second part of a second video representation using said one or more processed decoded pictures as reference pictures that may be used for prediction.

An apparatus according to a second embodiment comprises:
at least one processor and at least one memory, said at least one memory stored with code thereon, which when executed by said at least one processor, causes an apparatus to perform at least
decode a first part of a first coded video representation;
receive and parse information on decoding a second coded video representation,
wherein the coded second representation differs from the first coded video representation in one or more of the following: chroma format, sample bit depth, color gamut, spatial resolution, and the information indicates if the second coded video representation may be decoded using processed decoded pictures of the first coded video representation as reference pictures that may be used for prediction;
provided that the information indicates that the second coded video representation may be decoded using processed decoded pictures of the first coded video representation as a reference for prediction, said code, which when executed by said at least one processor, further causes the apparatus to perform at least:
process one or more decoded pictures of the first part into one or more processed decoded pictures, wherein the processing comprises one or both of resampling and sample value scaling; and
decode a second part of a second video representation using said one or more processed decoded pictures as reference pictures that may be used for prediction.

According to a third embodiment there is provided a computer readable storage medium stored with code thereon for use by an apparatus, which when executed by a processor, causes the apparatus to perform:
decode a first part of a first coded video representation;
receive and parse information on decoding a second coded video representation,
wherein the coded second representation differs from the first coded video representation in one or more of the following: chroma format, sample bit depth, color gamut, spatial resolution, and the information indicates if the second coded video representation may be decoded using processed decoded pictures of the first coded video representation as reference pictures that may be used for prediction;

provided that the information indicates that the second coded video representation may be decoded using processed decoded pictures of the first coded video representation as a reference for prediction, said code, which when executed by said at least one processor, further causes the apparatus to perform at least:

process one or more decoded pictures of the first part into one or more processed decoded pictures, wherein the processing comprises one or both of resampling and sample value scaling; and decode a second part of a second video representation using said one or more processed decoded pictures as reference pictures that may be used for prediction.

According to a fourth embodiment there is provided an apparatus comprising a video decoder configured for decoding a bitstream comprising an image sequence, the video decoder comprising means for decoding a first part of a first coded video representation;

means for receiving and parsing information on decoding a second coded video representation, wherein the coded second representation differs from the first coded video representation in one or more of the following: chroma format, sample bit depth, color gamut, spatial resolution, and the information indicates if the second coded video representation may be decoded using processed decoded pictures of the first coded video representation as reference pictures that may be used for prediction; wherein the apparatus further comprises:

means for processing one or more decoded pictures of the first part into one or more processed decoded pictures, provided that the information indicates that the second coded video representation may be decoded using processed decoded pictures of the first coded video representation as a reference for prediction, wherein the processing comprises one or both of resampling and sample value scaling; and means for decoding a second part of a second video representation using said one or more processed decoded pictures as reference pictures that may be used for prediction.

According to a fifth embodiment there is provided a video decoder configured for decoding a bitstream comprising an image sequence, wherein said video decoder is further configured for:

decoding a first part of a first coded video representation;

receiving and parsing information on decoding a second coded video representation, wherein the coded second representation differs from the first coded video representation in one or more of the following: chroma format, sample bit depth, color gamut, spatial resolution, and the information indicates if the second coded video representation may be decoded using processed decoded pictures of the first coded video representation as reference pictures that may be used for prediction;

provided that the information indicates that the second coded video representation may be decoded using processed decoded pictures of the first coded video representation as a reference for prediction, the method further comprises:

processing one or more decoded pictures of the first part into one or more processed decoded pictures, wherein the processing comprises one or both of resampling and sample value scaling; and decoding a second part of a second video representation using said one or more processed decoded pictures as reference pictures that may be used for prediction.

A method according to a sixth embodiment comprises parsing, from a media presentation description, metadata for at least two representations;

parsing, from the media presentation description, one or more characteristics for decoding a sequence of non-overlapping consecutive segments or subsegments of the at least two representations.

An apparatus according to a seventh embodiment comprises:

at least one processor and at least one memory, said at least one memory stored with code thereon, which when executed by said at least one processor, causes an apparatus to perform at least:

parse, from a media presentation description, metadata for at least two representations;

parse, from the media presentation description, one or more characteristics for decoding a sequence of non-overlapping consecutive segments or subsegments of the at least two representations.

According to an eighth embodiment there is provided a computer readable storage medium stored with code thereon for use by an apparatus, which when executed by a processor, causes the apparatus to perform:

parse, from a media presentation description, metadata for at least two representations;

parse, from the media presentation description, one or more characteristics for decoding a sequence of non-overlapping consecutive segments or subsegments of the at least two representations.

According to a ninth embodiment there is provided an apparatus comprising a video encoder configured for decoding a bitstream comprising an image sequence, the video encoder comprising means for parsing, from a media presentation description, metadata for at least two representations;

means for parsing, from the media presentation description, one or more characteristics for decoding a sequence of non-overlapping consecutive segments or subsegments of the at least two representations.

According to a tenth embodiment there is provided a video encoder configured for decoding a bitstream comprising an image sequence, wherein said video encoder is further configured for:

parsing, from a media presentation description, metadata for at least two representations;

parsing, from the media presentation description, one or more characteristics for decoding a sequence of non-overlapping consecutive segments or subsegments of the at least two representations.

A method according to an eleventh embodiment comprises:

providing, in a media presentation description, metadata for at least two representations;

providing, in the media presentation description, one or more characteristics for decoding a sequence of non-overlapping consecutive segments or subsegments of the at least two representations.

An apparatus according to a twelfth embodiment comprises:

at least one processor and at least one memory, said at least one memory stored with code thereon, which when executed by said at least one processor, causes an apparatus to perform at least:

provide, in a media presentation description, metadata for at least two representations;

provide, in the media presentation description, one or more characteristics for decoding a sequence of non-overlapping consecutive segments or subsegments of the at least two representations.

According to a thirteenth embodiment there is provided a computer readable storage medium stored with code thereon for use by an apparatus, which when executed by a processor, causes the apparatus to perform:

provide, in a media presentation description, metadata for at least two representations;

provide, in the media presentation description, one or more characteristics for decoding a sequence of non-overlapping consecutive segments or subsegments of the at least two representations.

According to a fourteenth embodiment there is provided an apparatus comprising a video encoder configured for encoding a bitstream comprising an image sequence, the video encoder comprising means for providing, in a media presentation description, metadata for at least two representations;

means for provide, in the media presentation description, one or more characteristics for decoding a sequence of non-overlapping consecutive segments or subsegments of the at least two representations.

According to a fifteenth embodiment there is provided a video encoder configured for decoding a bitstream comprising an image sequence, wherein said video encoder is further configured for:

providing, in a media presentation description, metadata for at least two representations;

providing, in the media presentation description, one or more characteristics for decoding a sequence of non-overlapping consecutive segments or subsegments of the at least two representations.

A method according to a sixteenth embodiment comprises receiving a bitstream comprising picture data units as a first representation;

determining to discontinue transmission of the first representation at a first switching point;

transmitting picture data units on the first representation up to the first switching point, said picture data units including at least one data unit suitable for using as a reference for prediction when decoding a second part of a second video representation after said first switching point.

According to a seventeenth embodiment there is provided an apparatus comprising:

at least one processor and at least one memory, said at least one memory stored with code thereon, which when executed by said at least one processor, causes an apparatus to perform at least:

receive a bitstream comprising picture data units as a first representation;

determine to discontinue transmission of the first representation at a first switching point;

transmit picture data units on the first representation up to the first switching point, said picture data units including at least one data unit suitable for using as a reference for prediction when decoding a second part of a second video representation after said first switching point.

According to an eighteenth embodiment there is provided a computer readable storage medium stored with code thereon for use by an apparatus, which when executed by a processor, causes the apparatus to perform:

receive a bitstream comprising picture data units as a first representation;

determine to discontinue transmission of the first representation at a first switching point;

transmit picture data units on the first representation up to the first switching point, said picture data units including at least one data unit suitable for using as a reference for prediction when decoding a second part of a second video representation after said first switching point.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 2:
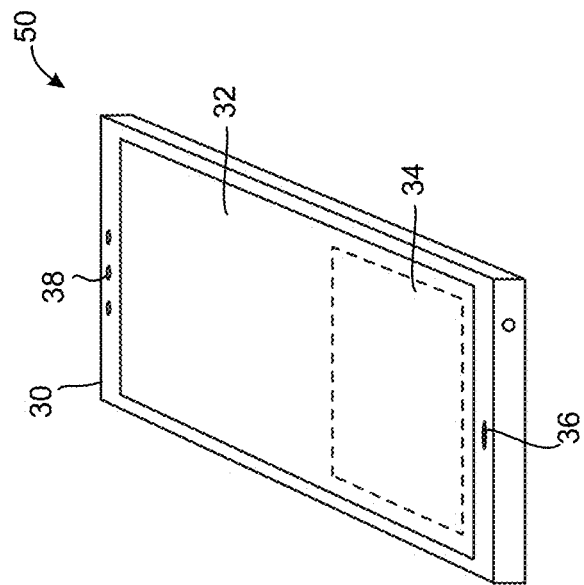
FIG. 2 shows schematically a user equipment suitable for employing embodiments of the invention.
Figure 1:
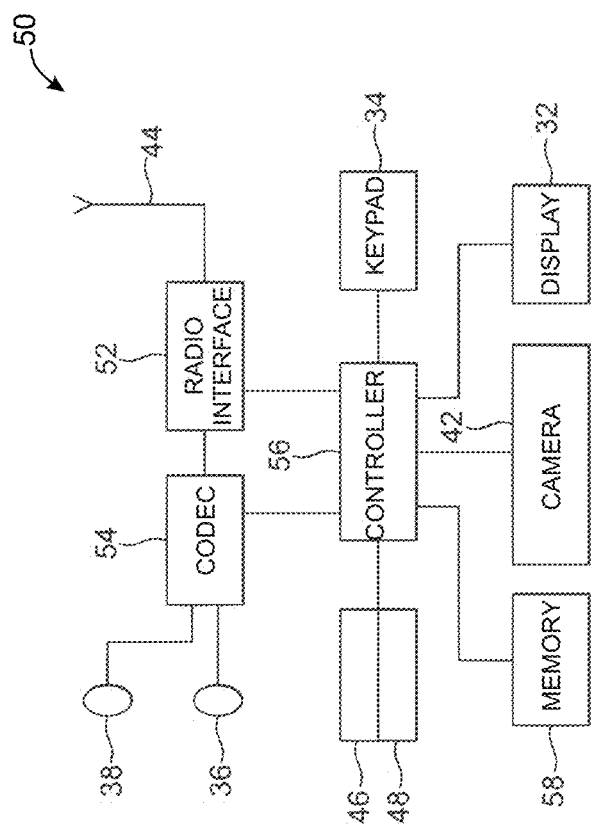
FIG. 1 shows schematically an electronic device employing embodiments of the invention.

The following describes in further detail suitable apparatus and possible mechanisms for switching between heterogeneous video representations in e.g. adaptive streaming over HTTP. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding.

Figure 3:
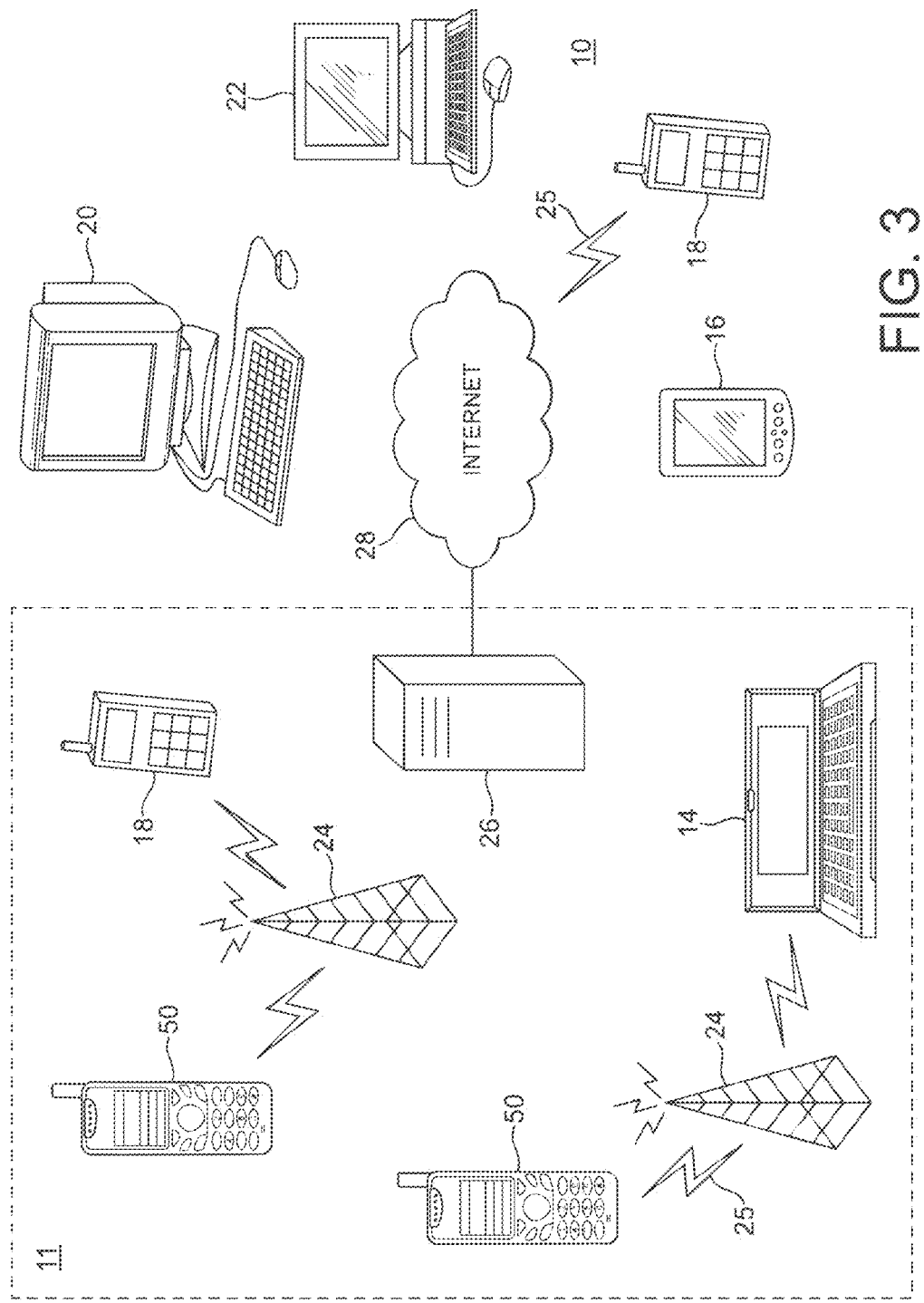
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
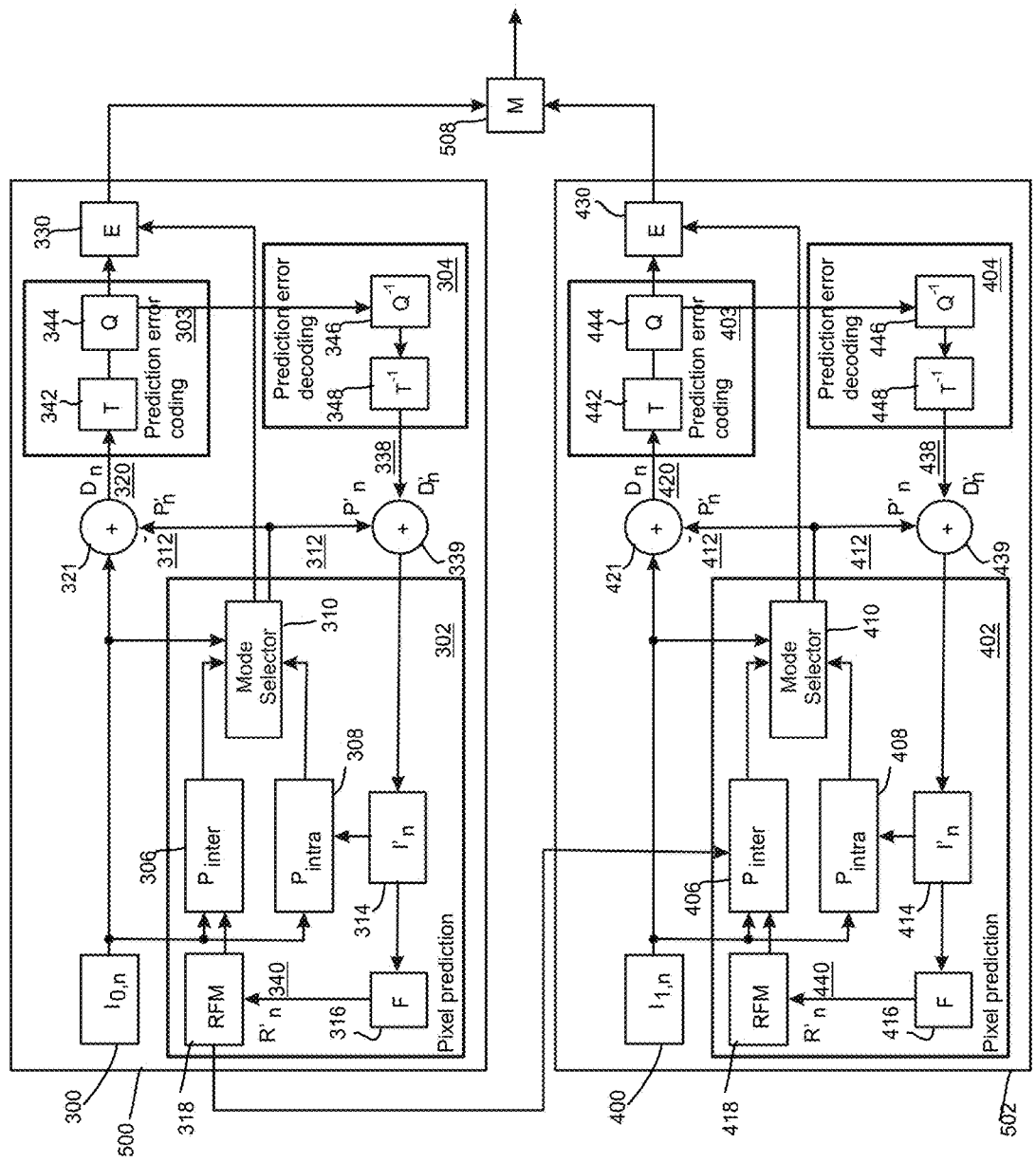
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The Advanced Video Coding (H.264/AVC a.k.a. AVC) standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team—Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Version 2 of H.265/HEVC included scalable, multiview, and fidelity range extensions, which may be abbreviated SHVC, MV-HEVC, and REXT, respectively. Version 2 of H.265/HEVC was pre-published as ITU-T Recommendation H.265 (October 2014) and is likely to be published as Edition 2 of ISO/IEC 23008-2 in 2015. There are currently ongoing standardization projects to develop further extensions to H.265/HEVC, including three-dimensional and screen content coding extensions, which may be abbreviated 3D-HEVC and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order. In the description of existing standards as well as in the description of example embodiments, a phrase "by external means" or "through external means" may be used. For example, an entity, such as a syntax structure or a value of a variable used in the decoding process, may be provided "by external means" to the decoding process. The phrase "by external means" may indicate that the entity is not included in the bitstream created by the encoder, but rather conveyed externally from the bitstream for example using a control protocol. It may alternatively or additionally mean that the entity is not created by the encoder, but may be created for example in the player or decoding control logic or alike that is using the decoder. The decoder may have an interface for inputting the external means, such as variable values.

A profile may be defined as a subset of the entire bitstream syntax that is specified by a decoding/coding standard or specification. Within the bounds imposed by the syntax of a given profile it is still possible to require a very large variation in the performance of encoders and decoders depending upon the values taken by syntax elements in the bitstream such as the specified size of the decoded pictures. In many applications, it might be neither practical nor economic to implement a decoder capable of dealing with all hypothetical uses of the syntax within a particular profile. In order to deal with this issue, levels may be used. A level may be defined as a specified set of constraints imposed on values of the syntax elements in the bitstream and variables specified in a decoding/coding standard or specification. These constraints may be simple limits on values. Alternatively or in addition, they may take the form of constraints on arithmetic combinations of values (e.g., picture width multiplied by picture height multiplied by number of pictures decoded per second). Other means for specifying constraints for levels may also be used. Some of the constraints specified in a level may for example relate to the maximum picture size, maximum bitrate and maximum data rate in terms of coding units, such as macroblocks, per a time period, such as a second. The same set of levels may be defined for all profiles. It may be preferable for example to increase interoperability of terminals implementing different profiles that most or all aspects of the definition of each level may be common across different profiles. A tier may be defined as specified category of level constraints imposed on values of the syntax elements in the bitstream, where the level constraints are nested within a tier and a decoder conforming to a certain tier and level would be capable of decoding all bitstreams that conform to the same tier or the lower tier of that level or any level below it.

In some cases, a conformance point may be defined as a combination of a particular profile and a particular level or a combination of a particular profile, a particular tier, and a particular level. It needs to be understood that a conformance point may be defined in alternative ways, while its intent to specify characteristics and limits of bitstream and/or characteristics and (maximum) resources of decoders may be kept unchanged.

The elementary unit for the input to an H.264/AVC or HEVC encoder and the output of an H.264/AVC or HEVC decoder, respectively, is a picture. A picture given as an input to an encoder may also referred to as a source picture, and a picture decoded by a decoded may be referred to as a decoded picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

A partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

Figure 5:
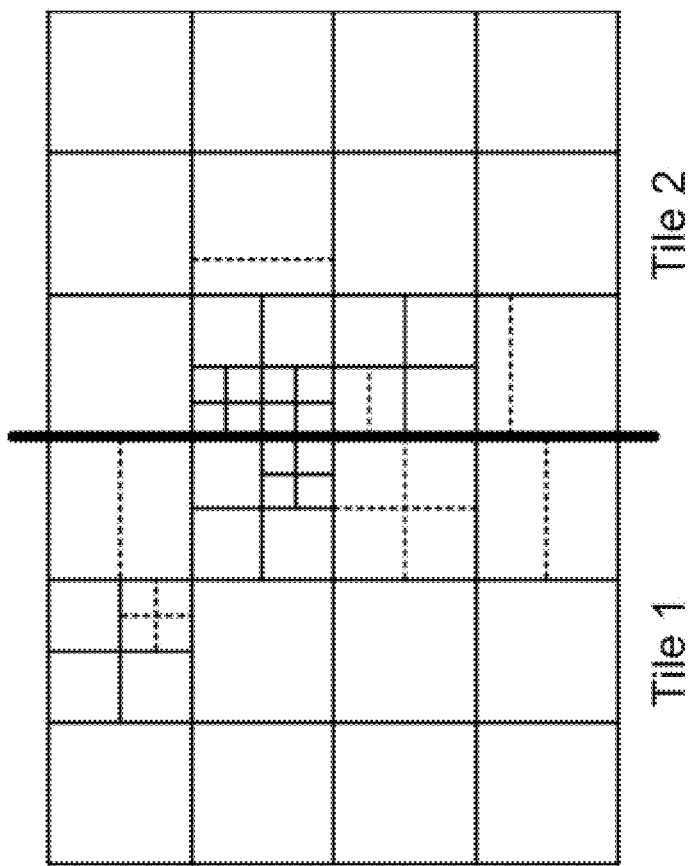
FIG. 5 shows an example of a picture consisting of two tiles.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order. FIG. 5 shows an example of a picture consisting of two tiles partitioned into square coding units (solid lines) which have been further partitioned into rectangular prediction units (dashed lines).

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

Typical video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset which can be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C=D+\lambda R, \qquad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may additionally contain various indications related to the scalability and multiview hierarchy.

In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. The nuh_layer_id syntax element of HEVC may carry information on the scalability hierarchy.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, VCL NAL units contain syntax elements representing one or more CU.

In H.264/AVC, a coded slice NAL unit can be indicated to be a coded slice in an Instantaneous Decoding Refresh (IDR) picture or coded slice in a non-IDR picture.

In HEVC, a coded slice NAL unit can be indicated to be one of the following types:

| nal_unit_type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |

-continued

| nal_unit_type | Name of nal_unit_type | Content of NAL unit and RBSP syntax structure |
|---|---|---|
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17, 18 | BLA_W_LP BLA_W_DLP (a.k.a. IDR_W_RADL) BLA_N_LP | Coded slice segment of a BLA picture slice_segment_layer_rbsp( ) |
| 19, 20 | IDR_W_DLP (a.k.a. IDR_W_RADL) IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_IRAP_VCL22 . . . RSV_IRAP_VCL23 | Reserved // reserved RAP VCL NAL unit types |
| 24 . . . 31 | RSV_VCL24 . . . RSV_VCL31 | Reserved // reserved non-RAP VCL NAL unit types |

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture, is a picture where each slice or slice segment has nal_unit_type in the range of 16 to 23, inclusive. An IRAP picture in an independent layer contains only intra-coded slices. An IRAP picture belonging to a predicted layer with nuh_layer_id value currLayerId may contain P, B, and I slices, cannot use inter prediction from other pictures with nuh_layer_id equal to currLayerId, and may use inter-layer prediction from its direct reference layers. In the present version of HEVC, an IRAP picture may be a BLA picture, a CRA picture or an IDR picture. The first picture in the bitstream containing a base layer is an IRAP picture. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. There may be pictures in a bitstream that contain only intra-coded slices that are not RAP pictures. The IRAP picture belonging to a predicted layer with nuh_layer_id value currLayerId and all subsequent non-RASL pictures with nuh_layer_id equal to currLayerId in decoding order can be correctly decoded without performing the decoding process of any pictures with nuh_layer_id equal to currLayerId that precede the IRAP picture in decoding order, when the necessary parameter sets are available when they need to be activated and when the decoding of each direct reference layer of the layer with nuh_layer_id equal to currLayerId has been initialized (i.e. when LayerInitializedFlag[refLayerId] is equal to 1 for refLayerId equal to all nuh_layer_id values of the direct reference layers of the layer with nuh_layer_id equal to currLayerId).

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order may be decodable if random access is performed at the CRA picture, and hence clean random access may be achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture may either be a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some drafts of the HEVC standard, a RADL picture was referred to a Decodable Leading Picture (DLP).

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture may contain syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in HEVC, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise three parts, the base VPS, the VPS extension, and the VPS VUI, where the VPS extension and the VPS VUI may be optionally present. In HEVC, the base VPS may be considered to comprise the video_parameter_set_rbsp( ) syntax structure without the vps_extension( ) syntax structure. The video_parameter_set_rbsp( ) syntax structure was primarily specified already for HEVC version 1 and includes syntax elements which may be of use for base layer decoding. In HEVC, the VPS extension may be considered to comprise the vps_extension( ) syntax structure. The vps_extension( ) syntax structure was specified in HEVC version 2 primarily for multi-layer extensions and comprises syntax elements which may be of use for decoding of one or more non-base layers, such as syntax elements indicating layer dependency relations. The VPS VUI comprises syntax elements that may be useful for decoding or other purposes but are not required to be used in the HEVC decoding process.

H.264/AVC and HEVC syntax allows many instances of parameter sets, and each instance is identified with a unique identifier. In order to limit the memory usage needed for parameter sets, the value range for parameter set identifiers has been limited. In H.264/AVC and HEVC, each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) may be used in claims and described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream.

A parameter set may be activated by a reference from a slice or from another active parameter set or in some cases from another syntax structure such as a buffering period SEI message.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

Several nesting SEI messages have been specified in the AVC and HEVC standards or proposed otherwise. The idea of nesting SEI messages is to contain one or more SEI messages within a nesting SEI message and provide a mechanism for associating the contained SEI messages with a subset of the bitstream and/or a subset of decoded data. It may be required that a nesting SEI message contains one or more SEI messages that are not nesting SEI messages themselves. An SEI message contained in a nesting SEI message may be referred to as a nested SEI message. An SEI message not contained in a nesting SEI message may be referred to as a non-nested SEI message. The scalable nesting SEI message of HEVC enables to identify either a bitstream subset (resulting from a sub-bitstream extraction process) or a set of layers to which the nested SEI messages apply. A bitstream subset may also be referred to as a sub-bitstream.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In HEVC, no redundant coded picture has been specified.

In H.264/AVC, an access unit (AU) comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. In multi-layer HEVC, the value of NoRaslOutputFlag is equal to 1 for each IRAP picture when its nuh_layer_id is such that LayerInitializedFlag[nuh_layer_id] is equal to 0 and LayerInitializedFlag[refLayerId] is equal to 1 for all values of refLayerId equal to IdDirectRefLayer[nuh_layer_id][j], where j is in the range of 0 to NumDirectRefLayers[nuh_layer_id]−1, inclusive. Otherwise, the value of NoRaslOutputFlag is equal HandleCraAsBlaFlag. NoRaslOutputFlag equal to 1 has an impact that the RASL pictures associated with the IRAP picture for which the NoRaslOutputFlag is set are not output by the decoder. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

In HEVC, a coded video sequence group (CVSG) may be defined, for example, as one or more consecutive CVSs in decoding order that collectively consist of an IRAP access unit that activates a VPS RBSP firstVpsRbsp that was not already active followed by all subsequent access units, in decoding order, for which firstVpsRbsp is the active VPS RBSP up to the end of the bitstream or up to but excluding the access unit that activates a different VPS RBSP than firstVpsRbsp, whichever is earlier in decoding order.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Structure of Pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. All pictures in the previous SOP precede in decoding order all pictures in the current SOP and all pictures in the next SOP succeed in decoding order all pictures in the current SOP. A SOP may represent a hierarchical and repetitive inter prediction structure. The term group of pictures (GOP) may sometimes be used interchangeably with the term SOP and having the same semantics as the semantics of SOP.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In HEVC, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order.

There are six subsets of the reference picture set, which are referred to as namely RefPicSetStCurr0 (a.k.a. RefPicSetStCurrBefore), RefPicSetStCurr1 (a.k.a. RefPicSetStCurrAfter), RefPicSetStFoll0, RefPicSetStFoll1, RefPicSetLtCurr, and RefPicSetLtFoll. RefPicSetStFoll0 and RefPicSetStFoll1 may also be considered to form jointly one subset RefPicSetStFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a sequence parameter set and taken into use in the slice header through an index to the reference picture set. A reference picture set may also be specified in a slice header. A reference picture set may be coded independently or may be predicted from another reference picture set (known as inter-RPS prediction). In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as reference picture list 0 and reference picture list 1, is typically constructed in two steps: First, an initial reference picture list is generated. The initial reference picture list may be generated for example on the basis of frame_num, POC, temporal_id (or TemporalId or alike), or information on the prediction hierarchy such as GOP structure, or any combination thereof. Second, the initial reference picture list may be reordered by reference picture list reordering (RPLR) commands, also known as reference picture list modification syntax structure, which may be contained in slice headers. In H.264/AVC, the RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. In HEVC, the initial reference picture lists may be modified through the reference picture list modification syntax structure, where pictures in the initial reference picture lists may be identified through an entry index to the list. In other words, in HEVC, reference picture list modification is encoded into a syntax structure comprising a loop over each entry in the final reference picture list, where each loop entry is a fixed-length coded index to the initial reference picture list and indicates the picture in ascending position order in the final reference picture list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Many high efficiency video codecs such as HEVC codec employ an additional motion information coding/decoding mechanism, often called merging/merge mode/process/mechanism, where all the motion information of a block/PU is predicted and used without any modification/correction.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content. The coded interlaced source content in the base layer may comprise coded fields, coded frames representing field pairs, or a mixture of them. In the interlace-to-progressive scalability, the base-layer picture may be resampled so that it becomes a suitable reference picture for one or more enhancement-layer pictures.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension. More generally, in hybrid codec scalability one or more layers may be coded according to one coding standard or specification and other one or more layers may be coded according to another coding standard or specification. For example, there may be two layers coded according to the MVC extension of H.264/AVC (out of which one is a base layer coded according to H.264/AVC), and one or more additional layers coded according to MV-HEVC. Furthermore, the number of coding standard or specifications according to which different layers of the same bitstream are coded might not be limited to two in hybrid codec scalability.

It should be understood that many of the scalability types may be combined and applied together. For example color gamut scalability and bit-depth scalability may be combined.

SHVC enables the use of weighted prediction or a color-mapping process based on a 3D lookup table (LUT) for color gamut scalability. The 3D LUT approach may be described as follows. The sample value range of each color components may be first split into two ranges, forming up to 2×2×2 octants, and then the luma ranges can be further split up to four parts, resulting into up to 8×2×2 octants. Within each octant, a cross color component linear model is applied to perform color mapping. For each octant, four vertices are encoded into and/or decoded from the bitstream to represent a linear model within the octant. The color-mapping table is encoded into and/or decoded from the bitstream separately for each color component. Color mapping may be considered to involve three steps: First, the octant to which a given reference-layer sample triplet (Y, Cb, Cr) belongs is determined. Second, the sample locations of luma and chroma may be aligned through applying a color component adjustment process. Third, the linear mapping specified for the determined octant is applied. The mapping may have cross-component nature, i.e. an input value of one color component may affect the mapped value of another color component. Additionally, if inter-layer resampling is also required, the input to the resampling process is the picture that has been color-mapped. The color-mapping may (but needs not to) map samples of a first bit-depth to samples of another bit-depth.

The spatial correspondence of a reference-layer picture and an enhancement-layer picture may be inferred or may be indicated with one or more types of so-called reference layer location offsets. In HEVC, reference layer location offsets may be included in the PPS by the encoder and decoded from the PPS by the decoder. Reference layer location offsets may be used for but are not limited to achieving ROI scalability. Reference layer location offsets may comprise one or more of scaled reference layer offsets, reference region offsets, and resampling phase sets. Scaled reference layer offsets may be considered to specify the horizontal and vertical offsets between the sample in the current picture that is collocated with the top-left luma sample of the reference region in a decoded picture in a reference layer and the horizontal and vertical offsets between the sample in the current picture that is collocated with the bottom-right luma sample of the reference region in a decoded picture in a reference layer. Another way is to consider scaled reference layer offsets to specify the positions of the corner samples of the upsampled reference region relative to the respective corner samples of the enhancement layer picture. The scaled reference layer offset values may be signed. Reference region offsets may be considered to specify the horizontal and vertical offsets between the top-left luma sample of the reference region in the decoded picture in a reference layer and the top-left luma sample of the same decoded picture as well as the horizontal and vertical offsets between the bottom-right luma sample of the reference region in the decoded picture in a reference layer and the bottom-right luma sample of the same decoded picture. The reference region offset values may be signed. A resampling phase set may be considered to specify the phase offsets used in resampling process of a direct reference layer picture. Different phase offsets may be provided for luma and chroma components.

Hybrid codec scalability may be used together with any types of scalability, such as temporal, quality, spatial, multiview, depth-enhanced, auxiliary picture, bit-depth, color gamut, chroma format, and/or ROI scalability. As hybrid codec scalability may be used together with other types of scalabilities, it may be considered to form a different categorization of scalability types.

The use of hybrid codec scalability may be indicated for example in an enhancement layer bitstream. For example, in multi-layer HEVC, the use of hybrid codec scalability may be indicated in the VPS, for example using the syntax element vps_base_layer_internal_flag.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

Some scalable video coding schemes may require IRAP pictures to be aligned across layers in a manner that either all pictures in an access unit are IRAP pictures or no picture in an access unit is an IRAP picture. Other scalable video coding schemes, such as the multi-layer extensions of HEVC, may allow IRAP pictures that are not aligned, i.e. that one or more pictures in an access unit are IRAP pictures, while one or more other pictures in an access unit are not IRAP pictures. Scalable bitstreams with IRAP pictures or similar that are not aligned across layers may be used for example for providing more frequent IRAP pictures in the base layer, where they may have a smaller coded size due to e.g. a smaller spatial resolution. A process or mechanism for layer-wise start-up of the decoding may be included in a video decoding scheme. Decoders may hence start decoding of a bitstream when a base layer contains an IRAP picture and step-wise start decoding other layers when they contain IRAP pictures. In other words, in a layer-wise start-up of the decoding mechanism or process, decoders progressively increase the number of decoded layers (where layers may represent an enhancement in spatial resolution, quality level, views, additional components such as depth, or a combination) as subsequent pictures from additional enhancement layers are decoded in the decoding process. The progressive increase of the number of decoded layers may be perceived for example as a progressive improvement of picture quality (in case of quality and spatial scalability).

A layer-wise start-up mechanism may generate unavailable pictures for the reference pictures of the first picture in decoding order in a particular enhancement layer. Alternatively, a decoder may omit the decoding of pictures preceding, in decoding order, the IRAP picture from which the decoding of a layer can be started. These pictures that may be omitted may be specifically labeled by the encoder or another entity within the bitstream. For example, one or more specific NAL unit types may be used for them. These pictures, regardless of whether they are specifically marked with a NAL unit type or inferred e.g. by the decoder, may be referred to as cross-layer random access skip (CL-RAS) pictures. The decoder may omit the output of the generated unavailable pictures and the decoded CL-RAS pictures.

A layer-wise start-up mechanism may start the output of enhancement layer pictures from an IRAP picture in that enhancement layer, when all reference layers of that enhancement layer have been initialized similarly with an IRAP picture in the reference layers. In other words, any pictures (within the same layer) preceding such an IRAP picture in output order might not be output from the decoder and/or might not be displayed. In some cases, decodable leading pictures associated with such an IRAP picture may be output by the decoder, while other pictures preceding such an IRAP picture, such as RASL pictures associated with the IRAP picture, might not be output by the decoder and/or might not be displayed.

Concatenation of coded video data, which may also be referred to as splicing, may occur for example coded video sequences are concatenated into a bitstream that is broadcast or streamed or stored in a mass memory. For example, coded video sequences representing commercials or advertisements may be concatenated with movies or other "primary" content.

Scalable video bitstreams might contain IRAP pictures that are not aligned across layers. It may, however, be convenient to enable concatenation of a coded video sequence that contains an IRAP picture in the base layer in its first access unit but not necessarily in all layers. A second coded video sequence that is spliced after a first coded video sequence should trigger a layer-wise decoding start-up process. That is because the first access unit of said second coded video sequence might not contain an IRAP picture in all its layers and hence some reference pictures for the non-IRAP pictures in that access unit may not be available (in the concatenated bitstream) and cannot therefore be decoded. The entity concatenating the coded video sequences, hereafter referred to as the splicer, should therefore modify the first access unit of the second coded video sequence such that it triggers a layer-wise start-up process in decoder(s).

Indication(s) may exist in the bitstream syntax to indicate triggering of a layer-wise start-up process. These indication(s) may be generated by encoders or splicers and may be obeyed by decoders. These indication(s) may be used for particular picture type(s) or NAL unit type(s) only, such as only for IDR pictures, or may be used for any picture type(s). Without loss of generality, an indication called cross_layer_bla_flag that is considered to be included in a slice segment header is referred to below. It should be understood that a similar indication with any other name or included in any other syntax structures could be additionally or alternatively used.

Independently of indication(s) triggering a layer-wise start-up process, certain NAL unit type(s) and/or picture type(s) may trigger a layer-wise start-up process. For example, a base-layer BLA picture may trigger a layer-wise start-up process.

A layer-wise start-up mechanism may be initiated in one or more of the following cases:

At the beginning of a bitstream.

At the beginning of a coded video sequence, when specifically controlled, e.g. when a decoding process is started or re-started e.g. as response to tuning into a broadcast or seeking to a position in a file or stream. The decoding process may input an variable, e.g. referred to as NoClrasOutputFlag, that may be controlled by external means, such as the video player or alike.

A base-layer BLA picture.

A base-layer IDR picture with cross_layer_bla_flag equal to 1. (Or a base-layer IRAP picture with cross_layer_bla_flag equal to 1.)

A base-layer CRA picture with HandleCraAsBlaFlag equal to 1, where the decoding process inputs variable HandleCraAsBlaFlag that may be controlled by external means.

When a layer-wise start-up mechanism is initiated, the decoding process may set variables accordingly. For example, the variable NoClrasOutputFlag may be set equal to 1.

A decoding process may be specified in a manner that a certain variable controls whether or not a layer-wise start-up process is used. For example, a variable NoClrasOutputFlag may be used, which, when equal to 0, indicates a normal decoding operation, and when equal to 1, indicates a layer-wise start-up operation, or, when the access unit where NoClrasOutputFlag is set equal to 1 contains IRAP pictures in all layers, indicates a start of decoding where all layers are decoded conventionally.

When a layer-wise start-up mechanism is initiated, all pictures in the DPB may be marked as "unused for reference". In other words, all pictures in all layers may be marked as "unused for reference" and will not be used as a reference for prediction for the picture initiating the layer-wise start-up mechanism or any subsequent picture in decoding order.

A decoding process for layer-wise start-up may be for example controlled by two array variables LayerInitializedFlag[i] and FirstPicInLayerDecodedFlag[i] which may have entries for each layer (possibly excluding the base layer and possibly other independent layers too). When the layer-wise start-up process is invoked, for example as response to NoClrasOutputFlag being equal to 1, these array variables may be reset to their default values. For example, when there 63 layers are enabled (e.g. with a 6-bit nuh_layer_id), the variables may be reset as follows: the variable LayerInitializedFlag[i] is set equal to 0 for all values of i from 0 to 62, inclusive, and the variable FirstPicInLayerDecodedFlag[i] is set equal to 0 for all values of i from 1 to 62, inclusive.

The decoding process may include the following or similar to control the output of RASL pictures. When the current picture is an IRAP picture, the following applies:
  If LayerInitializedFlag[nuh_layer_id] is equal to 0, the variable NoRaslOutputFlag is set equal to 1.
  Otherwise, if some external means is available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag.
  Otherwise, the variable HandleCraAsBlaFlag is set equal to 0 and the variable NoRaslOutputFlag is set equal to 0.

The decoding process may include the following to update the LayerInitializedFlag for a layer. When the current picture is an IRAP picture and either one of the following is true, LayerInitializedFlag[nuh_layer_id] is set equal to 1.
  nuh_layer_id is equal to 0.
  LayerInitializedFlag[nuh_layer_id] is equal to 0 and LayerInitializedFlag[refLayerId] is equal to 1 for all values of refLayerId equal to RefLayerId[nuh_layer_id][j], where j is in the range of 0 to NumDirectRefLayers[nuh_layer_id]−1, inclusive.

When FirstPicInLayerDecodedFlag[nuh_layer_id] is equal to 0, the decoding process for generating unavailable reference pictures may be invoked prior to decoding the current picture. The decoding process for generating unavailable reference pictures may generate pictures for each picture in a reference picture set with default values. The process of generating unavailable reference pictures may be primarily specified only for the specification of syntax constraints for CL-RAS pictures, where a CL-RAS picture may be defined as a picture with nuh_layer_id equal to layerId and LayerInitializedFlag[layerId] is equal to 0. In HRD operations, CL-RAS pictures may need to be taken into consideration in derivation of CPB arrival and removal times. Decoders may ignore any CL-RAS pictures, as these pictures are not specified for output and have no effect on the decoding process of any other pictures that are specified for output.

Cross-layer random access skipped (CL-RAS) pictures may have the property that when a layer-wise start-up mechanism is invoked (e.g. when NoClrasOutputFlag is equal to 1), the CL-RAS pictures are not output and may not be correctly decodable, as the CL-RAS picture may contain references to pictures that are not present in the bitstream. It may be specified that CL-RAS pictures are not used as reference pictures for the decoding process of non-CL-RAS pictures.

CL-RAS pictures may be inferred. For example, a picture with nuh_layer_id equal to layerId may be inferred to be a CL-RAS picture when the LayerInitializedFlag[layerId] is equal to 0. A CL-RAS picture may be defined as a picture with nuh_layer_id equal to layerId such that LayerInitializedFlag[layerId] is equal to 0 when the decoding of a coded picture with nuh_layer_id greater than 0 is started.

A layer tree may be defined as a set of layers such that each layer in the set of layers is a direct or indirect predicted layer or a direct or indirect reference layer of at least one other layer in the set of layers and no layer outside the set of layers is a direct or indirect predicted layer or a direct or indirect reference layer of any layer in the set of layers. A direct predicted layer may be defined as a layer for which another layer is a direct reference layer. A direct reference layer may be defined as a layer that may be used for inter-layer prediction of another layer for which the layer is the direct reference layer. An indirect predicted layer may be defined as a layer for which another layer is an indirect reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An independent layer may be defined as a layer that does not have any direct reference layers. A base layer may be defined as a layer that has the lowest possible layer identifier value. For example, in HEVC a base layer may be defined as a layer with nuh_layer_id equal to 0. An independent non-base layer may be defined as a layer that is an independent layer but is not the base layer.

Alternatively, a layer tree may be defined as a set of layers where each layer has an inter-layer prediction relation with at least one other layer in the layer tree and no layer outside the layer tree has an inter-layer prediction relation with any layer in the layer tree.

A layer subtree may be defined as a subset of the layers of a layer tree including all the reference layers of the layers within the subset.

It has been proposed that a bitstream needs not necessarily have a base layer (i.e., a layer with nuh_layer_id equal to 0 in multi-layer HEVC extensions) included in the bitstream or provided externally (in case of hybrid codec scalability), but the lowest layer may be an independent non-base layer. It needs to be understood that when the base layer or nuh_layer_id equal to 0 is referred to in examples and embodiments, the examples and embodiments may similarly apply or be realized for an independent non-base layer or nuh_layer_id equal to that of an independent non-base layer. The layer with the lowest nuh_layer_id present in the bitstream may be regarded as the base layer of the bitstream.

In HEVC, the VPS flags vps_base_layer_internal_flag and vps_base_layer_available_flag may be used to indicate the presence and availability of the base layer as follows: If vps_base_layer_internal_flag is equal to 1 and vps_base_layer_available_flag is equal to 1, the base layer is present in the bitstream. Otherwise, if vps_base_layer_internal_flag is equal to 0 and vps_base_layer_available_flag is equal to 1, the base layer is provided by external means to the multi-layer HEVC decoding process, i.e. decoded base layer pictures as well as certain variables and syntax elements for the decoded base layer pictures are provided to the multi-layer HEVC decoding process. Otherwise, if vps_base_layer_internal_flag is equal to 1 and vps_base_layer_available_flag is equal to 0, the base layer is not available (neither present in the bitstream nor provided by external means) but the VPS includes information of the base layer as if it were present in the bitstream. Otherwise (vps_base_layer_internal_flag is equal to 0 and vps_base_layer_available_flag is equal to 0), the base layer is not available (neither present in the bitstream nor provided by external means) but the VPS includes information of the base layer as if it were provided by external means.

A coding standard may include a sub-bitstream extraction process, and such is specified for example in SVC, MVC, and HEVC. The sub-bitstream extraction process relates to converting a bitstream, typically by removing NAL units, to a sub-bitstream, which may also be referred to as a bitstream subset. The sub-bitstream still remains conforming to the standard. For example, in HEVC, the bitstream created by excluding all VCL NAL units having a TemporalId value greater than a selected value and including all other VCL NAL units remains conforming.

The HEVC standard (version 2) includes three sub-bitstream extraction processes. The sub-bitstream extraction process in clause 10 of the HEVC standard is identical to that in clause F.10.1 except that the bitstream conformance requirements for the resulting sub-bitstream are relaxed in clause F.10.1 so that it can be used also for bitstream where the base layer is external (in which case vps_base_layer_internal_flag is equal to 0) or not available (in which case vps_base_layer_available_flag is equal to 0). VCL NAL units with nuh_layer_id equal to 0 are not present in a bitstream with vps_base_layer_available_flag equal to 0, and the layer with the lowest nuh_layer_id value may be treated like a base layer in semantics and/or decoding process. Clause F.10.3 of the HEVC standard (version 2) specifies a sub-bitstream extraction process for additional layer sets, resulting into a sub-bitstream that does not contain the base layer. All three sub-bitstream extraction processes operate similarly: the sub-bitstream extraction process takes a TemporalId and/or a list of nuh_layer_id values as input and derives a sub-bitstream (also known as a bitstream subset) by removing from the bitstream all NAL units with TemporalId greater than the input TemporalId value or nuh_layer_id value not among the values in the input list of nuh_layer_id values. Clause F.10.3 handles NAL units of certain types and with nuh_layer_id equal to 0 specially and also sets the value of vps_base_layer_available_flag in VPSs. The process of clause F.10.3 may be specified as follows:

The output bitstream outBitstream is set to be identical to the input bitstream inBitstream.

NAL units with nal_unit_type not equal to VPS_NUT, SPS_NUT, PPS_NUT, EOS_NUT, and EOB_NUT and with nuh_layer_id not equal to any value in the input list of nuh_layer_id values, layerIdListTarget, are removed from outBitstream.

NAL units with nal_unit_type equal to VPS_NUT, SPS_NUT, PPS_NUT, or EOS_NUT with nuh_layer_id not equal to 0 or any value in layerIdListTarget are removed from outBitstream.

All NAL units with TemporalId greater than the input TemporalId, tIdTarget, are removed from outBitstream.

vps_base_layer_available_flag in each VPS is set equal to 0.

A coding standard or system may refer to a term operation point or alike, which may indicate the scalable layers and/or sub-layers under which the decoding operates and/or may be associated with a sub-bitstream that includes the scalable layers and/or sub-layers being decoded. Some non-limiting definitions of an operation point are provided in the following.

In HEVC, an operation point is defined as bitstream created from another bitstream by operation of the sub-bitstream extraction process with the another bitstream, a target highest TemporalId, and a target layer identifier list as inputs.

The VPS of HEVC specifies layer sets and HRD parameters for these layer sets. A layer set may be used as the target layer identifier list in the sub-bitstream extraction process. In HEVC, a layer set may be defined as set of layers represented within a bitstream created from another bitstream by operation of the sub-bitstream extraction process with the another bitstream, the target highest TemporalId equal to 6, and the target layer identifier list equal to the layer identifier list associated with the layer set as inputs.

An additional layer set may be defined as a set of layers of a bitstream with a set of layers of one or more non-base layer subtrees. An additional layer set may be understood as a set of layers that do not depend on layers excluded from the additional layer set. In HEVC, the VPS syntax specified in HEVC version 1 does not enable indication of additional layer set, i.e. the base layer is required to be present in the layer sets indicated in the VPS specified in HEVC version 1. The VPS extension syntax specified in HEVC version 2 enables indicating additional layer sets.

Layer sets and additional layer sets may be treated equivalently, when it comes to using them e.g. in deriving and indicating output layer sets. Unless otherwise indicated by the context the term layer set may be understood below as a collective term covering both the term layer set and the term additional layer set, as defined above.

An output layer may be defined as a layer whose decoded pictures are output by the decoding process. The output layers may depend on which subset of the multi-layer bitstream is decoded. The pictures output by the decoding process may be further processed, e.g. a color space conversion from the YUV color space to RGB may be performed, and they may be displayed. However, further processing and/or displaying may be considered to be processes external of the decoder and/or the decoding process and might not take place.

In multi-layer video bitstreams, an operation point definition may include a consideration a target output layer set. For example, an operation point may be defined as a bitstream that is created from another bitstream by operation of the sub-bitstream extraction process with the another bitstream, a target highest temporal sub-layer (e.g. a target highest TemporalId), and a target layer identifier list as inputs, and that is associated with a set of output layers. Alternatively, another term, such as an output operation point, may be used when referring to an operation point and the associated set of output layers. For example, in MV-HEVC/SHVC, an output operation point may be defined as a bitstream that is created from an input bitstream by operation of the sub-bitstream extraction process with the input bitstream, a target highest TemporalId, and a target layer identifier list as inputs, and that is associated with a set of output layers.

An output layer set (OLS) may be defined as a set of layers consisting of the layers of one of the specified layer sets, where one or more layers in the set of layers are indicated to be output layers. An output layer may be defined as a layer of an output layer set that is output when the decoder and/or the HRD operates using the output layer set as the target output layer set. In MV-HEVC/SHVC, the variable TargetOlsIdx may specify which output layer set is the target output layer set by setting TargetOlsIdx equal to the index of the output layer set that is the target output layer set. A target output layer set may be defined as the output layer set for which the index is equal to TargetOlsIdx. TargetOlsIdx may be set for example by the HRD and/or may be set by external means, for example by a player or alike through an interface provided by the decoder. In MV-HEVC/SHVC, an output layer may be defined as a layer of an output layer set that is output when TargetOlsIdx is equal to the index of the output layer set.

A necessary layer may be defined as a layer in an output operation point associated with an output layer set, the layer being an output layer of the output layer set, or a reference layer of an output layer of the output layer set.

MV-HEVC/SHVC enable derivation of a "default" output layer set for each layer set specified in the VPS using a specific mechanism or by indicating the output layers explicitly. Two specific mechanisms have been specified: it may be specified in the VPS that each layer is an output layer or that only the highest layer is an output layer in a "default" output layer set. Auxiliary picture layers may be excluded from consideration when determining whether a layer is an output layer using the mentioned specific mechanisms. In addition, to the "default" output layer sets, the VPS extension enables to specify additional output layer sets with selected layers indicated to be output layers.

A particular layer set, additional layer set, or output layer set can be referred to through an index, and indices may be assigned according to the order layer sets, additional layer sets, and output layer sets are indicated in the VPS. Output layer sets may use the same index space as layer sets and additional layers so that the "default" output layer sets for each layer set and additional layer set have the index of the respective layer set or additional layer, and additional output layer sets use index values beyond those used by layer sets or additional layer sets.

A sender, a gateway, or alike may select the transmitted layers and/or sub-layers of a scalable video bitstream. Terms layer extraction, extraction of layers, or layer down-switching may refer to transmitting fewer layers than what is available in the bitstream received by the sender, gateway, or alike. Layer up-switching may refer to transmitting additional layer(s) compared to those transmitted prior to the layer up-switching by the sender, gateway, or alike, i.e. restarting the transmission of one or more layers whose transmission was ceased earlier in layer down-switching. Similarly to layer down-switching and/or up-switching, the sender, gateway or alike may perform down- and/or up-switching of temporal sub-layers. The sender, gateway or alike may also perform both layer and sub-layer down-switching and/or up-switching. Layer and sub-layer down-switching and/or up-switching may be carried out in the same access unit or alike (i.e. virtually simultaneously) or may be carried out in different access units or alike (i.e. virtually at distinct times).

While a constant set of output layers suits well use cases and bitstreams where the highest layer stays unchanged in each access unit, they may not support use cases where the highest layer changes from one access unit to another. It has therefore been proposed that encoders can specify the use of alternative output layers within the bitstream and in response to the specified use of alternative output layers decoders output a decoded picture from an alternative output layer in the absence of a picture in an output layer within the same access unit. Several possibilities exist how to indicate alternative output layers. For example, each output layer in an output layer set may be associated with a minimum alternative output layer, and output-layer-wise syntax element(s) may be used for specifying alternative output layer(s) for each output layer. Alternatively, the alternative output layer set mechanism may be constrained to be used only for output layer sets containing only one output layer, and output-layer-set-wise syntax element(s) may be used for specifying alternative output layer(s) for the output layer of the output layer set. Alternatively, as specified in HEVC, the alternative output layer set mechanism may be constrained to be used only for output layer sets containing only one output layer, and an output-layer-set-wise flag (alt_output_layer_flag[olsIdx] in HEVC) may be used for specifying that any direct or indirect reference layer of the output layer may serve as an alternative output layer for the output layer of the output layer set. Alternatively, the alternative output layer set mechanism may be constrained to be used only for bitstreams or CVSs in which all specified output layer sets contain only one output layer, and the alternative output layer(s) may be indicated by bitstream- or CVS-wise syntax element(s). The alternative output layer(s) may be for example specified by listing e.g. within VPS the alternative output layers (e.g. using their layer identifiers or indexes of the list of direct or indirect reference layers), indicating a minimum alternative output layer (e.g. using its layer identifier or its index within the list of direct or indirect reference layers), or a flag specifying that any direct or indirect reference layer is an alternative output layer. When more than one alternative output layer is enabled to be used, it may be specified that the first direct or indirect inter-layer reference picture present in the access unit in descending layer identifier order down to the indicated minimum alternative output layer is output.

Picture output in scalable coding may be controlled for example as follows: For each picture PicOutputFlag is first derived in the decoding process similarly as for a single-layer bitstream. For example, pic_output_flag included in the bitstream for the picture may be taken into account in the derivation of PicOutputFlag. When an access unit has been decoded, the output layers and possible alternative output layers are used to update PicOutputFlag for each picture of the access unit.

When a bitstream specifies the use of an alternative output layer mechanism, the decoding process may operate as follows when it comes to controlling decoded picture output from the decoding process. Here, it is assumed that HEVC decoding is in use and alt_output_layer_flag[TargetOlsIdx] is equal to 1, but the decoding process could be realized similarly with other codecs. When the decoding of a picture is completed, the variable PicOutputFlag for the picture may be set as follows:

If LayerInitializedFlag[nuh_layer_id] is equal to 0, PicOutputFlag is set equal to 0.

Otherwise, if the current picture is a RASL picture and NoRaslOutputFlag of the associated IRAP picture is equal to 1, PicOutputFlag is set equal to 0.

Otherwise, PicOutputFlag is set equal to pic_output_flag, where pic_output_flag is a syntax element associated with the picture, e.g. carried in the slice header of the coded slices of the picture. Additionally, when the decoding of the last picture of an access unit is completed, PicOutputFlag of each decoded picture of the access unit may be updated as follows (prior to the decoding of the next picture):

If alt_output_layer_flag[TargetOlsIdx] is equal to 1 and the current access unit either does not contain a picture at the output layer or contains a picture at the output layer that has PicOutputFlag equal to 0, the following ordered steps apply:

The list nonOutputLayerPictures is set to be the list of the pictures of the access unit with PicOutputFlag equal to 1 and with nuh_layer_id values among the nuh_layer_id values of the reference layers of the output layer.

When the list nonOutputLayerPictures is not empty, the picture with the highest nuh_layer_id value among the list nonOutputLayerPictures is removed from the list nonOutputLayerPictures.

PicOutputFlag for each picture that is included in the list nonOutputLayerPictures is set equal to 0.

Otherwise, PicOutputFlag for pictures that are not included in an output layer is set equal to 0.

As described in the previous paragraph, when the alternative output layer mechanism is in use, the decoding of an access unit may need to be completed before it can be determined which decoded picture(s) of the access unit are output by the decoding process.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). ISO/IEC 14496-15 specifies the storage of bitstreams of H.264/AVC and/or HEVC and/or their extensions in ISOBMFF compliant files. The ISO file format is the base for derivation of all the above mentioned file formats (excluding the ISO file format itself). These file formats (including the ISO file format itself) are generally called the ISO family of file formats.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

One building block in the ISO base media file format is called a box. Each box may have a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes. Each box of the ISO base media file may be identified by a four character code (4CC). The header may provide information about the type and size of the box.

According to the ISO family of file formats, a file may include media data and metadata that may be enclosed in separate boxes. In an example embodiment, the media data may be provided in a media data (mdat) box and the movie (moov) box may be used to enclose the metadata. In some cases, for a file to be operable, both of the mdat and moov boxes must be present. The movie (moov) box may include one or more tracks, and each track may reside in one corresponding track (trak) box. Each track is associated with a handler, identified by a four-character code, specifying the track type. Video, audio, and image sequence tracks can be collectively called media tracks, and they contain an elementary media stream. Other track types comprise hint tracks and timed metadata tracks. Tracks comprise samples, such as audio or video frames. A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. The cookbook instructions may include guidance for packet header construction and may include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, one media track may be selected. Samples of a track may be implicitly associated with sample numbers that may be incremented e.g. by 1 in the indicated decoding order of samples. The first sample in a track may be associated with sample number 1.

The 'trak' box contains a Sample Table box. The Sample Table box comprises e.g. all the time and data indexing of the media samples in a track. The Sample Table box is required to contain a Sample Description box. The Sample Description box includes an entry count field, specifying the number of sample entries included in the box. The Sample Description box is required to contain at least one sample entry. The sample entry format depends on the handler type for the track. Sample entries give detailed information about the coding type used and any initialization information needed for that coding.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description box included in each track may provide a list of sample entries, each providing detailed information about the coding type used, and any initialization information needed for that coding. All samples of a chunk and all samples of a track fragment may use the same sample entry. A chunk may be defined as a contiguous set of samples for one track. The Data Reference (dref) box, which may also be included in each track, may define an indexed list of uniform resource locators (URLs), uniform resource names (URNs), and/or self-references to the file containing the metadata. A sample entry may point to one index of the Data Reference box, thereby indicating the file containing the samples of the respective chunk or track fragment.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These may be distinguished by a type field used to indicate the type of grouping.

The Matroska file format is capable of (but not limited to) storing any of video, audio, picture, or subtitle tracks in one file. Matroska file extensions include .mkv for video (with subtitles and audio), .mk3d for stereoscopic video, .mka for audio-only files, and .mks for subtitles only. Matroska may be used as a basis format for derived file formats, such as WebM.

Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested.

A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

The transport file formats or segment formats that may be employed can be coarsely categorized into different classes. In one example class, transmitted files may be compliant with an existing file format that can be used for live file playback. For example, transmitted files may be compliant with the ISO base media file format or the progressive download profile of the Third Generation Partnership Project (3GPP) file format. In another example class, transmitted files may be similar to files formatted according to an existing file format used for live file playback. For example, transmitted files may be fragments of a server file, which might not be self-containing for playback individually. In another approach, files to be transmitted may be compliant with an existing file format that can be used for live file playback, but the files may be transmitted only partially and hence playback of such files may require awareness and capability of managing partial files.

A Multipurpose Internet Mail Extension (MIME) is an extension to an email protocol which makes it possible to transmit and receive different kinds of data files on the Internet, for example video and audio, images, software, etc. An internet media type is an identifier used on the Internet to indicate the type of data that a file contains. Such internet media types may also be called as content types. Several MIME type/subtype combinations exist that can contain different media formats. Content type information may be included by a transmitting entity in a MIME header at the beginning of a media transmission. A receiving entity thus may need to examine the details of such media content to determine if the specific elements can be rendered given an available set of codecs. Especially when the end system has limited resources, or the connection to the end system has limited bandwidth, it may be helpful to know from the content type alone if the content can be rendered.

RFC 6381 specifies two parameters, 'codecs' and 'profiles', that are used with various MIME types or type/ subtype combinations to allow for unambiguous specification of the codecs employed by the media formats contained within, or the profile(s) of the overall container format.

By labeling content with the specific codecs indicated to render the contained media, receiving systems may determine if the codecs are supported by the end system, and if not, may take appropriate actions (such as rejecting the content, sending notification of the situation, transcoding the content to a supported type, fetching and installing the required codecs, further inspection to determine if it will be sufficient to support a subset of the indicated codecs, etc.).

Similarly, the profiles can provide an overall indication, to the receiver, of the specifications with which the content complies. This is an indication of the compatibility of the container format and its contents to some specification. The receiver may be able to work out the extent to which it can handle and render the content by examining to see which of the declared profiles it supports, and what they mean.

Although one motivation for the MIME is the ability to identify the specific media type of a message part, it may not always be possible from looking at the MIME type and subtype to know which specific media formats are contained in the body part or which codecs are indicated in order to render the content.

There are several media type/subtypes (either currently registered or deployed with registration pending) that contain codecs chosen from a set. In the absence of the 'codecs' and/or 'profiles' parameters, it may be necessary to examine each media element in order to determine the codecs or other features required to render the content.

The parameter value of the codecs parameter may be specified as follows: A single value, or a comma-separated list of values identifying the codec(s) indicated to render the content in the body part. Each value may comprise one or more dot-separated elements. The name space for the first element is determined by the MIME type. The name space for each subsequent element is determined by the preceding element.

In the multi-layer HEVC extensions, a profile-tier-level combination is indicated for each necessary layer for each output layer set. For the multi-layer HEVC extensions, a conformance point may be defined as a list of profile-tier-level combinations, where the list includes the profile-tier-level combination for each necessary layer of a particular output layer set. Different profile-tier-level value (particularly different level value) can be indicated for the same layer in different output layer sets, as the decoded picture buffer requirements differ depending on which layers are necessary layers and which layers are output layers, and the decoded picture buffer requirements are part of the level specifications. Decoder capabilities can be indicated as a list of profile-tier-level combinations. For these mentioned reasons, a single profile-tier-level value within a codecs MIME parameter might not be sufficient to describe a multi-layer HEVC bitstream stored e.g. in an ISOBMFF compliant file.

The codecs parameter of the MIME type for ISOBMFF-based files may be specified as follows for such layered codecs (e.g. multi-layer HEVC extensions) for which the profile-level signaling is layer-wise (or bitstream-partition-wise) rather than bitstream-wise or sub-bitstream-wise. It needs to be understood that while the following paragraphs refer to the codecs parameter, a parameter of another name could be alternatively or additionally referred to.

When the 'codecs' parameter of a MIME type is used, as defined in RFC 6381, the following paragraphs document the sub-parameters when the MIME type identifies a file format of the ISOBMFF family and the 'codecs' parameter starts with a sample-entry code from ISO/IEC 14496-15. However, it needs to be understood that the codecs parameter could be similarly specified for container other formats other than ISOBMFF and/or codecs other than AVC or HEVC.

The codecs parameter may have the following structure (as specified in RFC 6381):
ListItem1 (, ListItemN)*
where an asterisk ('*') indicates a repetition of 0 or more times.

Each ListItem may have the following structure:
SampleEntryType1ProfileTierLevel1(SampleEntryTypeN.ProfileTierLevelN)*

It should be understood that the separator character '.' may be equally any other separator character, or several different separator characters, possibly for different location or purpose, may be used. For example, a separator character '!' may be used instead of '.' in front of SampleEntryTypeN.

A pair of SampleEntryType and ProfileTierLevel may be referred to as a profile-tier-level sub-string.

The sample entry type (SampleEntryType) may be the four-character code of the sample entry of the track containing the coded data. The profile-tier-level sub-string specification may be kept unchanged compared to the codecs MIME type specification for single-layer HEVC.

When the sample entry type is a code indicating a codec from the Advanced Video Coding specification (ITU-T Recommendation H.264 or ISO/IEC 14496-10), such as 'avc1', 'avc2', 'avc3', 'avc4', 'svc1', 'svc2', 'mvc1', 'mvc2', 'mvc3', and 'mvc4')—indicating AVC (H.264), Scalable Video Coding (SVC) or Multiview Video Coding (MVC), the ProfileTierLevel element is the hexadecimal representation of the following three bytes in the (subset) sequence parameter set NAL unit specified in H.264/AVC:
profile_idc;
the byte containing the constraint_set flags (currently constraint_set( )_flag through constraint_set5_flag, and the reserved zero 2 bits); and
level_idc.

It should be noted that the sample entries 'avc1', 'avc2', 'avc3', and 'avc4' do not necessarily indicate that the media only contains AVC NAL units. In fact, the media may be encoded as an SVC or MVC profile and thus contain SVC or MVC NAL units. In order to be able to determine which codec is used further information may be needed (profile_idc). Also the reserved zero 2 bits may be required to be equal to 0 in H.264/AVC, but other values for it may be specified in the future by ITU-T|ISO/IEC.

When SVC or MVC content is coded in an AVC-compatible fashion, the sample description may include both an AVC configuration record and an SVC or MVC configuration record. Under those circumstances, it may be recommended that the two configuration records both be reported as they may contain different AVC profile, level, and compatibility indicator values. Thus the codecs reported would include the sample description code (e.g. 'avc1') twice, with the values from one of the configuration records forming the 'avcoti' information in each.

When the sample entry type is a code indicating a codec from the High Efficiency Video Coding specification (ITU-T Recommendation H.265 or ISO/IEC 23008-2), such as 'hev1', 'hvc1', 'lhv1' or 'lhe1', the profile-tier-level sub-string is specified as a series of the code and the values in the following list, separated e.g. by period characters ("."). The values match those of the corresponding profile_tier_level( ) syntax structure of the HEVC bitstream, which may usually be obtained from the HEVC decoder configuration record. In all numeric encodings, leading zeroes may be omitted.

the general_profile_space, encoded as no character (general_profile_space==0), or 'A', 'B', 'C' for general_profile_space 1, 2, 3, followed by the general_profile_idc encoded as a decimal number;

the general_profile_compatibility_flags, encoded in hexadecimal (leading zeroes may be omitted);

the general_tier_flag, encoded as 'L' (general_tier_flag==0) or 'H' (general_tier_flag==1), followed by the general_level_idc, encoded as a decimal number;

each of the 6 bytes of the constraint flags, starting from the byte containing the general_progressive_source_flag, each encoded as a hexadecimal number, and the encoding of each byte separated by a period; trailing bytes that are zero may be omitted.

When the sample entry type is a code indicating a codec from the High Efficiency Video Coding specification, such as 'hev1' or 'hvc1', and the bitstream contains only one layer, the value of the codecs parameter is the profile-tier-level sub-string. For example, codecs=hev1.1.80.L93.B0 indicates a progressive, non-packed stream, Main Profile, Main Tier, Level 3.1.

When the sample entry type is a code indicating a layered HEVC extension the High Efficiency Video Coding specification, such as 'lhv1' or 'lhe1', or the bitstream contains an output layer set with more than one necessary layer, a separator, which may be e.g. '.' or '!', may be used to separate each profile-tier-level sub-string corresponding to a necessary layer of an output layer set for which the codecs parameter is provided. Each profile-tier-level sub-string corresponding to a necessary layer consists of a series of values from the profile_tier_level( ) syntax structure of the necessary layer. The profile-tier-level sub-string may be required to be present for each necessary layer of an output layer set. For example, codecs=hev1.A1.80.L93.B0!hev1.A7.1.L120.B0 or codecs=hev1.A1.80.L93.B0.0.0.0.0.0.hev1.A7.1.L120.B0 may indicate a two-layer, progressive, non-packed stream, where the track containing the base layer uses the sample entry type 'hev1', the base layer conforms to the Main Profile, Main Tier, Level 3.1, the track containing the enhancement layer uses the sample entry type 'hev1' (e.g., it may be contained in the track that also contains the base layer), the enhancement layer conforms to Scalable Main Profile, Main Tier, Level 4.

When only one profile-tier-level sub-string is provided in a ListItem for a predicted layer within the codecs parameter, the bitstream and the codecs parameter may be constrained for example as follows. Each layer may be stored as a separate track; and a separate ListItem should be present for each track (e.g. as a comma-separated list specified by RFC 6381). The comma-separated list of the codecs parameter may be in an order that the list element of the base layer appears last and any list element of a layer shall not depend on those layers that appear earlier in the list. It needs to be understood that the order of list elements could alternatively be specified different, for example so that the list element of the base layer appears first and any list element of a layer shall not depend on those layers that appear later in the list. When the comma-separated list contains n list elements, the bitstream may include at least n output layer sets such that they consist of i necessary layers that correspond to the i list elements from the tail of the comma-separated list, for each value of i in the range of 1 to n, inclusive. These constraints may enable concluding the number of layers required to be decoded as well as their profile, tier, and level requirements.

In the following, some examples of values of the codecs parameter are provided: codecs=hev1.A1.80.L93.B0.0.0.0.0.0.1hv1.A7.1.L120.B0, hev1.A1.80.L93.B0.0.0.0.0.0.1hv1.A6.2.L120.B0 may indicate a bitstream that includes two output layer sets, a "scalable" output layer set and a "multiview" output layer set; or two bitstreams stored in the same file, one containing a "scalable" output layer set and the other containing a "multiview" output layer set. The "scalable" output layer set is two-layer, progressive, non-packed stream, where the track containing the base layer uses the sample entry type 'hev1', the base layer conforms to the Main Profile, Main Tier, Level 3.1, the track containing the enhancement layer uses the sample entry type and the enhancement layer conforms to Scalable Main Profile, Main Tier, Level 4. The "multiview" output layer set is two-layer, progressive, non-packed stream, where the track containing the base layer uses the sample entry type 'hev1', the base layer conforms to the Main Profile, Main Tier, Level 3.1, the track containing the enhancement layer uses the sample entry type and the enhancement layer conforms to Scalable Main Profile, Main Tier, Level 4. Note that the same track may be used as the base layer track for both the output layer sets. codecs=lhv1.A7.1.L120.B0, hev1.A1.80.L93.B0 may indicate a two-layer, progressive, non-packed stream, where the track containing the enhancement layer uses the sample entry type the enhancement layer conforms to Scalable Main Profile, Main Tier, Level 4, the track containing the base layer uses the sample entry type 'hev1', and the base layer conforms to the Main Profile, Main Tier, Level 3.1. Each layer is a separate track. There is an output layer set containing the enhancement layer and the base layer as necessary layers, and an output layer set containing the base layer only. codecs=lhv1.A7.1.L120.B0, avc1.64081F may indicate that the track containing the enhancement layer uses the sample entry type the enhancement layer conforms to Scalable Main Profile, Main Tier, Level 4, the enhancement layer contains progressive, non-packed pictures, and the enhancement layer predicts from an AVC-coded base layer. The AVC-coded base layer uses the sample entry type 'avc1', and the base layer conforms to the Progressive High Profile, Level 3.1.

ISO/IEC International Standard 23009-1 specifies dynamic adaptive streaming over HTTP (DASH). Some concepts, formats, and operations of MPEG-DASH are described below as an example of a video streaming system, wherein the embodiments may be implemented. The aspects of the invention are not limited to MPEG-DASH, but rather the description is given for one possible basis on top of which the invention may be partly or fully realized.

In dynamic adaptive streaming over HTTP (DASH), the multimedia content may be captured and stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

Figure 6:
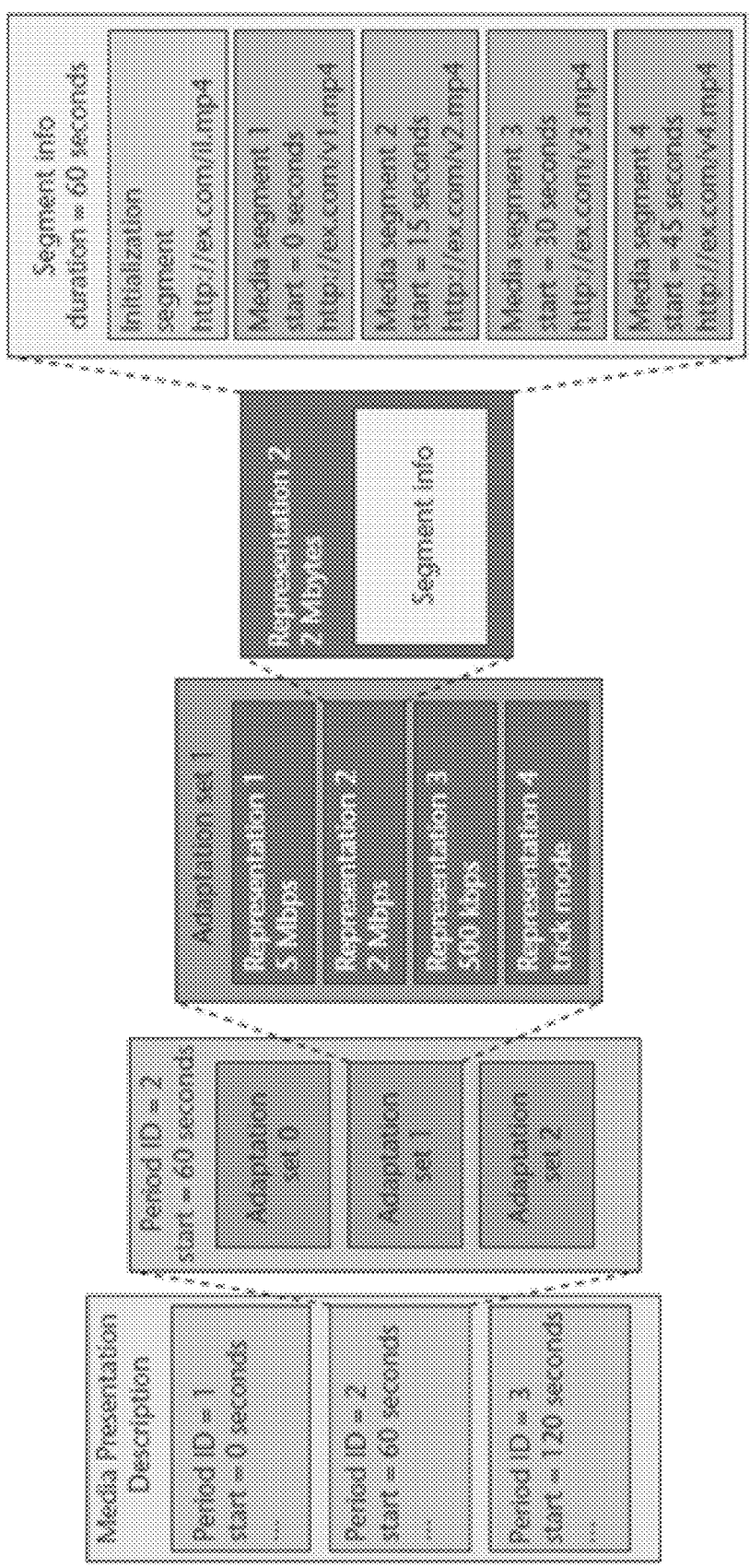
FIG. 6 depicts some details of some dynamic adaptive streaming over HTTP representations.

The media presentation description (MPD) may provide information for clients to establish a dynamic adaptive streaming over HTTP. MPD may contain information describing media presentation, such as an HTTP-uniform resource locator (URL) of each Segment to make GET Segment request. In DASH, hierarchical data model may be used to structure media presentation as shown in FIG. 6. A media presentation may comprise a sequence of one or more Periods, each Period may contain one or more Groups, each Group may contain one or more Adaptation Sets, each Adaptation Set may contain one or more Representations, and each Representation may comprise one or more Segments. A Representation is one of the alternative choices of the media content or a subset thereof which may differ by the encoding choice, e.g. by bitrate, resolution, language, codec, etc. The Segment may contain certain duration of media data, and metadata to decode and present the included media content. A Segment may be identified by a uniform resource indicator (URI) and can be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attribute as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, e.g. ImportantElement. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute. To point to a specific attribute @attribute contained in an element Element, one may write Element@attribute. If an attribute's name consists of two or more combined words, camel-casing may be used after the first word, e.g. @veryImportantAttribute. Attributes may have assigned a status in the XML as mandatory (M), optional (O), optional with default value (OD) and conditionally mandatory (CM).

In DASH, all descriptor elements are structured in the same way, namely they contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements.

It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient. Two elements of type DescriptorType are equivalent, if the element name, the value of the @schemeIdUri and the value of the @value attribute are equivalent. If the @schemeIdUri is a URN, then equivalence may refer to lexical equivalence as defined in clause 5 of RFC 2141. If the @schemeIdUri is a URL, then equivalence may refer to equality on a character-for-character basis as defined in clause 6.2.1 of RFC3986. If the @value attribute is not present, equivalence may be determined by the equivalence for @schemeIdUri only. Attributes and element in extension namespaces might not be used for determining equivalence. The @id attribute may be ignored for equivalence determination.

MPEG-DASH specifies descriptors EssentialProperty and SupplementalProperty. For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

A DASH service may be provided as an on-demand service or live service. In the former, the MPD is a static and all Segments of a Media Presentation are already available when a content provider publishes an MPD. In the latter, however, the MPD may be static or dynamic depending on the Segment URLs construction method employed by a MPD and Segments may be created continuously as the content is produced and published to DASH clients by a content provider. Segment URLs construction method may be either template-based Segment URLs construction method or the Segment list generation method. In the former, a DASH client may be able to construct Segment URLs without updating an MPD before requesting a Segment. In the latter, a DASH client may need to periodically download the updated MPDs to get Segment URLs. For live service, hence, the template-based Segment URLs construction method may be superior to the Segment list generation method.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment may be defined as a Segment that complies with the container file format and/or the media format or formats in use and enables playback when combined with zero or more preceding segments, and an Initialization Segment (if any). A Media Segment may contain certain duration of media data for playback at a normal speed, such duration may be referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration may be a lower bound on the end-to-end latency perceived by a DASH client since a Segment is a discrete unit of generating media data for DASH. Content generation may be done in such a manner that a whole Segment of media data is made available for a server. Furthermore, many client implementations may use a Segment as the unit for GET requests. Thus, in some arrangements for live services a Segment can be requested by a DASH client only when the whole duration of Media Segment is available as well as encoded and encapsulated into a Segment. For on-demand service, different strategies of selecting Segment duration may be used.

A Segment may further be partitioned into Subsegments each of which may contain complete access units. Subsegments may be indexed by Segment index, which contains information to map presentation time range and byte range for each Subsegment and may be used to make a HTTP GET request for a specific Subsegment using byte range HTTP request. If relatively long Segment duration is used, then Subsegments may be used to keep the size of HTTP responses reasonable and flexible for bitrate adaptation. In ISOBMFF based segment formats, a subsegment may be defined as a self-contained set of one or more consecutive movie fragments, where the self-contained set contains one or more Movie Fragment boxes with the corresponding Media Data box(es), and a Media Data Box containing data referenced by a Movie Fragment Box must follow that Movie Fragment box and precede the next Movie Fragment box containing information about the same track.

Each media segment may be assigned a unique URL (possibly with byte range), an index, and explicit or implicit start time and duration. Each media segment may contain at least one stream access point, which is a random access or switch-to point in the media stream where decoding can start using only data from that point forward.

To enable downloading segments in multiple parts, a method of signaling subsegments using a segment index box may be utilized. This box describes subsegments and stream access points in the segment by signaling their durations and byte offsets. The DASH client may use the indexing information to request subsegments using partial HTTP GET requests. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

Segments (or respectively Subsegments) may be defined to be non-overlapping as follows: Let $T_E(S,i)$ be the earliest presentation time of any access unit in stream i of a Segment or Subsegment S, and let $T_L(S,i)$ be the latest presentation time of any access unit in stream i of a Segment or Subsegment S. Two segments (respectively Subsegments), A and B, which may or may not be of different Representations, may be defined to be non-overlapping, when $T_L(A,i)<T_E(B,i)$ for all media streams i in A and B or if $T_L(B,i)<T_E(A,i)$ for all streams i in A and B where i refers to the same media component.

MPEG-DASH defines segment-container formats for both ISO Base Media File Format and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be are defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other level 1 elements and padding. A Segment Index of DASH may comprise a Cues Element of Matroska.

DASH specifies different timelines including Media Presentation timeline and Segment availability times. The former indicates the presentation time of an access unit with a media content which is mapped to the global common presentation timeline. Media Presentation timeline may enable DASH to seamlessly synchronize different media components which are encoded with different coding techniques and share a common timeline. The latter indicates a wall-clock time and is used to signal clients the availability time of Segments which may be identified by HTTP URLs. A DASH client may be able to identify an availability time of a certain Segment by comparing the wall-clock time to the Segment availability time assigned to that Segment. Segment availability time may be used in live delivery of media Segments, referred as live service. For live service, the Segment availability time is different from Segment to Segment and a certain Segment's availability time may depend on the position of the Segment in the Media Presentation timeline. For on-demand service, the Segment availability time may be the same for all Segments.

DASH supports rate adaptation by dynamically requesting Media Segments and/or Subsegments from different Representations within an Adaptation Set to match varying network bandwidth. When a DASH client switches up/down Representation, coding dependencies within Representation may need to be taken into account. In media decoding, a Representation switch may only happen at a random access point (RAP), which may be used in video coding techniques such as H.264/AVC. In order to avoid requesting and transmitting of media data that will not be decoded, RAPs may be aligned at the beginning of Media Segments and/or Subsegments, and the MPD and/or the segment index box may be used to indicate alignment of RAPs at the beginning of Media Segments and/or Subsegments. Consequently, DASH clients may be able to conclude which Segments and/or Subsegments to request so that when Representation switching is performed the first Segment and/or Subsegment of a destination Representation starts with a RAP and the Segments and/or Subsegments of the source and destination Representation are aligned (time-wise). In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

Several types of SAP have been specified, including the following. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

A content provider may create Segment and Subsegment of multiple Representations in a way that may make switching simpler. In a simple case, each Segment and Subsegment starts with a SAP and the boundaries of Segment and Subsegment are aligned across the Representation of an Adaptation Set. In such a case a DASH client may be able to switch Representations without error drift by requesting Segments or Subsegments from an original Representation to a new Representation. In DASH, restrictions to construct Segment and Subsegment are specified in MPD and Segment Index in order to facilitate a DASH client to switch Representations without introducing an error drift. One of the usages of profile specified in DASH is to provide different levels of restrictions to construct Segment and Subsegment etc.

As described above, the client or player may request Segments or Subsegments to be transmitted from different representations similarly to how the transmitted layers and/or sub-layers of a scalable video bitstream may be determined. Terms representation down-switching or bitstream down-switching may refer to requesting or transmitting a lower bitrate representation than what was requested or transmitted (respectively) previously. Terms representation up-switching or bitstream up-switching may refer to requesting or transmitting a higher bitrate representation than what was requested or transmitted (respectively) previously. Terms representation switching or bitstream switching may refer collectively to representation or bitstream up- and down-switching.

Streaming systems similar to MPEG-DASH include for example HTTP Live Streaming (a.k.a. HLS), specified in the IETF Internet Draft draft-pantos-http-live-streaming-13 (and other versions of the same Internet Draft). As a manifest format corresponding to the MPD, HLS uses an extended M3U format. M3U is a file format for multimedia playlists, originally developed for audio files. An M3U Playlist is a text file that consists of individual lines, and each line is a URI, blank, or starts with the character '#' indicating a tag or a comment. A URI line identifies a media segment or a Playlist file. Tags begin with #EXT. The HLS specification specifies a number of tags, which may be regarded as key-value pairs. The value part of tags may comprise an attribute list, which is a comma-separated list of attribute-value pairs, where an attribute-value pair may be considered to have the syntax AttributeName=AttributeValue. Hence, tags of HLS M3U8 files may be considered similar to Elements in MPD or XML, and attributes of HLS M3U8 files may be considered similar to Attributes in MPD or XML. Media segments in HLS are formatted according to the MPEG-2 Transport Stream and contain a single MPEG-2 Program. Each media segment is recommended to start with a Program Association Table (PAT) and a Program Map Table (PMT).

Switching between different bitstreams of the same content may be used for bitrate adaptation. Switching to a different bitstream may be done e.g. at any intra picture starting a closed GOP (such as an IDR picture).

In order to respond to a need for adjusting bitrate faster and avoid the compression penalty of frequent intra pictures, a possible option might be to start stream switching from non-intra pictures. In an embodiment, S frames that are inter-coded frames are used only when switching from a first stream to a second stream. Such S frames may be encoded with a small quantization step and make the decoded S frame close but typically not identical to the corresponding decoded picture of the second stream. H.264/AVC includes the feature known as SI/SP pictures, The SP- and SI-frames may be used similarly to S frames but they may provide identical decoded picture after switching compared to decoding of the stream from the beginning. Identical decoded pictures may be obtained with the cost of additional transform and quantization steps in the decoding process for SI/SP pictures both in the primary streams and SI/SP pictures used for switching only. However, the SI/SP feature is not included in the Baseline or High profile and therefore not commonly used.

Figure 7:
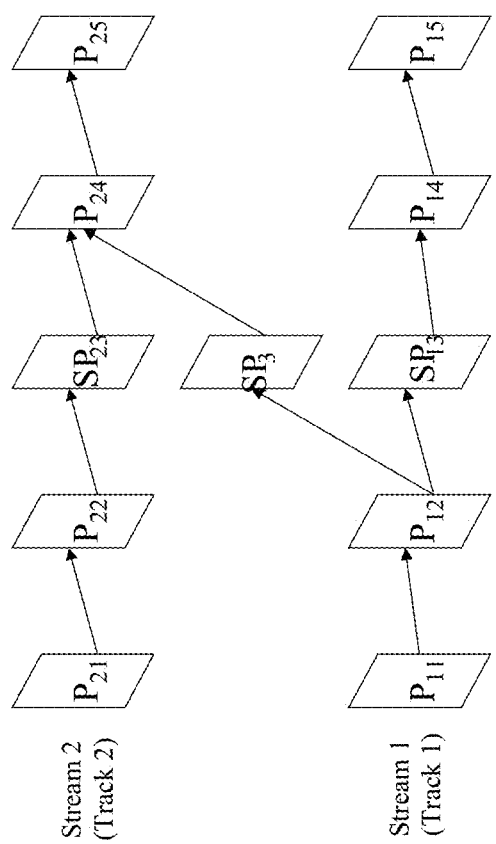
FIG. 7 shows an example how SP pictures may be used to switch between two different bit streams.

FIG. 7 shows an example how SP pictures may be used to switch between two different bit streams. In the file format, switching pictures (SP3 in the example FIG. 7) are stored in switching picture tracks, which are tracks separate from the track that is being switched from and the track being switched to. Switching picture tracks can be identified by the existence of a specific required track reference in that track. A switching picture is an alternative to the sample in the destination track that has exactly the same decoding time. If all switching pictures are SI pictures, then no further information may be needed.

If any of the pictures in the switching track are SP pictures, then two extra pieces of information may be needed. First, the source track that is being switched from may be identified by using a track reference (the source track may be the same track as the destination track). Second, the dependency of the switching picture on the samples in the source track may be needed, so that a switching picture is only used when the pictures on which it depends have been supplied to the decoder.

This dependency may be represented by means of an optional extra sample table. There is one entry per sample in the switching track. Each entry records the relative sample numbers in the source track on which the switching picture depends. If this array is empty for a given sample, then that switching sample contains an SI picture. If the dependency box is not present, then only SI-frames shall be present in the track.

A switching sample may have multiple coded representations with different dependencies. For AVC video, the multiple representations of a switching sample may be stored in different switching tracks (i.e. access units). For example, one switch track might contain a SP-picture representation dependent on some earlier samples, used for stream switching, while another switch track may contain another representation as an SI-picture, used for random access.

An Adaptive Resolution Change (ARC) refers to dynamically changing the resolution within the video sequence, for example in video-conferencing use-cases. Adaptive Resolution Change may be used e.g. for better network adaptation and error resilience. For better adaptation to changing network requirements for different content, it may be desired to be able to change both the temporal/spatial resolution in addition to quality. The Adaptive Resolution Change may also enable a fast start, wherein the start-up time of a session may be able to be increased by first sending a low resolution frame and then increasing the resolution. The Adaptive Resolution Change may further be used in composing a conference. For example, when a person starts speaking, his/her corresponding resolution may be increased. Doing this with an IDR frame may cause a "blip" in the quality as IDR frames need to be coded at a relatively low quality so that the delay is not significantly increased.

A sequence level signaling may be used to indicate the decoder if there is a resolution change in the bitstream. This may be performed e.g. by using a flag single_layer_for_non_irap_flag. The single_layer_for_non_irap_flag may be used to signal that a coded video sequence is constrained to perform the adaptive resolution change operation. The single_layer_for_non_irap_flag specifically indicates that, except for switching pictures, each AU in the sequence contains a single picture from a single layer (which may or may not be BL picture); and that access units where switching happens include pictures from two layers, the EL picture in such an access unit is an IRAP picture, and inter-layer prediction may be used for the EL IRAP picture.

Indicating single_layer_for_non_irap_flag in VPS may allow the decoder to know that scalability is not used except for achieving resolution change, so that the decoder resources may be allocated accordingly upon a session start.

single_layer_for_non_irap_flag may be included in the VPS VUI syntax, as it may cause no change in the normative decoding process.

The semantics of single_layer_for_non_irap_flag may be specified as follows:

single_layer_for_non_irap_flag equal to 1 indicates the following:

If vps_base_layer_internal_flag is equal to 1, single_layer_for_non_irap_flag equal to 1 indicates that either one of the following is true for each access unit for which this VPS is the active VPS:
All the VCL NAL units of an access unit have the same nuh_layer_id value.
Two nuh_layer_id values are used by the VCL NAL units of an access unit and the picture with the greater nuh_layer_id value is an TRAP picture.

Otherwise (vps_base_layer_internal_flag is equal to 0), single_layer_for_non_irap_flag equal to 1 indicates that any one of the following is true for each access unit for which this VPS is the active VPS:
The decoded picture with nuh_layer_id equal to 0 is not provided for the access unit by external means and the access unit contains one coded picture.
The decoded picture with nuh_layer_id equal to 0 is not provided for the access unit by external means, the access unit contains two coded pictures, and the picture with the greater nuh_layer_id value is an IRAP picture.
The decoded picture with nuh_layer_id equal to 0 is provided for an access unit by external means and the access unit contains one coded picture that is an IRAP picture.

single_layer_for_non_irap_flag equal to 0 indicates that the above constraints may or may not apply. When not present, the value of single_layer_for_non_irap_flag is inferred to be equal to 0.

single_layer_for_non_irap_flag may be accompanied by higher_layer_irap_skip_flag, for which the semantics may be specified as follows:

higher_layer_irap_skip_flag equal to 1 indicates that each IRAP picture currIrapPic is constrained as specified below. currIrapPic is derived as follows for each access unit currAu for which this VPS is the active VPS:

If vps_base_layer_internal_flag is equal to 1, currAu contains two coded pictures, and the picture with the greater nuh_layer_id value is an IRAP picture, let currIrapPic be that IRAP picture.
Otherwise, if vps_base_layer_internal_flag is equal to 0, a decoded picture with nuh_layer_id equal to 0 is not provided for currAu by external means, currAu contains two coded pictures, and the picture with the greater nuh_layer_id value is an IRAP picture, let currIrapPic be that IRAP picture.
Otherwise, if vps_base_layer_internal_flag is equal to 0, the decoded picture with nuh_layer_id equal to 0 is provided for currAu by external means and the access unit contains one coded picture that is an IRAP picture, let currIrapPic be that TRAP picture.
Otherwise, currIrapPic is not derived for currAu.

The following constraints may apply for each picture currIrapPic:
For all slices of the IRAP picture:
slice_type shall be equal to P.
slice_sao_luma_flag and slice_sao_chroma_flag shall both be equal to 0.
five_minus_max_num_merge_cand shall be equal to 4.
weighted_pred_flag shall be equal to 0 in the PPS that is referred to by the slices.
For all coding units of the IRAP picture:
cu_skip_flag[i][j] shall be equal to 1.

When single_layer_for_non_irap_flag is equal to 0, higher_layer_irap_skip_flag should be equal to 0. When higher_layer_irap_skip_flag is not present it may be inferred to be equal to 0.

When vps_base_layer_internal_flag is equal to 1, an encoder may set single_layer_for_non_irap_flag equal to 1 as an indication to a decoder that at most two pictures are present in any access unit and whenever there are two pictures in the same access unit, the one with the higher value of nuh_layer_id is an IRAP picture. The encoder may additionally set higher_layer_irap_skip_flag equal to 1 as an indication to a decoder that whenever there are two pictures in the same access unit, the one with the higher value of nuh_layer_id is an IRAP picture for which the decoded samples can be derived by applying the inter-layer reference picture derivation process with the other picture with the lower value of nuh_layer_id as input.

When single_layer_for_non_irap_flag is equal to 1 and higher_layer_irap_skip_flag is equal to 1, the picture with the higher value of nuh_layer_id in an access unit containing two pictures may be referred to as a skip-coded IRAP picture or a skip picture.

Skip pictures may be small in size, as the merge mode can be used to code the inter-layer motion for each prediction unit, coding tree units need not be split to coding units, and only one CABAC-coded flag, cu_skip_flag, may be required to skip the residual coding for each coding unit.

Independent Non-Base Layers and Independent Non-Base Layer Decoding (INBLD) Capability An independent layer may be defined as a layer that does not have direct reference layers. In other words, an independent layer is not predicted using inter-layer prediction.

A non-base layer may be defined as any other layer than the base layer, and the base layer may be defined as the lowest layer in the bitstream.

An independent non-base layer may be defined as a layer that is both an independent layer and a non-base layer.

The independent non-base layer decoding (INBLD) capability is associated with the decoding capability of one or more of the single-layer profiles, such as the Main profile. When expressing the capabilities of a decoder for one or more single-layer profiles, whether the independent non-base layer decoding capability is supported for those profiles should also be expressed.

The independent non-base layer decoding capability, when supported, may indicate the capability of a decoder to decode an independent non-base layer that is indicated e.g. in the active VPSs and SPSs to conform to a single-layer profile and is the layer with the smallest nuh_layer_id value in an additional layer set.

When the profile_tier_level( ) syntax structure of HEVC is used for indicating of a decoder capability in systems, the independent non-base layer decoding capability may be indicated by setting the general_inbld_flag equal to 1 in the profile_tier_level( ) syntax structure used to express the profile, tier, and level that the decoder conforms to.

general_inbld_flag may be set equal to 1 in the HEVC profile_tier_level( ) syntax structures in which a single-layer profile is indicated and which are either specified in the VPS to be applicable for a non-base layer or included in an SPS activated for an independent non-base layer.

HEVC decoders having the independent non-base layer decoding capability and conforming to a specific single-layer profile at a specific level of a specific tier may be capable of decoding any independent non-base layer or a sub-layer representation with TemporalId equal to i of the independent non-base layer for which all of the following conditions apply for each active VPS:

There is an OLS that consists of the independent non-base layer and for which the associated profile_tier_level( ) syntax structure ptlStruct is constrained as follows:
  ptlStruct indicates that the independent non-base layer or the sub-layer representation conforms to a profile specified in Annex A.
  ptlStruct indicates that the independent non-base layer or the sub-layer representation conforms to a level lower than or equal to the specified level.
  ptlStruct indicates that the independent non-base layer or the sub-layer representation conforms to a tier lower than or equal to the specified tier.
  general_inbld_flag or sub_layer_inbld_flag[i] in ptlStruct is equal to 1.

A coding standard may include an independent non-base layer rewriting process, and such is specified for example in HEVC. Such a rewriting process may take a bitstream including an independent non-base layer as input and convert the independent non-base layer to become the base layer of an output bitstream of the process. Let a derived bitstream outBitstream be a bitstream which is derived by invoking the independent non-base layer rewriting process. Decoders with independent non-base layer decoding capability may apply the independent non-base layer rewriting process to obtain outBitstream and then apply a decoding process for a single-layer profile specified with outBitstream as input.

Random access point (RAP) pictures are used in streaming to provide functionality such as seeking and fast-forward play. In DASH, RAP pictures are also used to enable representation switching, which may be carried out as a response to player's rate adaptation logic to avoid the underflow of the reception buffer and to use the network throughput as efficiently as possible.

In order to support the client switching between different qualities and resolutions during the streaming session of DASH representations, random access point pictures may be encoded at the segment boundaries. Conventionally, only instantaneous RAP pictures, like the instantaneous decoding refresh (IDR) picture, that start a so-called closed group of pictures (GOP) prediction structure have been used at segment boundaries of DASH representations. The use of intra pictures starting open GOPs, i.e., CRA pictures in H.265/HEVC, has been improved in H.265/HEVC when compared to older standards, as a decoding process starting from a CRA picture has been normatively specified. When the decoding starts from a CRA picture, some pictures, referred to random access skipped leading (RASL) pictures, following the CRA picture in decoding order but preceding the CRA picture in output order may not be decodable. Consequently, if open GOPs were used at segment boundaries in DASH, representation switching would result into the inability to decode the RASL pictures and hence a picture rate glitch in the playback. For example, if a prediction hierarchy of 8 pictures were used and the picture rate were 25 Hz, the video would be frozen for about one third of a second.

Seamless representation switching may be enabled when representations use open GOP structures and share the same resolution and other characteristics, i.e. when a decoded picture of the source representation can be used as such as a reference picture for predicting pictures of a target representation. However, representations may not share the same characteristics, e.g., they may be of different spatial resolution, wherein seamless representation switching may need some further considerations.

In the following, some challenges regarding the seamless representation switching are disclosed in more detail.

Figure 8A:
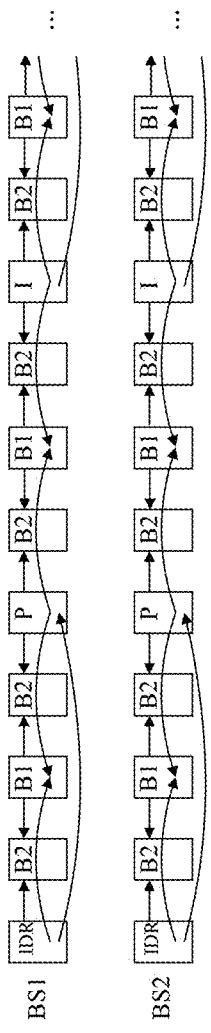
FIG. 8a shows an example of two bitstreams having leading pictures.

A proper handling of leading pictures may not be obvious. As an illustration of the challenges of handling leading pictures, an example is described below with reference to FIGS. 8a-8e. In this example, the output order of pictures runs from left to right. It is noted that the decoding order differs from the output order. In the example of FIG. 8a there are two bitstreams, BS1 and BS2. Pictures are indicated with rectangles, and the picture type is indicated within the rectangle: IDR, intra (I), inter (P), or bi-predicted (B). A value of temporal_id greater than 0 is indicated as a number after the picture type. Arrows indicate the inter prediction relationship: the source of an arrow is used as a reference picture for the picture the arrow is pointing to.

In the example, a switch from a first bit stream BS1 to a second bit stream BS2 is made at the I picture. An attention should be paid to the handling of the leading pictures (B2, B1, B2) immediately preceding the I picture in the output order.

Figure 8B:
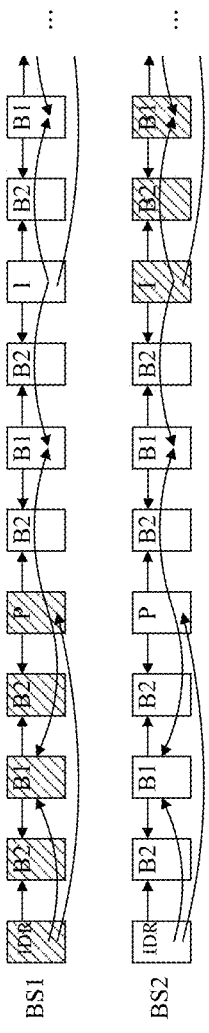
FIG. 8b illustrates an example of a situation in which decoding of leading pictures is omitted during switching from one bitstream to another bitstream.

Omission the decoding of ("non-decodable") leading pictures may cause a gap in the playback, which is not preferred. FIG. 8b illustrates this approach.

An approach might be to receive and decode the I picture from both bitstreams. Then, a choice can be made between two options. According to the first option, the leading pictures are received and decoded from the first (switching from) bit stream BS1. It is noted that usually the leading pictures of BS2 are also received, as they follow the I picture in decoding order. Another option is to receive and decode the leading pictures from the second (switching to) bit stream BS2. The leading pictures of the first bit stream BS1 need not be received or decoded. It is noted that the leading pictures from the second bit stream BS2 may not be perfectly reconstructed as some of their reference pictures in decoding originate from the first bit stream BS1, whereas the leading pictures of the second bit stream BS2 were encoded using reference pictures from BS2. Furthermore, this operation assumes that decoded pictures of BS1 are such that they can be used as reference pictures for decoding of pictures of BS2, i.e. generally that at least spatial resolution, chroma format, and bit depth of BS1 and BS2 are the same. When decoded pictures of BS1 are such that they are not suitable to be used as reference pictures for decoding of pictures of BS2, it is not possible to use this approach.

Figure 8C:
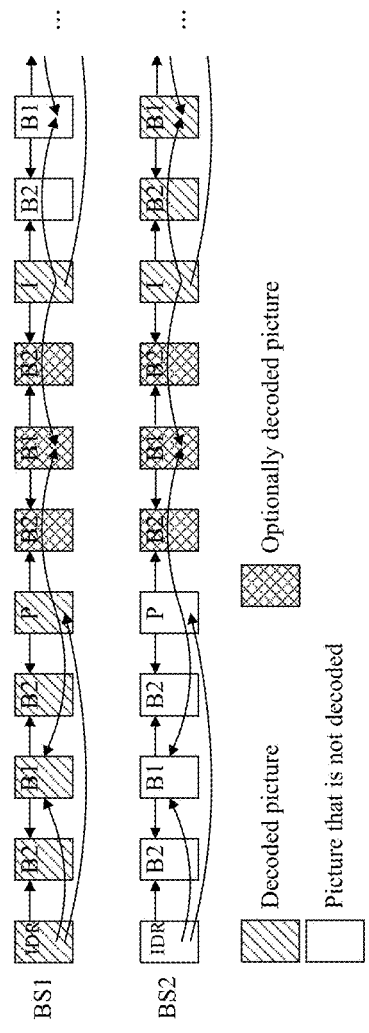
FIG. 8c illustrates an example of a situation in which an I picture from two bitstreams are received and decoded for switching from one bitstream to another bitstream.

In both the above mentioned options, two I pictures are received and decoded, which consumes transmission bandwidth and might cause a small pause in the playback due to slower than real-time decoding. FIG. 8c illustrates this approach. Moreover, DASH and alike services typically operate on Segment or Subsegment basis, where a sequence of pictures is requested and received rather than individual pictures. Hence, reception of two I pictures from different representations may not be practical.

Figure 8D:
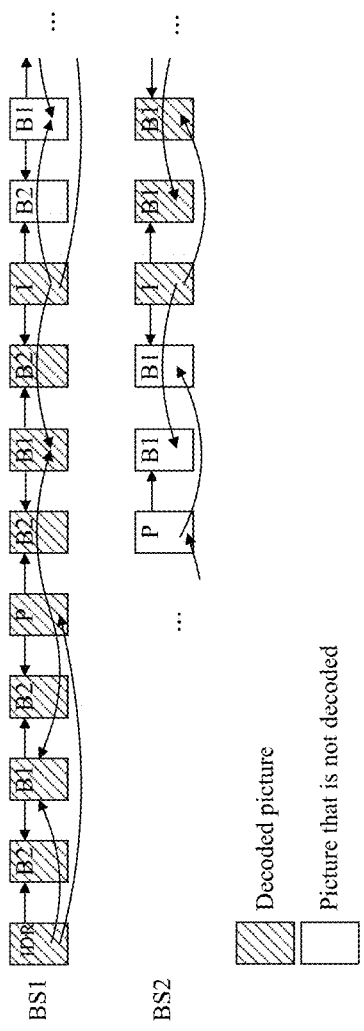
FIG. 8d illustrates an example of a situation in which decoding of leading pictures of the other bitstream is omitted during switching from one bitstream to another bitstream.

In general, the GOP pattern of the bitstreams need not be identical. Consequently, it may not be known whether decoded pictures from one bitstream can be used as reference pictures for the other bitstream. Thus, the leading pictures of the first bitstream can be decoded but not from the second bitstream. FIG. 8d provides an example of such situation. The leading pictures B1 of the second bit stream BS2 cannot be decoded as there is no reference picture in the first bit stream BS1 equivalent to the P picture of the second bit stream BS2.

Figure 8E:
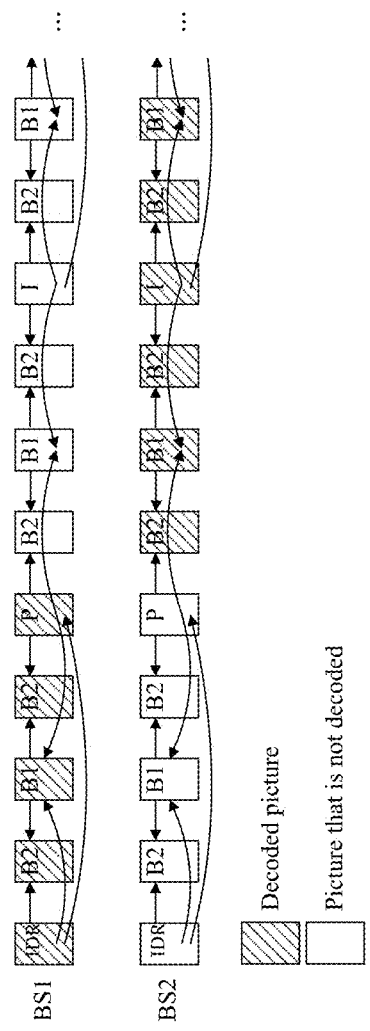
FIG. 8e illustrates an example of decoding operation during switching from one bitstream to another bitstream, in accordance with an embodiment.

An example decoding strategy according to an embodiment is described below with reference to FIG. 8e. In this example the GOP structures of two bitstreams are the same. This decoding approach may require decoding of only one of the intra pictures at the switch point, hence possibly improving real-time operation without pauses. The leading pictures of the second bitstream BS2 may not be perfectly reconstructed, but such a temporary degradation of image quality may usually not be perceived at all or is not considered annoying. The I picture and the leading pictures of BS1 need not be transmitted, which saves transmission bandwidth.

To summarize, it may not be easily determined in the receiver whether the intra picture and the leading pictures of the first bitstream BS1 should be received and decoded, or whether the leading pictures of the second bitstream BS2 can be decoded using reference pictures of the first bitstream BS1 when needed. Moreover, it is preferable to perform bit stream switching on Segment or Subsegment basis and avoid individual requests of transmission of a particular picture or particular pictures.

As an alternative of using open GOPs in representation switching closed GOPs could be used, wherein seamless playback may be achieved but may have inferior compression efficiency compared to the use of open GOPs.

Several embodiments are presented below for enabling representation switching in DASH or similar adaptive streaming so that a stable picture rate is maintained also during representation switching and an open GOP prediction structure is used to obtain a better compression efficiency than when a closed GOP prediction structure is used.

Figure 9A:
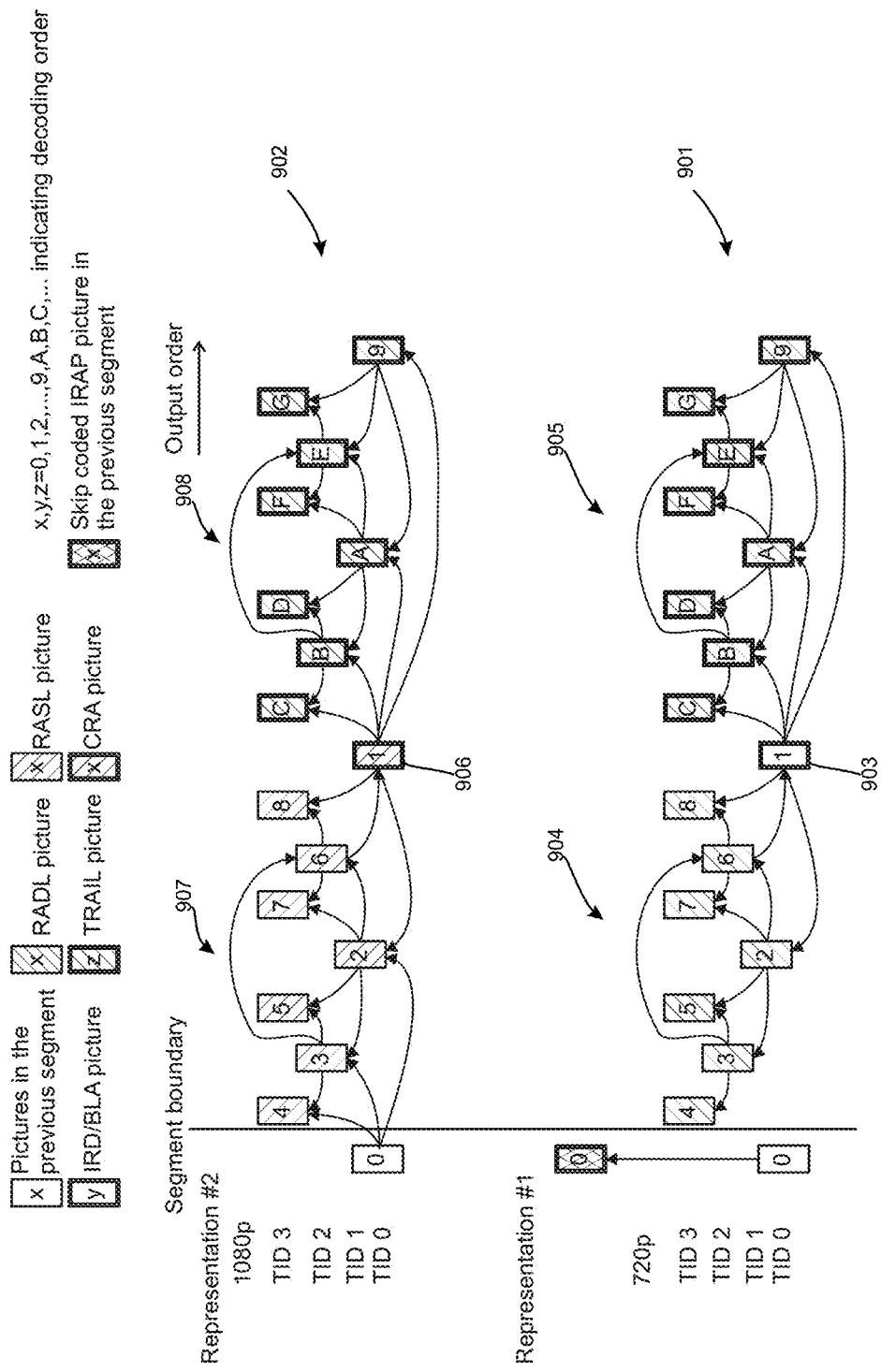
FIG. 9a illustrates an example of encoding and preparation of segments for a redundant adaptive resolution change, in accordance with an embodiment.
Figure 10:
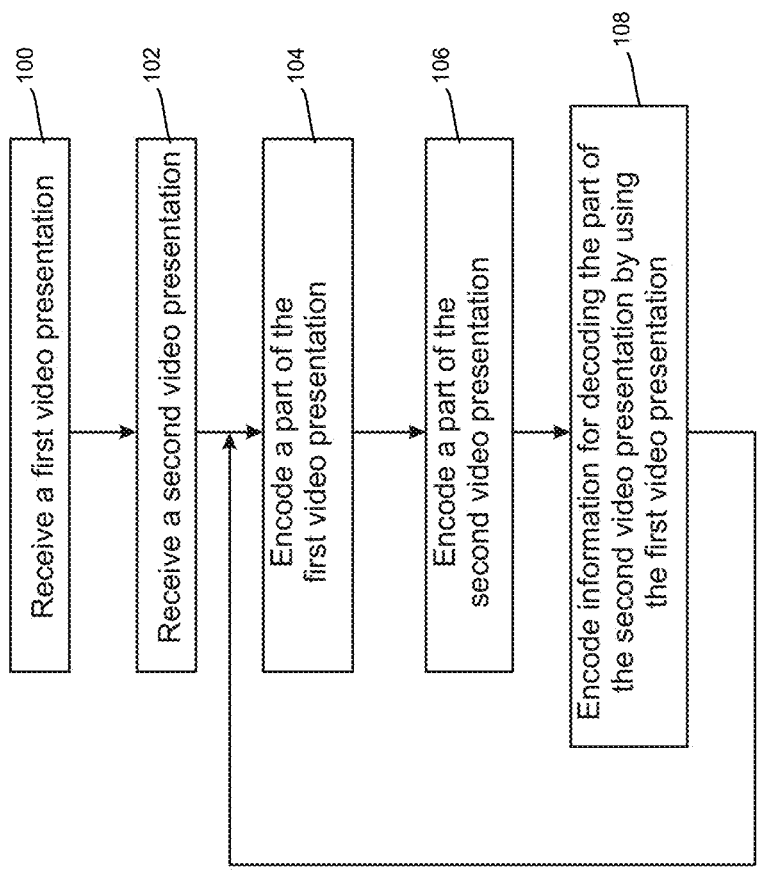
FIG. 10 shows a flow chart of an encoding method according to an embodiment of the invention.

In the following encoding and preparation of segments according to an embodiment is described in more detail with reference to FIGS. 9a and 10. This embodiment may be referred to as a redundant adaptive resolution change (RARC). An encoder may receive or otherwise obtain a first video presentation and a second video presentation or one or more parts of them (blocks 100 and 102 in FIG. 10). The first video presentation and the second video presentation may but need not be received or otherwise obtained in an uncompressed format in blocks 100 and 102. In some cases, a single video presentation may be obtained or otherwise received, and the first video presentation and/or the second video presentation may be obtained from the single video presentation by resampling, sample value scaling, and/or other processing. The encoder may encode the first bitstream (Representation #1) 901 (block 104), which in this example is a lower resolution representation. The encoder may encode one or more IDR/BLA pictures 903, leading pictures 904 (if any), such as RADL pictures, and trailing pictures 905 into the bitstream for the Representation #1. Respectively, the encoder may also encode the second bitstream (Representation #2) 902 (block 106), which in this example is a higher resolution representation. The encoder may encode one or more CRA pictures 906, leading pictures 907 (if any), such as RASL pictures, and trailing pictures 908 into the bitstream for the Representation #2. The encoder or another entity, such as an MPD creator or a file encapsulator, may encode information for decoding a part of Representation #2 by using Representation #1 (block 108).

In the redundant adaptive resolution change, the low-resolution bitstream may be coded conventionally e.g. as a single-layer H.265/HEVC bitstream, while the high-resolution bitstream may otherwise be a conventional single-layer bitstream, but the layer identifier (the nuh_layer_id syntax element) may be set equal to 1 (or some other non-zero value). Moreover, additional enhancement-layer skip-coded IRAP pictures (also called skip pictures below) may be created for each reference picture of high-resolution RASL pictures that precede the associated CRA picture in decoding order. This may be done only for those CRA pictures that start a Segment or a Subsegment. The skip pictures belong conceptually to the enhancement layer (with nuh_layer_id equal to 1) of the low-resolution bitstream, and they may be encapsulated in the segments of the low-resolution representation.

Figure 9B:
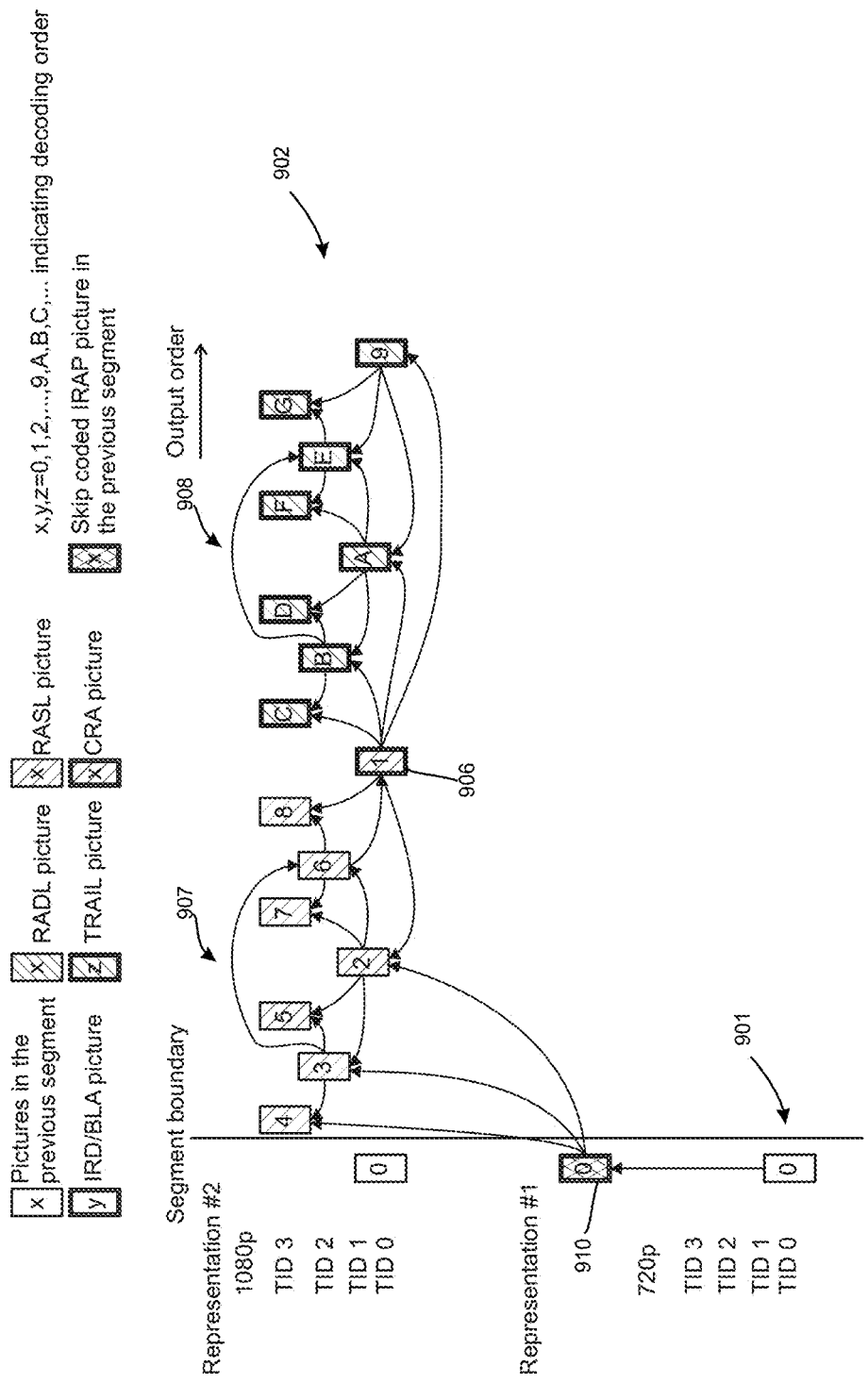
FIG. 9b illustrates an operation of the redundant adaptive resolution change method during up-switching, in accordance with an embodiment.
Figure 11:
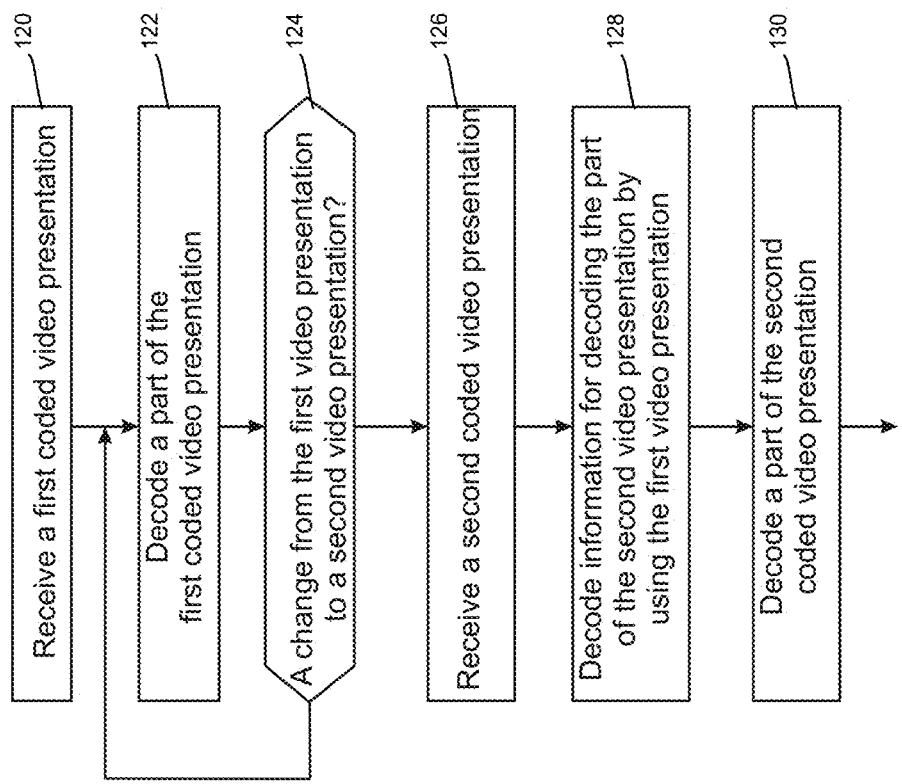
FIG. 11 shows a flow chart of a decoding method according to an embodiment of the invention.

The operation of the redundant adaptive resolution change method during up-switching is illustrated in FIG. 9b and in the flow diagram of FIG. 11, in accordance with an embodiment. When obtaining the low-resolution representation 901 (blocks 120 and 122 in FIG. 11), the player may also get the skip pictures 910 in each segment. The player or another entity, such as an MPD parser or file parser, may decode or parse information for decoding a part of the second coded video presentation by using first coded video presentation (block 128). The information may indicate that the first coded video presentation includes skip pictures 910 that may be used as a reference for prediction in decoding the part of the second coded video presentation. These skip pictures 910 may be utilized only when switching to the high-resolution representation 902 (blocks 124 and 126). The player utilizes the SHVC decoding process (or alike) during the up-switching and hence may decode the skip pictures 910. The next received segment is from the high-resolution representation 902 (block 130). The RASL pictures 907 of the first CRA 906 picture of the high-resolution representation also use pictures of the previous segment as reference. However, the decoder may now use the decoded skip pictures 910 instead. As the skip pictures are included in the bitstream to be decoded, the decoder may follow the SHVC decoding process (or alike) when decoding said next received segment (block 130) and may not need to create upsampled reference picture(s) using any non-normative process.

According to an embodiment, switching between representations of different spatial resolution, bit depth, color gamut and/or chroma format may be enabled through resampling and/or other processing.

The characteristics of non-overlapping (sub-)segment sequences may be signaled separately from the characteristics of individual representations or adaptation sets. In an embodiment utilizing redundant adaptive resolution change, non-overlapping (sub-)segment sequences may be indicated to be scalable video bitstreams which are constrained to utilize only the adaptive resolution change feature. In this embodiment, a conventional scalable video decoding process may be used, hence switching between heterogeneous representations utilizing the open GOP prediction structure may be enabled without changes in the standardized decoding processes.

A common decoding process for HEVC multi-layer extensions, specified in clause F.8 of HEVC version 2 (and its subclauses), gets the following two variables through external means: TargetOlsIdx, which specifies the index of the output layer set that the decoder uses; and HighestTid, which specifies the highest temporal sub-layer to be decoded.

The decoder may not be able to operate without setting these variables. Embodiments are therefore provided below for indicating these variables and associating them to combinations of profile-tier-level triplets.

In an embodiment, which may be applied together with or independently of other embodiments, the codecs parameter and/or any other MIME type parameter may provide information of at least one of the output layer set and/or the highest sub-layer that apply to the associated list of profile-tier-level values. For example, the following syntax and semantics may be used for each ListItem included in the codecs parameter (where the codecs parameter is a comma-separated list of ListItems, as described earlier):

Each ListItem may have the following structure: SampleEntryType1.ProfileTierLevel1(.SampleEntryTypeN. ProfileTierLevelN)*(#OutOpPoint)? where an asterisk ('*') indicates a repetition of 0 or more times, ('?') indicates an occurrence of zero or one times, '.' is a separator character, and '#' is another separator character dedicated to separate an output operation point sub-string OutOpPoint from a list of comma-separated profile-tier-level sub-strings. It should be understood that the separator character '.' may be equally any other separator character, or several different separator characters, possibly for different location or purpose, may be used. For example, a separator character '!' may be used instead of '.' in front of SampleEntryTypeN. Likewise, it should be understood that the separator character '#' may be equally any other separator character.

The syntax above for a ListItem may be understood to comprise one or more profile-tier-level sub-strings, separated by the separator character and zero or one output operation point sub-string, specified below, separated by the character '#' from the profile-tier-level sub-strings. The output operation point sub-string, if present, follows the profile-tier-level sub-strings.

The profile-tier-level sub-string may be specified as described earlier. More generally, the codecs parameter may be specified as described earlier except for the output operation point sub-string described next.

The output operation point sub-string, if present, may comprise the values in the following list, separated by period characters ("."):

Output layer set index for an output layer set included in each active video parameter set, encoded as a decimal number. The necessary layers of the indicated output layer set should conform to the profile-tier-level information indicated in the ListItem. This output layer set index may be used as the TargetOlsIdx value provided as input to the HEVC decoding process. The output layer set index should be provided for HEVC bitstreams not containing an HEVC base layer. When not present, the output layer set index may be inferred to be equal to 0.

Highest TemporalId value, encoded as a decimal number, corresponding to the profile-tier-level information given to all necessary layers. This highest TemporalId value may be used as the HighestTid value provided as input to the HEVC decoding process. When not present, the highest TemporalId value may be inferred to be equal to 6.

In the following, some examples of values of codecs are provided (assuming separator character '#' between profile-tier-level sub-strings):

codecs=hev1.A1.80.L93.B0!hev1.A7.1.L120.B0#2 may indicate a two-layer, progressive, non-packed stream, where the track containing the base layer uses the sample entry type 'hev1', the base layer conforms to the Main Profile, Main Tier, Level 3.1, the track containing the enhancement layer uses the sample entry type 'hev1' (e.g., it may be contained in the track that also contains the base layer), the enhancement layer conforms to Scalable Main Profile, Main Tier, Level 4. The output layer set index containing the enhancement layer and the base layer as necessary layers is 2.

codecs=lhv1.A7.1.L120.B0#2, hev1.A1.80.L93.B0#1 may indicate a two-layer, progressive, non-packed stream, where the track containing the enhancement layer uses the sample entry type the enhancement layer conforms to Scalable Main Profile, Main Tier, Level 4, the track containing the base layer uses the sample entry type 'hev1', and the base layer conforms to the Main Profile, Main Tier, Level 3.1. The output layer set index containing the enhancement layer and the base layer as necessary layers is 2, while output layer set index containing the base layer only is 1.

codecs=lhv1.A7.1.L120.B0#1, avc1.64081F #1 may indicate that the track containing the enhancement layer uses the sample entry type the enhancement layer conforms to Scalable Main Profile, Main Tier, Level 4, the enhancement layer contains progressive, non-packed pictures, and the enhancement layer predicts from an AVC-coded base layer. The AVC-coded base layer uses the sample entry type 'avc1', and the base layer conforms to the Progressive High Profile, Level 3.1. The output layer set index containing the enhancement layer and the base layer as necessary layers is 1.

In some embodiments, the codecs parameter specified in earlier embodiments or similar to earlier embodiments may be used with other container file types than ISOBMFF. For example, in some embodiments, the codecs parameter specified in earlier embodiments or similar to earlier embodiments may be used with the CODECS attribute of the EXT-X-STREAM-INF tag of the playlist file of HTTP Live Streaming (HLS). This may enable signaling of one or more of profile-tier-level lists (corresponding to layers), output layer set index to be used in decoding, and the highest sub-layer to be used in decoding within the playlist file. In another example, a new attribute of the EXT-X-STREAM-INF tag or another tag of the playlist file of HTTP Live Streaming (HLS) may be defined to carry one or more of profile-tier-level lists (corresponding to layers), output layer set index to be used in decoding, and the highest sub-layer to be used in decoding within the playlist file.

In an embodiment, which may be applied together with or independently of other embodiments, at least one of the output layer set and the highest sub-layer that apply to the associated list of profile-tier-level values may be provided in a manifest, such as an MPD of DASH.

It is asserted that straightforward means to conclude the values of these two variables from the MPD may be needed due to the following reasons.

First, using @dependencyId to conclude which Representations (and consequently layers) are necessary for decoding a selected Representation (corresponding to a particular layer or particular layers) would be possible. After that, this list of layers could be used to identify a layer set within the active video parameter set(s). Not only this may require video parameter set parsing in the player (outside the decoder), but also the same set of layers may be associated with more than one output layer set, and hence it may not be possible in all situations to conclude which output layer set should be selected as the target output layer set.

Second, the MPD contains no information that enables associating a highest temporal sub-layer to the Representation.

In an embodiment, the at least one of the output layer set and the highest sub-layer that apply to the associated list of profile-tier-level values may be indicated within a MIME type including parameters, and the MIME type is provided in a manifest, such as an MPD of DASH. For example, the @mimeType attribute of DASH MPD may include an indication of the at least one of the output layer set and the highest sub-layer.

In an embodiment, the at least one of the output layer set and the highest sub-layer that apply to the associated list of profile-tier-level values may be indicated within a codecs parameter and/or any other MIME parameter, and the codecs parameter and/or any other MIME parameter is provided in a manifest, such as an MPD of DASH. For example, the @codecs attribute of DASH MPD may include an indication of the at least one of the output layer set and the highest sub-layer.

In an embodiment, the at least one of the output layer set and the highest sub-layer that apply to the associated list of profile-tier-level values may be indicated within specific attributes or such in a manifest, such as an MPD of DASH.

In an embodiment, the at least one of the output layer set and the highest sub-layer that apply to the associated list of profile-tier-level values may be indicated within essential descriptors or such in a manifest, such as an MPD of DASH. As TargetOlsIdx and HighestTid are specific to HEVC, they may be indicated with descriptors (as defined for DASH MPD) rather than generic attributes. Furthermore, as TargetOlsIdx and HighestTid may be required for correct multi-layer HEVC decoding, they may be provided with an EssentialProperty descriptor.

The EssentialProperty descriptors with @schemeIdURI equal to "urn:mpeg:dash:hevc:2015" may provide the target output layer set(s) and highest temporal sub-layer(s) associated with the AdaptationSet, Representation, or SubRepresentation containing the EssentialProperty descriptor.

The @value parameter of the EssentialProperty descriptor with @schemeIdURI equal to "urn:mpeg:dash:hevc:2015" may have the following syntax and semantics.

```
<!-- HevcDescriptor -->
    <xs:complexType name="HevcDescriptorType">
        <xs:sequence>
            <xs:element name="OutputOp" type="OutputOpType"
                maxOccurs="unbounded"/>
            <xs:any namespace="##other" processContents="lax"
                minOccurs="0"
maxOccurs="unbounded"/>
        </xs:sequence>
        <xs:anyAttribute namespace="##other" processContents="lax"/>
    </xs:complexType>
    <!-- Output operation point -->
    <xs:complexType name="OutputOpType">
        <xs:sequence>
            <xs:any namespace="##other" processContents="lax"
                minOccurs="0"
maxOccurs="unbounded"/>
        </xs:sequence>
        <xs:attribute name="targetOlsIdx" type="xs:unsignedInt"
            use="required"/>
        <xs:attribute name="highestTid" type="xs:unsignedInt"
            use="required"/>
        <xs:attribute name="outputOpCodecs" type="xs:unsignedInt"/>
        <xs:attribute name="outputReps" type="xs:string"/>
        <xs:anyAttribute namespace="##other" processContents="lax"/>
    </xs:complexType>
```

In the following, the elements and attribute names of the above syntax are described in more detail, in accordance to an embodiment.

OutputOp may have values 1 . . . N and it specifies an output operation point including the Representation or Sub-Representation that contains this EssentialProperty descriptor. For the semantics below, the containing Representation or Sub-Representation refers to the Representation or Sub-Presentation corresponding to the Representation or Sub-Representation element that contains this EssentialProperty descriptor. When this EssentialProperty descriptor is included in AdaptationSet, the containing Representation refers to any single Representation within AdaptationSet.

@targetOlsIdx, which may be mandatory, specifies the index of the output layer set associated with the output operation point.

@highestTid, which may be mandatory, specifies the TemporalId value of the highest sub-layer associated with the output operation point.

@outputOpCodecs, which may be optional, specifies the codecs parameter for the output operation point. The contents of this attribute should conform to either the simp-list or fancy-list productions of RFC6381, Section 3.2, without the enclosing DQUOTE characters. The simp-list or fancy-list used as the contents of this attribute should consist of one list element constrained as specified in the following paragraphs.

The codec identifier starting the value of the codecs parameter should be the same as that applying to the containing Representation or Sub-Representation.

The list element should include a profile-tier-level sub-string for each necessary layer in the output operation point.

Each profile-tier-level sub-string should include the profile and level information.

@outputReps, which may be optional, specifies a whitespace-separated list of @id values of Representations whose layers are output layers in the output operation point. When this attribute is not present, the output layers of the output operation point are those that are present in the containing Representation or Sub-Representation. When this attribute is present, the output layers of the output operation point are those that are present in the containing Representation or Sub-Representation and those that are present in the Representations with @id equal to any element in the list @outputReps.

In the following, an example is provided:

```
<?xml version="1.0" encoding="UTF-8"?>
<MPD
    xmlns:xsi="http://www.w3.org/2001/XMLSchema-instance"
    xmlns="urn:mpeg:dash:schema:mpd:2011"
    xsi:schemaLocation="urn:mpeg:dash:schema:mpd:2011 DASH-MPD.xsd"
    type="static"
    mediaPresentationDuration="PT30S"
    minBufferTime="PT10.00S"
    profiles="urn:mpeg:dash:profile:isoff-main:2011">
    <BaseURL>http://www.example.com/</BaseURL>
    <!-- In this Period there are 3 views: coming from three lined up cameras: C1-C2-C3.
                C1+C2 and C2+C3 each form a stereo pair but C1+C3 does not.
                C2 is taken as the base view for MV-HEVC while C1 and C3 are enhancement
views -->
    <Period start="PT0.00S" duration="PT30.00S">
        <SegmentList>
            <Initialization sourceURL="seg-m-init.mp4"/>
        </SegmentList>
        <AdaptationSet mimeType="video/mp4" codecs="hev1.A1.80.L93.B0">
            <Role schemeIdUri="urn:mpeg:dash:stereoid:2011" value="l1 r0"/>
            <Representation id="C2" bandwidth="2000000">
                <SegmentList duration="10">
                    <SegmentURL media="seg-m1-C2view-1.mp4"/>
                    <SegmentURL media="seg-m1-C2view-2.mp4"/>
                    <SegmentURL media="seg-m1-C2view-3.mp4"/>
                </SegmentList>
            </Representation>
        </AdaptationSet>
        <!-- The following Adaptation set contains a Representation functionally identical
                    to the Representation in the previous Adaptation set. Therefore, these both
                    have the same Representation@id. This is done for compatibility to 2D receivers
                    that do not understand the schemeIdURI of the Role Descriptor and may ignore
the
                    Adaptation set -->
        <AdaptationSet mimeType="video/mp4" codecs="hev1.A1.80.L93.B0">
            <Representation id="C2" bandwidth="2000000">
                <SegmentList duration="10">
                    <SegmentURL media="seg-m1-C2view-1.mp4"/>
                    <SegmentURL media="seg-m1-C2view-2.mp4"/>
                    <SegmentURL media="seg-m1-C2view-3.mp4"/>
                </SegmentList>
            </Representation>
        </AdaptationSet>
        <!-- The following Adaptation set contains the view C1.
                    Views C1 and C2 form an output layer set with index 1. -->
        <AdaptationSet mimeType="video/mp4" codecs="lhv1.A6.2.L93.B0">
            <Role schemeIdUri="urn:mpeg:dash:stereoid:2011" value="l0"/>
            <EssentialDescriptor schemeIdUri="urn:mpeg:dash:hevc:2015" value="
                <OutputOp targetOlsIdx=\"1\" highestTid=\"6\" outputReps=\"C2\"/>
"/>
            <Representation id="C1" dependencyId="C2" bandwidth="1000000">
                <SegmentList duration="10">
                    <SegmentURL media="seg-m1-C1view-1.mp4"/>
                    <SegmentURL media="seg-m1-C1view-2.mp4"/>
                    <SegmentURL media="seg-m1-C1view-3.mp4"/>
                </SegmentList>
            </Representation>
        </AdaptationSet>
        <!-- The following Adaptation set contains the view C3.
                    Views C3 and C2 form an output layer set with index 2. -->
```

```
        <AdaptationSet mimeType="video/mp4" codecs="lhv1.A6.2.L93.B0">
            <Role schemeIdUri="urn:mpeg:dash:stereoid:2011" value="r1"/>
            <EssentialDescriptor schemeIdUri="urn:mpeg:dash:hevc:2015" value="
                <OutputOp targetOlsIdx=\"2\" highestTid=\"6\" outputReps=\"C2\"/>
            "/>
            <Representation id="C3" dependencyId="C2" bandwidth="1000000">
                <SegmentList duration="10">
                    <SegmentURL media="seg-m1-C3view-1.mp4"/>
                    <SegmentURL media="seg-m1-C3view-2.mp4"/>
                    <SegmentURL media="seg-m1-C3view-3.mp4"/>
                </SegmentList>
            </Representation>
        </AdaptationSet>
    </Period>
</MPD>
```

In an embodiment, which may be applied together with or independently of other embodiments, characteristics that apply and/or are needed for decoding a sequence of non-overlapping consecutive segments (or respectively subsegments) is encoded into an MPD (or any other manifest) and/or parsed from the MPD (or any other manifest). The representations from which the segments (or respectively subsegments) may originate may be indicated in the MPD or parsed from the MPD. The characteristics may include but are not limited to one or more of the following:

The codecs or coding formats to which the sequence conforms to.

The list of profile-tier-level values or such to which the sequence conforms to.

The output layer set index which can be used as the target output layer set index (e.g. TargetOlsIdx of HEVC) when decoding the sequence.

The highest TemporalId (or such, e.g. HighestTid of HEVC) which can be used when decoding the sequence.

Adaptive resolution change related information, e.g. single_layer_for_non_irap_flag of HEVC or both single_layer_for_non_irap_flag and higher_layer_irap_skip_flag of HEVC, or similar information.

Layer identifier values (or such, e.g. nuh_layer_id values of HEVC) included in the sequence.

Layer identifier values (or such) of necessary layers included in the sequence.

Layer identifier values (or such) of output layers included in the sequence.

Information on alternative output layers, e.g. the value of alt_output_layer_flag of HEVC for the output layer set represented by the sequence.

Video parameter set(s) which may be activated when decoding the sequence.

Other parameter set(s), such as sequence parameter sets and/or picture parameter sets, which may be activated when decoding the sequence.

Scalability identifier values (or such, e.g. in HEVC: ScalabilityId[i] for i in the range of 0 to 15) for the layers included in the sequence.

Information related to implicit reference picture resampling, capable of indicating for example one of the following: no implicit resampling is suggested, implicit resampling may be needed. Additionally or alternatively, the characteristics may comprise a limit of the number of pictures that may need to be resampled when switching representations. The information related to implicit reference picture resampling may be given separately for up-switching and down-switching and/or for each pair of representations or groups of representations between which the switching happens.

The above-mentioned characteristics may be indicated similarly or identically to any option, combination or subset of the signaling for profile-tier-level combinations and output operation points as presented earlier. For example, the above-mentioned characteristics may be included as MIME parameter values and the MIME type, including its parameters, may be provided for the sequence of non-overlapping consecutive segments (or respectively subsegments) within the MPD, or may be parsed for the sequence of non-overlapping consecutive segments (or respectively subsegments) from the MPD.

In an embodiment, the above-mentioned characteristics are encoded into a supplemental structure within an MPD (or any other manifest). The supplemental structure is such that may but is not required to be processed by a client or alike. In an embodiment, the above-mentioned characteristics are parsed from a supplemental structure of the MPD (or any other manifest).

In an embodiment, the above-mentioned characteristics are accompanied by one or more of the following pieces of information, which may be encoded into an MPD (or any other manifest) and/or parsed from the MPD (or any other manifest):

Information indicative of one or more of: the above-mentioned characteristics apply to a sequence of non-overlapping consecutive segments, the above-mentioned characteristics apply a sequence of non-overlapping consecutive subsegments.

Identification, such as identifier values, of representations to which the above-mentioned characteristics apply. These identified representations may be referred to as a switching set.

In an embodiment, the representations to which the above-mentioned characteristics apply are inferred. For example, when the characteristics are indicated for one representation of an Adaptation Set, it may be inferred that the characteristics apply to all representations of the same Adaptation Set. The representations to which the above-mentioned characteristics apply may be referred to as a switching set.

In an embodiment, the above-mentioned characteristics apply to a sequence of non-overlapping segments or subsegments, which can originate from any representation in the switching set. In another embodiment, the above-mentioned characteristics apply to a sequence of non-overlapping segments or subsegments which originate representations in the switching set where constraints may be placed on the representations from which consecutive segments or subsegments in the sequence can originate. For example, it may be required that consecutive segments or subsegments originate from the same or consecutive representations, where representations may be ordered for example based on the identifier values or bitrates.

In an embodiment, a supplemental property descriptor including the above-mentioned characteristics is encoded into an MPD (or any other manifest) and/or parsed from the MPD (or any other manifest).

In an embodiment, a supplemental property descriptor including the above-mentioned characteristics also includes one or more of:
- Information indicative of one or more of: the above-mentioned characteristics apply to a sequence of non-overlapping consecutive segments, the above-mentioned characteristics apply a sequence of non-overlapping consecutive subsegments.
- Identification, such as identifier values, of representations to which the above-mentioned characteristics apply. These identified representations may be referred to as a switching set.

In an embodiment, a supplemental property descriptor is specified as follows or in a similar manner.

The SupplementalProperty descriptors with @schemeIdURI equal to "urn:mpeg:dash:hevc:segseq:2015" (or any other chosen URN to indicate the described embodiment, when it applies to Segments) may provide characteristics of a sequence of consecutive Segments of more than one identified Representation. The SupplementalProperty descriptors with @schemeIdURI equal to "urn:mpeg:dash:hevc:subsegseq:2015" (or any other chosen URN to indicate the described embodiment, when it applies to Subsegments) may provide characteristics of a sequence of consecutive Subsegments of more than identified Representation. Both these descriptor types may have the same syntax and semantics, specified e.g. as follows:

The @value of the SupplementalProperty with @schemeIdURI equal to "urn:mpeg:dash:hevc:segseq:2015" or "urn:mpeg:dash:hevc:subsegseq:2015" is a comma separated list of the following values (in the order listed below):
- A whitespace-separated list of @id values of Representations from which Segments or Subsegments may be included in the sequence of consecutive Segments or Subsegments, respectively.
- The codecs parameter and/or any other MIME media parameters indicative of the profile-tier-level combination or alike, applying to the sequence of Segments or Subsegments. For example, the codecs parameter as specified earlier may include one ListItem that applies to the sequence of Segments or Subsegments. The codecs parameter may be required to indicate a codec from the HEVC family.
- The 2-digit binary mask string of single_layer_for_non_i-rap and higher_layer_irap_skip_flag syntax elements of HEVC that are in force for the sequence of Segments SegSeq or for the sequence Subsegments SeqSubSeq (as specified below). The allowed binary mask values are '00', '10' and '11'.

It needs to be understood that in addition to or instead of the codecs parameter and the 2-digit binary mask string, other parameters indicative of the same or similar properties may be included in the syntax of the @value attribute. For example, the @value attribute may include the MIME type, including its MIME parameters, that applies to the sequence of consecutive Segments or Subsegments.

Let R1 be the Representation containing the SupplementalProperty with @schemeIdURI equal to "urn:mpeg:dash:hevc:segseq:2015" or "urn:mpeg:dash:hevc:subsegseq:2015", and let R2, R3, . . . , RN be the Representations identified by their @id values given in @value of the SupplementalProperty. Representations R1, R2, . . . , RN may be required to be included in the same Adaptation Set and may be required to have the same number M of Media Segments.

When the SupplementalProperty with @schemeIdURI equal to "urn:mpeg:dash:hevc:segseq:2015" is present, the following may apply:

Let
$S_{i,j}$, for j>0, be the jth Media Segment in the i-th Representation (i.e., Ri)
if present, let $S_{i,0}$ be the Initialization Segment in the i-th Representation, and
if present, let $B_i$ be the Bitstream Switching Segment in the i-th Representation.

$S_{i,j}$ may be required to be non-overlapping with $S_{m,n}$ for any values of i and m in the range of 1 to N, inclusive, and j and n in the range of 1 to M, inclusive, such that i is not equal to m, and j is not equal to n.

Let SegSeq be the sequence of the following Segments:
The Initialization Segment $S_{1,0}$, when present
If Bitstream Switching Segments are present,
$B_{i(1)}$, $S_{i(1),1}$, $S_{i(2)}$, $S_{i(2),2}$, . . . , $B_{i(k)}$, $S_{i(k),k}$, $B_{i(M)}$, $S_{i(M),M}$
else
$S_{i(1),1}$, $S_{i(2),2}$, . . . , $S_{i(k),k}$, . . . , $S_{i(M),M}$,
wherein any i(k) for all k values in the range of 1 to M, respectively, is an integer value in the range of 1 to N.

Any SeqSeq may result in a "conforming Segment sequence" with the media format as specified in the codecs parameter provided within @value of the SupplementalProperty.

Any SegSeq may provide continuous playout and may have an acceptable quality.

When the SupplementalProperty with @schemeIdURI equal to "urn:mpeg:dash:hevc:subsegseq:2015" is present, the following may apply:

Let
$S_{i,j,k}$, for j>0, be the $k^{th}$ Subsegment of the $j^{th}$ Media Segment in the $i^{th}$ Representation (i.e., $R_i$)
$L_{i,j}$ be equal to the number of Subsegments in the of the $j^{th}$ Media Segment in the $i^{th}$ Representation.
if present, let $S_{i,0}$ be the Initialization Segment in the i-th Representation, and
if present, let $B_i$ be the Bitstream Switching Segment in the i-th Representation.

$L_{i,j}$ may be required to be equal to $L_{h,j}$ for any values of h and i in the range of 1 to N, inclusive, such that h is not equal to i. Let $L_j$ be equal to $L_{i,j}$ for any value of i in the range of 1 to N, inclusive. Let L be equal to the sum of $L_j$ for all values of j in the range of 1 to M, inclusive.

$S_{i,j,k}$ may be required to be non-overlapping with $S_{m,n,o}$ for any values of i and m in the range of 1 to N, inclusive, and j and n in the range of 1 to M, inclusive, and k and o in the range of 1 to the number of Subsegments in the Segment, inclusive, such that i is not equal to m, and j is not equal to n, and k is not equal to o.

Let Sub SegSeq be the sequence of the following Segments and Subsegments:
The Initialization Segment $S_{1,0}$, when present
If Bitstream Switching Segments are present,
$B_{i(1)}$, $B_{i(1),1,1}$, $B_{i(2)}$, $S_{i(2),1,2}$, . . . , $B_{i(L1)}$, $S_{i(L1),1,L1}$, $B_{i(L1+1)}$, $S_{i(L1+1),2,1}$, $B_{i(L1+2)}$, $S_{i(L1+2),2,2}$, . . . , $B_{i(\alpha)}$, $S_{i(\alpha),j,k}$, . . . , $B_{i(L)}$, $S_{i(L),M,LM}$, else
$S_{i(1),1,1}, S_{i(2),1,2}, \ldots, S_{i(L1),1,L1}, S_{i(L1+1),2,1},$
$S_{i(L1+2),2,2}, \ldots, S_{i(\alpha)j,k}, \ldots, S_{i(L),M,LM},$
wherein any i(a) for all a values in the range of 1 to L, respectively, is an integer value in the range of 1 to N.

Any Sub SeqSeq may result in a "conforming Segment sequence" with the media format as specified in the codecs parameter provided within @value of the Supplemental-Property.

Any SubSegSeq may provide continuous playout and may have an acceptable quality.

In the following, an example is provided:

is included. The track of the skip pictures of the low-resolution representation has the same track identifier value (e.g. track_id) as the track containing the high-resolution representation. The sample entry of the track containing skip pictures may indicate layered coding, e.g. use sample entry types 'lhv1' or 'lhe1', and/or may be indicated to require decoding of a multi-layer profile, such as the Scalable Main profile of HEVC. The track containing the base layer of the low-resolution representation and the track containing the high-resolution representation may indicate single-layer coding, e.g. use sample entry types 'hvc1' or 'hev1', and/or may be indicated to require decoding of a single-layer

```
<?xml version="1.0" encoding="UTF-8"?>
<MPD
    xmlns:xsi="http://www.w3.org/2001/XMLSchema-instance"
    xmlns="urn:mpeg:dash:schema:mpd:2011"
        xsi:schemaLocation="urn:mpeg:dash:schema:mpd:2011 DASH-MPD.xsd"
    type="static"
    mediaPresentationDuration="PT3256S"
    minBufferTime="PT1.2S"
    profiles="urn:mpeg:dash:profile:isoff-main:2011">
    <BaseURL>http://cdn1.example.com/</BaseURL>
    <BaseURL>http://cdn2.example.com/</BaseURL>
    <Period>
        <AdaptationSet
            segmentAlignment="true"
            frameRate="30">
            <!-- 720p Representation -->
            <Representation
                mimeType="video/mp4"
                <!-- HEVC Main profile, Main tier, Level 3.1, progressive and non-packed content -->
                codecs="hev1.A1.80.L93.B0"
                id="v720p"
                startWithSAP="2"
                width="1280"
                height="720"
                bandwidth="1500000">
                <BaseURL>video-720p.mp4</BaseURL>
                <SegmentBase indexRange="0-4332"/>
                <!-- When Segments of the 720p and 1080p Representations are concatenated,
                    the resulting Segment sequence conforms to a two-layer bitstream, where
                    the base layer is HEVC Main profile, Main tier, Level 3.1 and the enhancement
                    layer is HEVC Scalable Main Profile, Main tier, Level 4. Futhermore,
                    the resulting Segment sequence is constrained so that
                    single_layer_for_non_irap_flag is equal to 1 and higher_layer_irap_skip_flag
                    is equal to 1. -->
                <SupplementalDescriptor schemeIdUri="urn:mpeg:dash:hevc:seqseq:2015"
                    value="v1080p,hev1.A1.80.L93.B0!lhe1.A7.1.L120.B0,11"/>
            </Representation>
            <!-- 1080p Representation -->
            <Representation
                mimeType="video/mp4"
                <!-- HEVC Main profile, Main tier, Level 4, progressive and non-packed content,
                    general_inbld_flag is equal to 1 to indicate that the VCL NAL units of the
                    Representation are not in the base layer. -->
                codecs="hev1.A1.80.L120.B0.0.0.0.0.1"
                id="v1080p"
                startWithSAP="3"
                width="1920"
                height="1080"
                bandwidth="3000000">
                <BaseURL>video-1080p.mp4</BaseURL>
                <SegmentBase indexRange="0-3752"/>
            </Representation>
        </AdaptationSet>
    </Period>
</MPD>
```

In an embodiment, which may be applied together with or independently of other embodiments, bitstreams or representations according to RARC, e.g. those described with FIGS. 9a and 9b, are encapsulated in a file format and/or a transport format as follows. The low-resolution representation is included in a file or segment different from that or those, respectively, where the high-resolution representation profile, such as the Main profile of HEVC, and/or may be indicated to require INBLD capability.

In an embodiment, which may be applied together with or independently of other embodiments, a streaming client or player may operate as follows when receiving representations according to RARC that have been encapsulated as described in the previous paragraph. The player may continue to use the initialization segment of the low-resolution representation when switching to receive the high-resolution representation. Consequently, the sample entry for the track containing the high-resolution representation may indicate layered coding, e.g. sample entry types 'lhv1' or 'lhe1', and/or may indicate a multi-layer profile. Thus, the player may conclude that the combination of the received tracks of the low-resolution representation and the high-resolution representation represents a scalable video bitstream and may require decoding capability of a multi-layer profile.

In an embodiment, which may be applied together with or independently of other embodiments, redundant skip pictures may be utilized as follows. This embodiment may be referred to as redundant adaptive resolution change for switching to dependent representation (RARC-D). A low-resolution representation may be coded conventionally e.g. as a single-layer H.265/HEVC bitstream, while the high-resolution representation may be coded as a predicted layer, i.e. as a dependent representation, in which at least some pictures may be inter-layer predicted from picture(s) of the low-resolution representation. Moreover, additional enhancement-layer skip pictures may be created for each reference picture of high-resolution RASL pictures that precede the associated CRA picture in decoding order. This may be done only for those CRA pictures that start a Segment or a Subsegment. The skip pictures belong conceptually to the enhancement layer (e.g. with nuh_layer_id equal to 1) of the low-resolution representation, and they may be encapsulated in the segments of the low-resolution representation.

In an embodiment, which may be applied together with or independently of other embodiments, a streaming client or player may operate as follows when receiving representations according to RARC-D. The player first receives segment(s) of a low-resolution representation. The player then determines to switch to higher resolution and requests corresponding segment(s) of both low-resolution and high-resolution representation. When switching up, the player may decode the skip picture(s) of the last segment for which only the low-resolution representation is received. These skip picture(s) may be used as reference when decoding the RASL pictures of the initial CRA picture of the first received segment of the high-resolution representation. Determining to switch up may result for example from rate adaptation or fast startup.

Figure 9C:
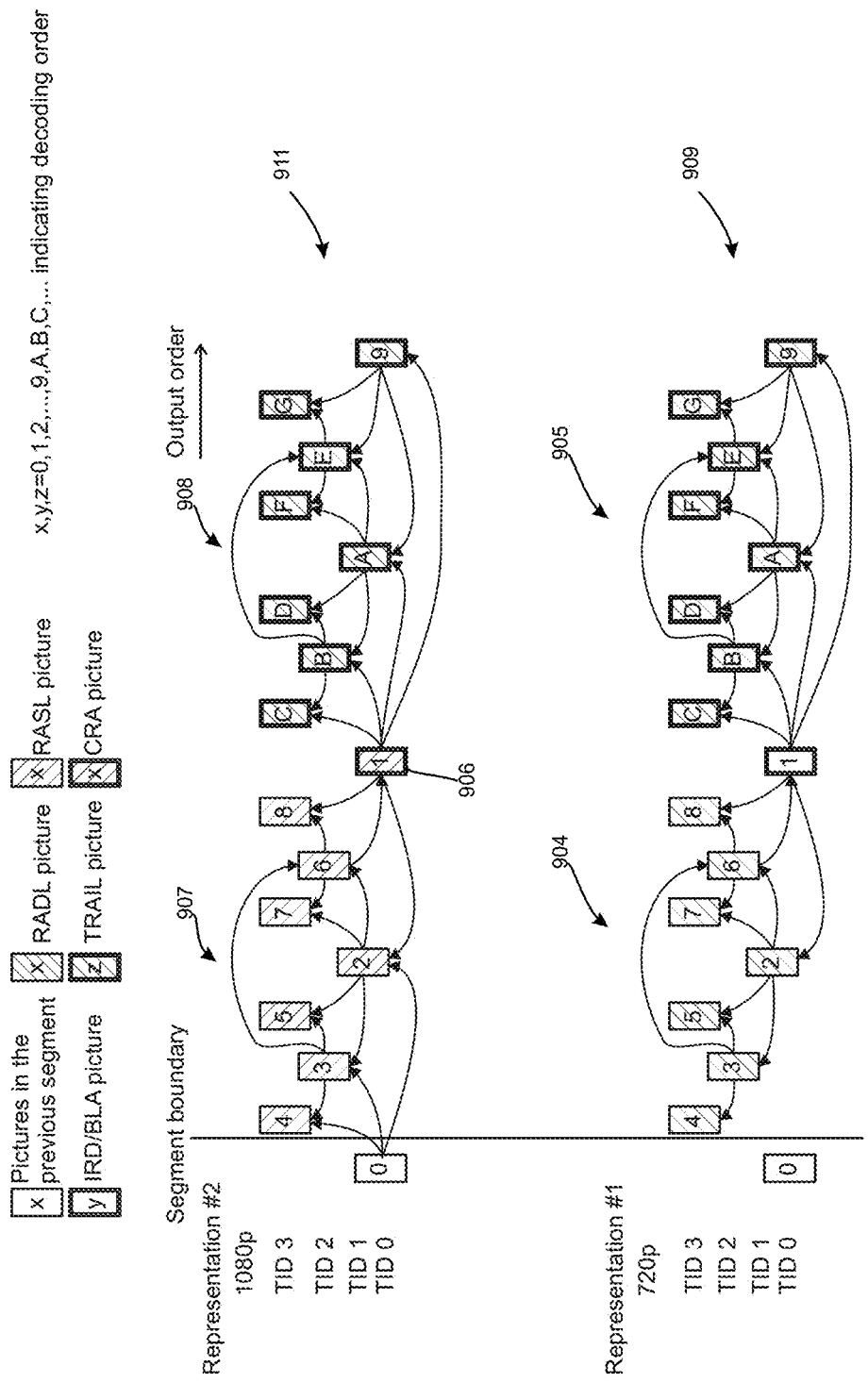
FIG. 9c illustrates an example of encoding and preparation of segments for implicit reference picture resampling method, in accordance with an embodiment.

FIG. 9c illustrates encoding and preparation of segments according to one embodiment. This embodiment may be referred to as implicit reference picture resampling (IRPR).

Both the low-resolution representation 909 and the high-resolution representation 911 may be encoded as ordinary single-layer H.265/HEVC bitstreams. The low-resolution representation 909 may be coded using closed GOPs, while the high-resolution representation 911 uses open GOPs.

Figure 9D:
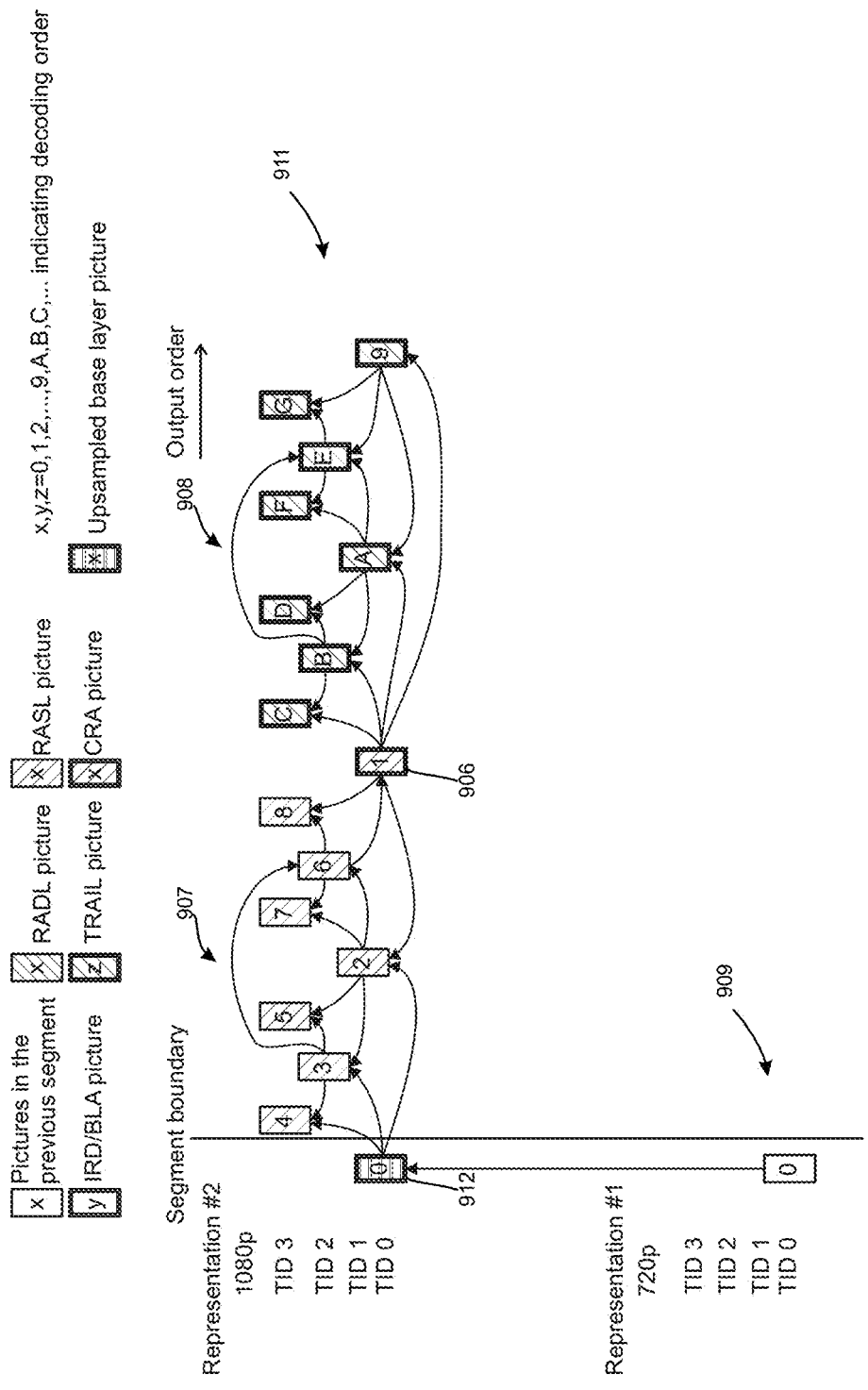
FIG. 9d illustrates an operation of the implicit reference picture resampling method during up-switching, in accordance with an embodiment.

The operation of the IRPR method during up-switching is illustrated in FIG. 9d. The player determines to switch from representation 1 (the low-resolution representation 909 in this example) to representation 2 (the high-resolution representation 911 in this example). Consequently, the player may request and receive the next segment (picture 1 onwards) from representation 2 rather than from representation 1. In order to avoid a glitch in the displayed picture rate, the player may wish to decode the RASL pictures 2 . . . 8. The challenge is that one (or more) of the reference pictures of the RASL pictures has (or have) not been received, and hence a standard H.265/HEVC decoder may not decode these RASL pictures successfully. In IRPR, the player upsamples the pictures of representation 1 that correspond to the reference picture(s) of the RASL pictures and uses the upsampled picture(s) as reference for prediction of RASL pictures. In the example, pictures 2 . . . 8 representation 2 uses the upsampled picture 0 of representation 1 (labelled as 912 in FIG. 9d) as the (direct or indirect) reference picture. The upsampling performed as part of the IRPR method changes the decoding process of H.265/HEVC.

In some other embodiments, the encoder may turn in-loop filtering, such as SAO, off selectively, e.g. for all the RASL pictures or the segment-initiating RASL pictures.

Embodiments have been described with reference to segments. It is to be understood that embodiments could be similarly described with reference to subsegments.

One benefit of the use of open GOPs rather than closed GOPs may be better compression efficiency, which for example means that the same picture quality can be achieved with less bitrate.

Figure 12:
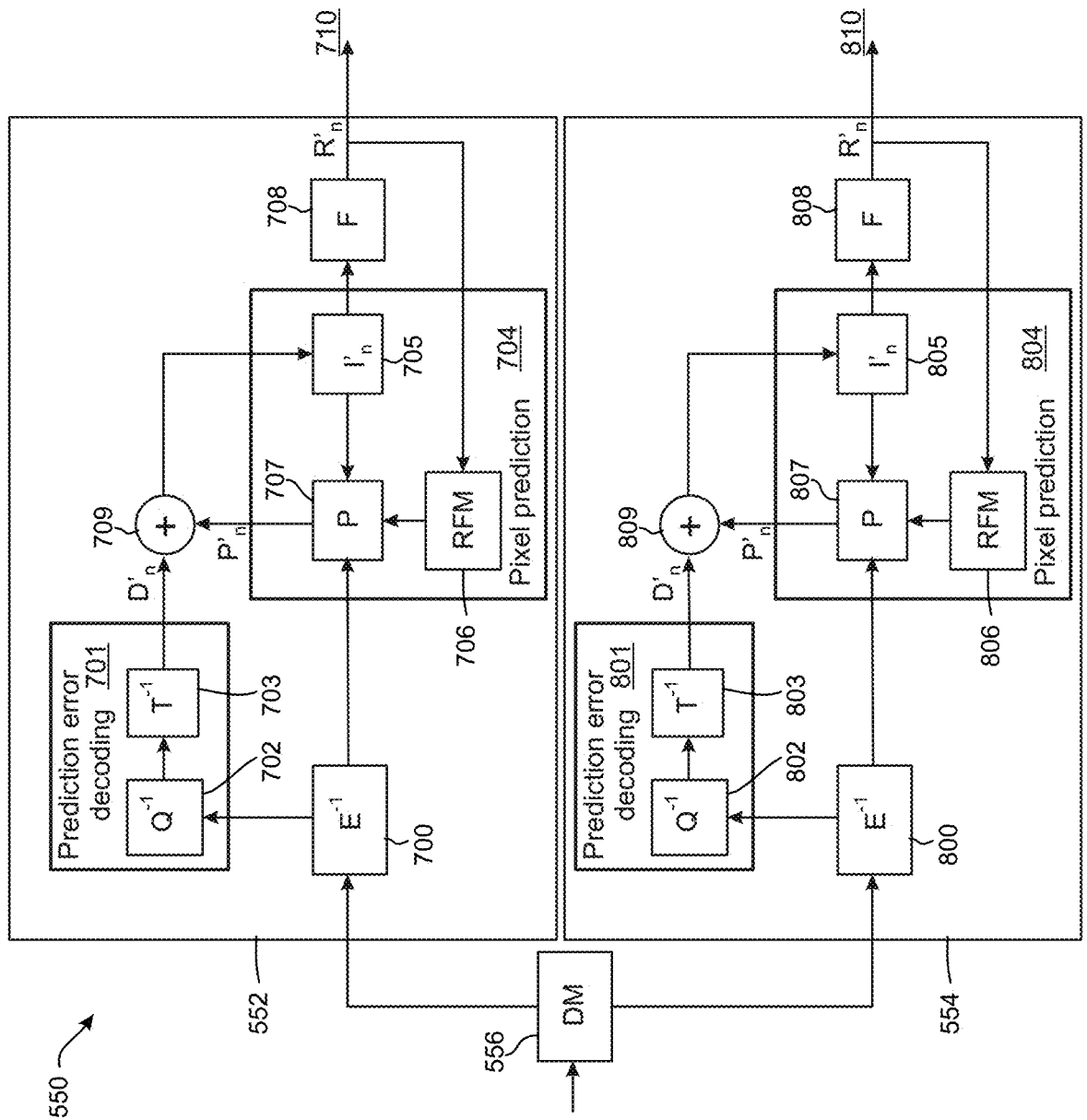
FIG. 12 shows a schematic diagram of a decoder suitable for implementing embodiments of the invention.

FIG. 12 shows a block diagram of a video decoder suitable for employing embodiments of the invention. FIG. 12 depicts a structure of a two-layer decoder, but it would be appreciated that the decoding operations may similarly be employed in a single-layer decoder.

The video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base view/non-base view components to obtain the preliminary reconstructed images (I'n). Preliminary reconstructed and filtered base view images may be output 709 from the first decoder section 552 and preliminary reconstructed and filtered base view images may be output 809 from the first decoder section 554.

Figure 13:
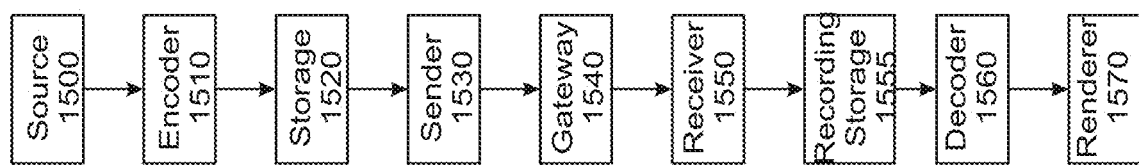
FIG. 13 shows a schematic diagram of an example multimedia communication system within which various embodiments may be implemented.

FIG. 13 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISO Base Media File Format, for encapsulation of the at least one of the contained media bitstream on the communication protocol.

The server 1540 may or may not be connected to a gateway 1550 through a communication network. The gateway may also or alternatively be referred to as a middle-box. It is noted that the system may generally comprise any number gateways or alike, but for the sake of simplicity, the following description only considers one gateway 1550. The gateway 1550 may perform different types of functions, such as caching packets, streams or resources, pre-fetching media data pro-actively, translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 1550 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes or other devices that forward broadcast transmissions locally to home wireless networks. When RTP is used, the gateway 1550 may be called an RTP mixer or an RTP translator and may act as an endpoint of an RTP connection. Instead of or in addition to the gateway 1550, the system may include a splicer which concatenates video sequence or bitstreams.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different bitstreams 901, 902, 909, 911 e.g. for bitrate adaptation, chroma format, sample bit depth, color gamut, and/or spatial resolution, and/or a sender 1540 and/or a gateway 1550 may be configured to select the transmitted bitstream. Switching between different bitstreams 901, 902, 909, 911 may take place for multiple reasons, such as to respond to requests of the receiver 1560 or prevailing conditions, such as throughput, of the network over which the bitstream is conveyed. A request from the receiver can be, e.g., a request for a Segment or a Subsegment from a different representation or bitstream than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different bitstreams 901, 902, 909, 911 e.g. for bitrate adaptation, chroma format, sample bit depth, color gamut, and/or spatial resolution, and/or a decoder 1580 may be configured to select the transmitted bitstream. Switching between different bitstreams 901, 902, 909, 911 may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 580 is multi-tasking and uses computing resources for other purposes than decoding the scalable video bitstream. In another example, faster decoding operation might be needed when content is played back at a faster pace than the normal playback speed, e.g. twice or three times faster than conventional real-time playback rate. The speed of decoder operation may be changed during the decoding or playback for example as response to changing from a fast-forward play from normal playback rate or vice versa, and consequently multiple layer up-switching and layer down-switching operations may take place in various orders.

In the above, some embodiments have been described in relation to terms representation and/or bitstream. It needs to be understood that embodiments may be similarly described in relation to similar terms, e.g. a representation instead of a bitstream, a bitstream instead of a representation, or an elementary stream instead of a bitstream or a representation.

In the above, some embodiments have been described in relation to skip pictures. A motivation of using skip pictures is to limit the processing requirements for an access unit. It needs to be understood that embodiments may be similarly realized by replacing the use of skip pictures with the use of any enhancement-layer IRAP pictures. In other words, some or all of the enhancement-layer IRAP pictures for the low-resolution representation in embodiments related to RARC may include coded prediction error information. That is, encoders may encode such enhancement-layer IRAP pictures so that they may include coded prediction error information, and decoders may decode such enhancement-layer IRAP pictures so that also the prediction error information is decoded.

In the above, some embodiments have been described in relation to a low-resolution representation or bitstream and to a high-resolution representation or bitstream, indicating the spatial resolution of the representations differ and consequently that resampling in terms of spatial resolution is used in the embodiments. It needs to be understood that in addition to or instead of differing spatial resolution, the representations may have other types of relation or relations and may require another type of resampling process or processes. For example the bit depth and/or color gamut of the representations may differ, and resampling similar to that used in SHVC color gamut scalability may be used in the embodiments. Embodiments are not limited to one type of resampling, but for example resampling in terms of spatial, bit-depth, and color gamut may be applied together. For example, in embodiments for RARC, skip pictures may be resampled in terms of spatial resolution, bit depth and color gamut e.g. using the SHVC inter-layer processing.

In the above, some embodiments have been described in relation to the low-resolution representation is coded using closed GOPs. A motivation of using closed GOPs in the low-resolution representation is to make representation down-switching operational at full picture rate without any changes to the standardized decoding process. However, it needs to be understood that embodiments could be similarly realized when the low-resolution representation is coded using open GOPs.

In the above, some embodiments have been described in relation to upsampling a picture of a low-resolution representation to switch to a high-resolution representation. It needs to be understood that embodiments can be similarly realized for downsampling a picture of a high-resolution representation to act as a reference picture for decoding of a low-resolution representation being switched to. For example, CRA pictures (or generally pictures of SAP Type 3) may be used in the low-resolution representation and hence decoding of RASL pictures associated with the initial CRA picture of a low-resolution representation being switched to may require reference pictures that precede, in decoding order, the CRA picture. These reference pictures may be generated by resampling respective pictures of the high-resolution representation. It also needs to be understood that embodiments can be similarly realized when the order of representations or layers is such that a higher representation or layer may require downsampling of a picture of a lower representation or layer to serve as a reference picture. In some cases, resampling to generate a reference picture may require operations along more than one scalability dimension or type. For example, a higher representation or layer may have larger spatial resolution but lower bit depth than a lower representation or layer and hence the use of a picture of the lower representation or layer as a reference picture for the higher representation or layer may require upsampling in terms of spatial resolution but downsampling or—scaling in terms of bit depth.

In the above, some embodiments have been described in relation to two representations or bitstreams or layers, such as a low-resolution representation or bitstream and to a high-resolution representation or bitstream. It needs to be understood that embodiments are not limited to two representations or bitstreams or layers, but apply equally to a greater number of representations or bitstreams or layers.

In the above, some embodiments have been described in relation to resampling a single picture for a representation switch point. It needs to be understood that embodiments are not limited to only one picture being resampled per a representation switch point but apply generally to any number of pictures being resampled. For example, in RARC more than one skip picture may be present for a switch point. The number of picture resampled may be determined by the number of the reference pictures that are required for decoding the RASL pictures of the switch point IRAP picture of the switch-to representation and precede in decoding order the switch point IRAP picture.

In the above, some embodiments have been described in relation to Segments. It needs to be understood that embodiments can similarly be realized in relation to Subsegments.

In the above, some embodiments have been described in relation to HTTP and/or HTTP GET requests. It needs to be understood that embodiments are not limited to the use of HTTP, but other protocols, such as WebSockets, may be used instead or additionally. It also needs to be understood that the invention may be applied in cases where no requests, such as HTTP GET, are made by a client, e.g. when a client receives data through a broadcast, such as a broadcast service according to 3GPP Multimedia Broadcast/Multicast Service (MBMS).

In the above, some embodiments have been described in relation to encoding indications, syntax elements, and/or syntax structures into a bitstream or into a coded video sequence and/or decoding indications, syntax elements, and/ or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

A method according to a first embodiment comprises
decoding a first part of a first coded video representation;
receiving and parsing information on decoding a second coded video representation,
wherein the coded second representation differs from the first coded video representation in one or more of the following: chroma format, sample bit depth, color gamut, spatial resolution, and the information indicates if the second coded video representation may be decoded using processed decoded pictures of the first coded video representation as reference pictures that may be used for prediction;
provided that the information indicates that the second coded video representation may be decoded using processed decoded pictures of the first coded video representation as a reference for prediction, the method further comprises:
processing one or more decoded pictures of the first part into one or more processed decoded pictures, wherein the processing comprises one or both of resampling and sample value scaling; and
decoding a second part of a second video representation using said one or more processed decoded pictures as reference pictures that may be used for prediction.

According to an embodiment, the method further comprises:
receiving a media presentation description comprising said information.

According to an embodiment, the method further comprises:
determining, on the basis of the media presentation description, a first identifier that identifies the first part of the first coded representation and a second identifier that identifies the second part of the second coded representation;
requesting the first part using the first identifier;
receiving the first part;
requesting the second part using the second identifier; and
receiving the second part.

According to an embodiment the first identifier and the second identifier are uniform resource identifiers.

According to an embodiment the spatial resolution of the first coded representation is determined for a reference region and the spatial resolution of the second coded representation is determined for a predicted region, wherein the method further comprises:
receiving information on the reference region, or in the absence of the information on the reference region;
determining the reference region to cover the entire area of pictures of the first coded video representation;
receiving information on the predicted region, or in the absence of the information on the predicted region; and
determining the predicted region to cover the entire area of pictures of the second coded video representation.

According to an embodiment said one or more processed decoded pictures have the same chroma format and bit depth as pictures of the second coded video representation.

According to an embodiment said one or more processed decoded pictures have the same spatial resolution as pictures of the second coded video representation.

According to an embodiment, the method further comprises:
receiving and parsing information that the second coded video representation belongs to a non-base layer and is independently decodable.

According to an embodiment, the method further comprises:
receiving and parsing information that the first part of the first coded representation and the second part of the second coded representation from a bitstream that conforms to a scalable video coding profile with limitations that access units comprise no more than two pictures and that, when an access unit comprises two pictures, the picture belonging to the higher layer is an intra random access point picture, which does not use earlier pictures in the same layer as a reference for prediction but may use a picture at the lower layer in the same access unit as a reference for prediction.

An apparatus according to a second embodiment comprises:
at least one processor and at least one memory, said at least one memory stored with code thereon, which when executed by said at least one processor, causes an apparatus to perform at least:
decode a first part of a first coded video representation;
receive and parse information on decoding a second coded video representation,
wherein the coded second representation differs from the first coded video representation in one or more of the following: chroma format, sample bit depth, color gamut, spatial resolution, and the information indicates if the second coded video representation may be decoded using processed decoded pictures of the first coded video representation as reference pictures that may be used for prediction;
provided that the information indicates that the second coded video representation may be decoded using processed decoded pictures of the first coded video representation as a reference for prediction, said code, which when executed by said at least one processor, further causes the apparatus to perform at least:
process one or more decoded pictures of the first part into one or more processed decoded pictures, wherein the processing comprises one or both of resampling and sample value scaling; and
decode a second part of a second video representation using said one or more processed decoded pictures as reference pictures that may be used for prediction.

According to an embodiment, the apparatus is further caused to perform:
receive a media presentation description comprising said information.

According to an embodiment, the apparatus is further caused to perform:
determine, on the basis of the media presentation description, a first identifier that identifies the first part of the first coded representation and a second identifier that identifies the second part of the second coded representation;
request the first part using the first identifier;
receive the first part;
request the second part using the second identifier; and
receive the second part.

According to an embodiment the first identifier and the second identifier are uniform resource identifiers.

According to an embodiment the spatial resolution of the first coded representation is determined for a reference region and the spatial resolution of the second coded representation is determined for a predicted region, wherein the apparatus is further caused to perform:

receive information on the reference region, or in the absence of the information on the reference region;

determine the reference region to cover the entire area of pictures of the first coded video representation;

receive information on the predicted region, or in the absence of the information on the predicted region; and determine the predicted region to cover the entire area of pictures of the second coded video representation.

According to an embodiment said one or more processed decoded pictures have the same chroma format and bit depth as pictures of the second coded video representation.

According to an embodiment said one or more processed decoded pictures have the same spatial resolution as pictures of the second coded video representation.

According to an embodiment, the apparatus is further caused to perform:

receive and parse information that the second coded video representation belongs to a non-base layer and is independently decodable.

According to an embodiment, the apparatus is further caused to perform:

receive and parse information that the first part of the first coded representation and the second part of the second coded representation from a bitstream that conforms to a scalable video coding profile with limitations that access units comprise no more than two pictures and that, when an access unit comprises two pictures, the picture belonging to the higher layer is an intra random access point picture, which does not use earlier pictures in the same layer as a reference for prediction but may use a picture at the lower layer in the same access unit as a reference for prediction.

According to a third embodiment there is provided a computer readable storage medium stored with code thereon for use by an apparatus, which when executed by a processor, causes the apparatus to perform:

decode a first part of a first coded video representation;

receive and parse information on decoding a second coded video representation, wherein the coded second representation differs from the first coded video representation in one or more of the following: chroma format, sample bit depth, color gamut, spatial resolution, and the information indicates if the second coded video representation may be decoded using processed decoded pictures of the first coded video representation as reference pictures that may be used for prediction;

provided that the information indicates that the second coded video representation may be decoded using processed decoded pictures of the first coded video representation as a reference for prediction, said code, which when executed by said at least one processor, further causes the apparatus to perform at least:

process one or more decoded pictures of the first part into one or more processed decoded pictures, wherein the processing comprises one or both of resampling and sample value scaling; and decode a second part of a second video representation using said one or more processed decoded pictures as reference pictures that may be used for prediction.

According to a fourth embodiment there is provided an apparatus comprising a video decoder configured for decoding a bitstream comprising an image sequence, the video decoder comprising means for decoding a first part of a first coded video representation;

means for receiving and parsing information on decoding a second coded video representation, wherein the coded second representation differs from the first coded video representation in one or more of the following: chroma format, sample bit depth, color gamut, spatial resolution, and the information indicates if the second coded video representation may be decoded using processed decoded pictures of the first coded video representation as reference pictures that may be used for prediction; wherein the apparatus further comprises:

means for processing one or more decoded pictures of the first part into one or more processed decoded pictures, provided that the information indicates that the second coded video representation may be decoded using processed decoded pictures of the first coded video representation as a reference for prediction, wherein the processing comprises one or both of resampling and sample value scaling; and means for decoding a second part of a second video representation using said one or more processed decoded pictures as reference pictures that may be used for prediction.

According to a fifth embodiment there is provided a video decoder configured for decoding a bitstream comprising an image sequence, wherein said video decoder is further configured for:

decoding a first part of a first coded video representation;

receiving and parsing information on decoding a second coded video representation, wherein the coded second representation differs from the first coded video representation in one or more of the following: chroma format, sample bit depth, color gamut, spatial resolution, and the information indicates if the second coded video representation may be decoded using processed decoded pictures of the first coded video representation as reference pictures that may be used for prediction;

provided that the information indicates that the second coded video representation may be decoded using processed decoded pictures of the first coded video representation as a reference for prediction, the method further comprises:

processing one or more decoded pictures of the first part into one or more processed decoded pictures, wherein the processing comprises one or both of resampling and sample value scaling; and decoding a second part of a second video representation using said one or more processed decoded pictures as reference pictures that may be used for prediction.

A method according to a sixth embodiment comprises:

parsing, from a media presentation description, metadata for at least two representations;

parsing, from the media presentation description, one or more characteristics for decoding a sequence of non-overlapping consecutive segments or subsegments of the at least two representations.

According to an embodiment, the one or more characteristics comprise any subset of the following:

Codecs or coding formats to which the sequence conforms;

A conformance point to which the sequence conforms;

An output layer set index which can be used as the target output layer set index when decoding the sequence;

A highest temporal sub-layer identifier which can be used when decoding the sequence;

Indication if access units of the sequence comprise one layer or two layers, where a picture of a higher layer of the two layers is an intra random access point picture;

Indication if access units of the sequence comprise one layer or two layers, where a picture of a higher layer of the two layers is an intra random access point picture that in which no prediction error is coded;

Layer identifier values included in the sequence;

Layer identifier values of necessary layers included in the sequence;

Layer identifier values of output layers included in the sequence;

Information on alternative output layers represented by the sequence;

Video parameter set(s) which may be activated when decoding the sequence;

Other parameter set(s), such as sequence parameter sets and/or picture parameter sets, which may be activated when decoding the sequence;

Scalability identifier values for the layers included in the sequence.

Information related to implicit reference picture resampling required or suggested for decoding the sequence.

According to an embodiment, the method further comprises parsing the one or more characteristics from a supplemental structure.

According to an embodiment, the method further comprises parsing one or both pieces of the following information in association with the one or more characteristics:

Information indicative of whether the one or more characteristics apply to a sequence of non-overlapping consecutive segments, a sequence of non-overlapping consecutive subsegments, or both.

Identification of the at least two representations among a set of representations.

A method according to an embodiment further comprising:

decoding a first part of a first video representation of at least two representations;

decoding a second video representation of the at least two representations;

wherein the decoded second representation differs from the first decoded video representation in one or more of the following: chroma format, sample bit depth, color gamut, spatial resolution, and the one or more characteristics indicate if the second coded video representation may be decoded using one or more processed decoded pictures of the first coded video representation as one or more reference pictures for prediction.

A method according to an embodiment the method further comprises:

decoding from the first video representation at least one intra random access point picture in an enhancement layer.

A method according to an embodiment the method further comprises:

associating a first track identifier of a container format with the at least one intra random access point picture in the enhancement layer;

associating the first track identifier of the container format with the second video representation.

An apparatus according to a seventh embodiment comprises:

at least one processor and at least one memory, said at least one memory stored with code thereon, which when executed by said at least one processor, causes an apparatus to perform at least:

parse, from a media presentation description, metadata for at least two representations;

parse, from the media presentation description, one or more characteristics for decoding a sequence of non-overlapping consecutive segments or subsegments of the at least two representations.

According to an embodiment of the apparatus, the one or more characteristics comprise any subset of the following:

Codecs or coding formats to which the sequence conforms;

A conformance point to which the sequence conforms;

An output layer set index which can be used as the target output layer set index when decoding the sequence;

A highest temporal sub-layer identifier which can be used when decoding the sequence;

Indication if access units of the sequence comprise one layer or two layers, where a picture of a higher layer of the two layers is an intra random access point picture;

Indication if access units of the sequence comprise one layer or two layers, where a picture of a higher layer of the two layers is an intra random access point picture that in which no prediction error is coded;

Layer identifier values included in the sequence;

Layer identifier values of necessary layers included in the sequence;

Layer identifier values of output layers included in the sequence;

Information on alternative output layers represented by the sequence;

Video parameter set(s) which may be activated when decoding the sequence;

Other parameter set(s), such as sequence parameter sets and/or picture parameter sets, which may be activated when decoding the sequence;

Scalability identifier values for the layers included in the sequence.

Information related to implicit reference picture resampling required or suggested for decoding the sequence.

According to an embodiment, the apparatus is further caused to perform:

parse the one or more characteristics from a supplemental structure.

According to an embodiment, the apparatus is further caused to perform:

parse one or both pieces of the following information in association with the one or more characteristics:

Information indicative of whether the one or more characteristics apply to a sequence of non-overlapping consecutive segments, a sequence of non-overlapping consecutive subsegments, or both.

Identification of the at least two representations among a set of representations.

According to an embodiment, the apparatus is further caused to perform:

decode a first part of a first video representation of at least two representations;

decode a second video representation of the at least two representations;

wherein the decoded second representation differs from the first decoded video representation in one or more of the following: chroma format, sample bit depth, color gamut, spatial resolution, and the one or more characteristics indicate if the second coded video representation may be decoded using one or more processed decoded pictures of the first coded video representation as one or more reference pictures for prediction.

According to an embodiment, the apparatus is further caused to perform:

decode from the first video representation at least one intra random access point picture in an enhancement layer.

According to an embodiment, the apparatus is further caused to perform:

associate a first track identifier of a container format with the at least one intra random access point picture in the enhancement layer;

associate the first track identifier of the container format with the second video representation.

According to an eighth embodiment there is provided a computer readable storage medium stored with code thereon for use by an apparatus, which when executed by a processor, causes the apparatus to perform:

parse, from a media presentation description, metadata for at least two representations;

parse, from the media presentation description, one or more characteristics for decoding a sequence of non-overlapping consecutive segments or subsegments of the at least two representations.

According to a ninth embodiment there is provided an apparatus comprising a video decoder configured for decoding a bitstream comprising an image sequence, the video decoder comprising means for parsing, from a media presentation description, metadata for at least two representations;

means for parsing, from the media presentation description, one or more characteristics for decoding a sequence of non-overlapping consecutive segments or subsegments of the at least two representations.

According to a tenth embodiment there is provided a video decoder configured for decoding a bitstream comprising an image sequence, wherein said video decoder is further configured for:

parsing, from a media presentation description, metadata for at least two representations;

parsing, from the media presentation description, one or more characteristics for decoding a sequence of non-overlapping consecutive segments or subsegments of the at least two representations.

A method according to an eleventh embodiment comprises:

providing, in a media presentation description, metadata for at least two representations;

providing, in the media presentation description, one or more characteristics for decoding a sequence of non-overlapping consecutive segments or subsegments of the at least two representations.

According to an embodiment, the one or more characteristics comprise any subset of the following:

Codecs or coding formats to which the sequence conforms;
A conformance point to which the sequence conforms;
An output layer set index which can be used as the target output layer set index when decoding the sequence;
A highest temporal sub-layer identifier which can be used when decoding the sequence;
Indication if access units of the sequence comprise one layer or two layers, where a picture of a higher layer of the two layers is an intra random access point picture;
Indication if access units of the sequence comprise one layer or two layers, where a picture of a higher layer of the two layers is an intra random access point picture that in which no prediction error is coded;
Layer identifier values included in the sequence;
Layer identifier values of necessary layers included in the sequence;
Layer identifier values of output layers included in the sequence;
Information on alternative output layers represented by the sequence;
Video parameter set(s) which may be activated when decoding the sequence;
Other parameter set(s), such as sequence parameter sets and/or picture parameter sets, which may be activated when decoding the sequence;
Scalability identifier values for the layers included in the sequence.
Information related to implicit reference picture resampling required or suggested for decoding the sequence.

According to an embodiment, the method further comprises:

providing the one or more characteristics in a supplemental structure that is not required to be parsed when parsing the media presentation description.

According to an embodiment, the method further comprises providing one or both pieces of the following information in association with the one or more characteristics:

Information indicative of whether the one or more characteristics apply to a sequence of non-overlapping consecutive segments, a sequence of non-overlapping consecutive subsegments, or both.
Identification of the at least two representations among a set of representations.

A method according to an embodiment further comprises:

encoding a first part of a first video representation of at least two representations;

encoding a second video representation of the at least two representations;

wherein the coded second representation differs from the first coded video representation in one or more of the following: chroma format, sample bit depth, color gamut, spatial resolution, and the information indicates if the second coded video representation may be decoded using processed decoded pictures of the first coded video representation as reference pictures that may be used for prediction.

A method according to an embodiment the method further comprises:

encoding into the first video representation at least one intra random access point picture in an enhancement layer.

A method according to an embodiment the method further comprises:

associating a first track identifier of a container format with the at least one intra random access point picture in the enhancement layer;

associating the first track identifier of the container format with the second video representation.

According to an embodiment, wherein:

the at least one intra random access point picture in an enhancement layer is a skip picture.

An apparatus according to a twelfth embodiment comprises:

at least one processor and at least one memory, said at least one memory stored with code thereon, which when executed by said at least one processor, causes an apparatus to perform at least:

provide, in a media presentation description, metadata for at least two representations;

provide, in the media presentation description, one or more characteristics for decoding a sequence of non-overlapping consecutive segments or subsegments of the at least two representations.

According to an embodiment, the one or more characteristics comprise any subset of the following:

Codecs or coding formats to which the sequence conforms;

A conformance point to which the sequence conforms;

An output layer set index which can be used as the target output layer set index when decoding the sequence;

A highest temporal sub-layer identifier which can be used when decoding the sequence;

Indication if access units of the sequence comprise one layer or two layers, where a picture of a higher layer of the two layers is an intra random access point picture;

Indication if access units of the sequence comprise one layer or two layers, where a picture of a higher layer of the two layers is an intra random access point picture that in which no prediction error is coded;

Layer identifier values included in the sequence;

Layer identifier values of necessary layers included in the sequence;

Layer identifier values of output layers included in the sequence;

Information on alternative output layers represented by the sequence;

Video parameter set(s) which may be activated when decoding the sequence;

Other parameter set(s), such as sequence parameter sets and/or picture parameter sets, which may be activated when decoding the sequence;

Scalability identifier values for the layers included in the sequence.

Information related to implicit reference picture resampling required or suggested for decoding the sequence.

According to an embodiment, the apparatus is further caused to perform:

provide the one or more characteristics in a supplemental structure that is not required to be parsed when parsing the media presentation description.

According to an embodiment, the apparatus is further caused to perform:

providing one or both pieces of the following information in association with the one or more characteristics:

Information indicative of whether the one or more characteristics apply to a sequence of non-overlapping consecutive segments, a sequence of non-overlapping consecutive subsegments, or both.

Identification of the at least two representations among a set of representations.

According to an embodiment, the apparatus is further caused to perform:

encode a first part of a first video representation of at least two representations;

encode a second video representation of the at least two representations; and wherein the coded second representation differs from the first coded video representation in one or more of the following: chroma format, sample bit depth, color gamut, spatial resolution, and the information indicates if the second coded video representation may be decoded using processed decoded pictures of the first coded video representation as reference pictures that may be used for prediction.

According to an embodiment, the apparatus is further caused to perform:

encode into the first video representation at least one intra random access point picture in an enhancement layer.

According to an embodiment, the apparatus is further caused to perform:

associate a first track identifier of a container format with the at least one intra random access point picture in the enhancement layer;

associate the first track identifier of the container format with the second video representation.

According to an embodiment, the at least one intra random access point picture in an enhancement layer is a skip picture.

According to a thirteenth embodiment there is provided a computer readable storage medium stored with code thereon for use by an apparatus, which when executed by a processor, causes the apparatus to perform:

provide, in a media presentation description, metadata for at least two representations;

provide, in the media presentation description, one or more characteristics for decoding a sequence of non-overlapping consecutive segments or subsegments of the at least two representations.

According to an embodiment, the one or more characteristics comprise any subset of the following:

Codecs or coding formats to which the sequence conforms;

A conformance point to which the sequence conforms;

An output layer set index which can be used as the target output layer set index when decoding the sequence;

A highest temporal sub-layer identifier which can be used when decoding the sequence;

Indication if access units of the sequence comprise one layer or two layers, where a picture of a higher layer of the two layers is an intra random access point picture;

Indication if access units of the sequence comprise one layer or two layers, where a picture of a higher layer of the two layers is an intra random access point picture that in which no prediction error is coded;

Layer identifier values included in the sequence;

Layer identifier values of necessary layers included in the sequence;

Layer identifier values of output layers included in the sequence;

Information on alternative output layers represented by the sequence;

Video parameter set(s) which may be activated when decoding the sequence;

Other parameter set(s), such as sequence parameter sets and/or picture parameter sets, which may be activated when decoding the sequence;

Scalability identifier values for the layers included in the sequence.

Information related to implicit reference picture resampling required or suggested for decoding the sequence.

According to an embodiment, the apparatus is further caused to perform:

provide the one or more characteristics in a supplemental structure that is not required to be parsed when parsing the media presentation description.

According to an embodiment, the apparatus is further caused to perform:

providing one or both pieces of the following information in association with the one or more characteristics:

Information indicative of whether the one or more characteristics apply to a sequence of non-overlapping consecutive segments, a sequence of non-overlapping consecutive subsegments, or both.

Identification of the at least two representations among a set of representations.

According to an embodiment, the apparatus is further caused to perform:

encode a first part of a first video representation of at least two representations;

encode a second video representation of the at least two representations; and wherein the coded second representation differs from the first coded video representation in one or more of the following: chroma format, sample bit depth, color gamut, spatial resolution, and the information indicates if the second coded video representation may be decoded using processed decoded pictures of the first coded video representation as reference pictures that may be used for prediction.

According to an embodiment, the apparatus is further caused to perform:

encode into the first video representation at least one intra random access point picture in an enhancement layer.

According to an embodiment, the apparatus is further caused to perform:

associate a first track identifier of a container format with the at least one intra random access point picture in the enhancement layer;

associate the first track identifier of the container format with the second video representation.

According to an embodiment, the at least one intra random access point picture in an enhancement layer is a skip picture.

According to a fourteenth embodiment there is provided an apparatus comprising a video encoder configured for encoding a bitstream comprising an image sequence, the video encoder comprising means for providing, in a media presentation description, metadata for at least two representations;

means for provide, in the media presentation description, one or more characteristics for decoding a sequence of non-overlapping consecutive segments or subsegments of the at least two representations.

According to a fifteenth embodiment there is provided a video encoder configured for decoding a bitstream comprising an image sequence, wherein said video encoder is further configured for:

providing, in a media presentation description, metadata for at least two representations;

providing, in the media presentation description, one or more characteristics for decoding a sequence of non-overlapping consecutive segments or subsegments of the at least two representations.

A method according to a sixteenth embodiment comprises receiving a bitstream comprising picture data units as a first representation;

determining to discontinue transmission of the first representation at a first switching point;

transmitting picture data units on the first representation up to the first switching point, said picture data units including at least one data unit suitable for using as a reference for prediction when decoding a second part of a second video representation after said first switching point.

According to a seventeenth embodiment there is provided an apparatus comprising:

at least one processor and at least one memory, said at least one memory stored with code thereon, which when executed by said at least one processor, causes an apparatus to perform at least:

receive a bitstream comprising picture data units as a first representation;

determine to discontinue transmission of the first representation at a first switching point;

transmit picture data units on the first representation up to the first switching point, said picture data units including at least one data unit suitable for using as a reference for prediction when decoding a second part of a second video representation after said first switching point.

According to an eighteenth embodiment there is provided a computer readable storage medium stored with code thereon for use by an apparatus, which when executed by a processor, causes the apparatus to perform:

receive a bitstream comprising picture data units as a first representation;

determine to discontinue transmission of the first representation at a first switching point;

transmit picture data units on the first representation up to the first switching point, said picture data units including at least one data unit suitable for using as a reference for prediction when decoding a second part of a second video representation after said first switching point.

That which is claimed is:

1. A method comprising:
    decoding a first set of pictures of a first coded video representation;
    processing one or more decoded pictures of the first set of pictures of the first coded video representation into one or more processed decoded pictures of the first coded video representation, wherein the processing comprises one or both of resampling and sample value scaling of the first set of pictures of the first coded video representation;
    receiving and parsing information on decoding pictures of a second coded video representation,
    wherein the second coded video representation differs from the first coded video representation in one or more of the following: chroma format, sample bit depth, color gamut, or spatial resolution, and the information indicates if the second coded video representation is decodable using said one or more processed decoded pictures of the first coded video representation as reference pictures for prediction;
    provided that the information on decoding pictures of the second coded video representation indicates that the second coded video representation is decodable using the processed decoded pictures of the first coded video representation as reference pictures for prediction, the method further comprises:
    switching to decode the second coded video representation starting from a second set of pictures of the second coded video representation, the second set following the first set of the first coded video representation in picture output order; and
    decoding at least the second set of pictures of the second video representation using said one or more processed decoded pictures of the first coded video representation as reference pictures for prediction.

2. The method according to claim 1 further comprising:
    receiving a media presentation description comprising said information.

3. The method according to claim 2 further comprising:
  determining, on the basis of the media presentation description, a first identifier that identifies the first set of pictures of the first coded video representation and a second identifier that identifies the second set of pictures of the second coded video representation;
  requesting the first set using the first identifier;
  receiving the first set;
  requesting the second set using the second identifier; and
  receiving the second set.

4. The method according to claim 1, wherein the spatial resolution of the first coded representation is determined for a reference region and the spatial resolution of the second coded representation is determined for a predicted region, wherein the method further comprises:
  receiving information on the reference region, or if information on the reference region is not received,
  determining that the reference region is an entire area of a picture of the first coded video representation;
  receiving information on the predicted region, or if information on the predicted region is not received, and
  determining that the predicted region is an entire area of a picture of the second coded video representation.

5. The method according to claim 1, wherein said one or more processed decoded pictures have at least one of the following: the same chroma format; the same bit depth; or the same spatial resolution as pictures of the second coded video representation.

6. The method according to claim 1 further comprising:
  receiving and parsing information that the first set of pictures of the first coded video representation and the second set of pictures of the second coded video representation form a bitstream that conforms to a scalable video coding profile with limitations that access units comprise no more than two pictures and that, when an access unit comprises two pictures, the picture belonging to the higher layer is an intra random access point picture, which does not use earlier pictures in the same layer as a reference for prediction but may use a picture at the lower layer in the same access unit as a reference for prediction.

7. A method according to claim 1, wherein the processed decoded pictures comprise skip-coded instantaneous random access pictures (IRAP pictures) encapsulated in segments of the first coded video representation, and wherein the skip-coded IRAP pictures are associated with reference pictures of random access skipped leading (RASL) pictures that precede associated clean random access (CRA) pictures in decoding order.

8. A method according to claim 7 wherein the skip-coded IRAP pictures are associated only with CRA pictures that start a segment or sub-segment.

9. An apparatus comprising at least one processor and at least one memory, said at least one memory stored with code thereon, which when executed by said at least one processor, causes an apparatus to perform at least:
  decode a first set of pictures of a first coded video representation;
  process one or more decoded pictures of the first set of pictures of the first coded video representation into one or more processed decoded pictures of the first coded video representation by one or both of resampling and sample value scaling of the first set of pictures of the first coded video representation;
  receive and parse information on decoding a second coded video representation,
  wherein the second coded video representation differs from the first coded video representation in one or more of the following: chroma format, sample bit depth, color gamut, or spatial resolution, and the information indicates if the second coded video representation is decodable using said one or more processed decoded pictures of the first coded video representation as reference pictures for prediction;
  provided that the information on decoding pictures of the second coded video representation indicates that the second coded video representation is decodable using the processed decoded pictures of the first coded video representation as reference pictures for prediction, said code, which when executed by said at least one processor, further causes the apparatus to perform at least:
  switch to decode the second coded video representation starting from a second set of pictures of the second coded video representation, the second set following the first set of the first coded video representation in picture output order; and
  decode at least the second set of pictures of the second video representation using said one or more processed decoded pictures of the first coded video representation as reference pictures for prediction.

10. The apparatus according to claim 9, wherein the apparatus is further caused to perform:
  receive a media presentation description comprising said information.

11. The apparatus according to claim 10, wherein the apparatus is further caused to perform:
  determine, on the basis of the media presentation description, a first identifier that identifies the first set of pictures of the first coded video representation and a second identifier that identifies the second set of pictures of the second coded video representation;
  request the first set using the first identifier;
  receive the first set;
  request the second set using the second identifier; and
  receive the second set.

12. An apparatus according to claim 9, wherein the processed decoded pictures comprise skip-coded instantaneous random access pictures (IRAP pictures) encapsulated in segments of the first coded video representation, and wherein the skip-coded IRAP pictures are associated with reference pictures of random access skipped leading (RASL) pictures that precede associated clean random access (CRA) pictures in decoding order.

13. An apparatus according to claim 12 wherein the skip-coded IRAP pictures are associated only with CRA pictures that start a segment or sub-segment.

14. A computer readable storage medium comprising a physical, magnetic or optical medium stored with code thereon for use by an apparatus, which when executed by a processor, causes the apparatus to perform:
  decode a first set of pictures of a first coded video representation;
  process one or more decoded pictures of the first set of pictures of the first coded video representation into one or more processed decoded pictures of the first coded video representation by one or both of resampling and sample value scaling of the first set of pictures of the first coded video representation;
  receive and parse information on decoding pictures of a second coded video representation,
  wherein the second coded video representation differs from the first coded video representation in one or more of the following: chroma format, sample bit depth, color gamut, or spatial resolution, and the information indicates if the second coded video representation is decodable using said one or more processed decoded pictures of the first coded video representation as reference pictures for prediction;

provided that the information on decoding pictures of the second coded video representation indicates that the second coded video representation is decodable using the processed decoded pictures of the first coded video representation as reference pictures for prediction, said code, which when executed by said at least one processor, further causes the apparatus to perform at least:

switch to decode the second coded video representation starting from a second set of pictures of the second coded video representation, the second set following the first set of the first coded video representation in picture output order; and decode a second set of a second video representation using said one or more processed decoded pictures of the first coded video representation as reference pictures for prediction.

15. A computer readable storage medium according to claim 14, wherein the processed decoded pictures comprise skip-coded instantaneous random access pictures (IRAP pictures) encapsulated in segments of the first coded video representation, and wherein the skip-coded IRAP pictures are associated with reference pictures of random access skipped leading (RASL) pictures that precede associated clean random access (CRA) pictures in decoding order.

16. A computer readable storage medium according to claim 15 wherein the skip-coded IRAP pictures are associated only with CRA pictures that start a segment or sub-segment.

17. An apparatus comprising a video decoder configured for decoding a bitstream comprising an image sequence, the video decoder comprising means for decoding a first set of pictures of a first coded video representation;

means for processing one or more decoded pictures of the first set of pictures of the first coded video representation into one or more processed decoded pictures of the first coded video representation by one or both of resampling and sample value scaling of the first set of pictures of the first coded video representation;

means for receiving and parsing information on decoding a second coded video representation, wherein the second coded video representation differs from the first coded video representation in one or more of the following: chroma format, sample bit depth, color gamut, or spatial resolution, and the information indicates if the second coded video representation is decodable using said one or more processed decoded pictures of the first coded video representation as reference pictures for prediction;

means for switching to the second coded video representation starting from a second set of pictures of the second coded video representation, the second set following the set of the first coded video representation in picture output order provided that the information indicates that the second coded video representation is decodable using the processed decoded pictures of the first coded video representation as reference pictures for prediction; and means for decoding at least the second set of pictures of the second video representation using said one or more processed decoded pictures of the first coded video representation as reference pictures for prediction.

18. An apparatus according to claim 17, wherein the processed decoded pictures comprise skip-coded instantaneous random access pictures (IRAP pictures) encapsulated in segments of the first coded video representation, and wherein the skip-coded IRAP pictures are associated with reference pictures of random access skipped leading (RASL) pictures that precede associated clean random access (CRA) pictures in decoding order.

19. A video decoder configured for decoding a bitstream comprising an image sequence, wherein said video decoder is further configured for:

decoding a first set of pictures of a first coded video representation;

processing one or more decoded pictures of the first set of pictures of the first coded video representation into one or more processed decoded pictures of the first coded video representation, wherein the processing comprises one or both of resampling and sample value scaling of the first set of pictures of the first coded video representation;

receiving and parsing information on decoding a second coded video representation, wherein the second coded video representation differs from the first coded video representation in one or more of the following: chroma format, sample bit depth, color gamut, or spatial resolution, and the information indicates if the second coded video representation is decodable using said one or more processed decoded pictures of the first coded video representation as reference pictures for prediction;

provided that the information indicates that the second coded video representation is decodable using the processed decoded pictures of the first coded video representation as reference pictures for prediction, the method further comprises:

switching to decode the second coded video representation starting from a second set of pictures of the second coded video representation, the second set following the first set of the first coded video representation in picture output order; and decoding at least the second set of pictures of the second video representation using said one or more processed decoded pictures of the first coded video representation as reference pictures for prediction.

20. A video decoder according to claim 19 wherein the processed decoded pictures comprise skip-coded instantaneous random access pictures (IRAP pictures) encapsulated in segments of the first coded video representation, and wherein the skip-coded IRAP pictures are associated only with CRA pictures that start a segment or sub-segment.

21. A method according to claim 1 wherein decoding the first set of pictures comprises decoding the first set of pictures of the first coded video representation including an intra random access point picture, wherein the information indicates if the second coded video representation is decodable using skip-coded intra random access point pictures encoded in the first coded video representation and containing information to be used as reference pictures for prediction in decoding the second coded video presentation, wherein the method further comprises decoding the skip-coded intra random access point picture from the first coded video representation to be used as a reference picture for prediction in decoding the second coded video presentation provided that the information on decoding pictures of the second coded video representation indicates that the second coded video representation is decodable using said skip-coded intra random access point picture as a reference picture for prediction, and wherein decoding at least the second set of pictures comprises decoding at least the second set of pictures of the second video representation using said decoded skip-coded intra random access point pictures as a reference picture for prediction.

22. A method according to claim 1 wherein decoding the first set of pictures comprises decoding the first set of pictures of the first coded video representation including an intra random access point picture, a random access skipped leading picture and a clean random access picture, wherein the information indicates if the second coded video representation is decodable using skip-coded intra random access point pictures created for a reference picture of the random access skipped leading picture that precedes the associated clean random access picture in decoding order to be used as a reference picture for prediction in decoding the second coded video presentation, wherein the method further comprises decoding the skip-coded intra random access point picture from the first coded video representation to be used as a reference picture for prediction in decoding the second coded video presentation provided that the information on decoding pictures of the second coded video representation indicates that the second coded video representation is decodable using said skip-coded intra random access point picture as a reference picture for prediction, and wherein decoding at least the second set of pictures comprises decoding at least the second set of pictures of the second video representation using said decoded skip-coded intra random access point pictures as a reference picture for prediction.

23. An apparatus according to claim 9 wherein the apparatus is caused to decode the first set of pictures by decoding the first set of pictures of the first coded video representation including an intra random access point picture, wherein the information indicates if the second coded video representation is decodable using skip-coded intra random access point pictures encoded in the first coded video representation and containing information to be used as reference pictures for prediction in decoding the second coded video presentation, wherein the apparatus is further caused to decode the skip-coded intra random access point picture from the first coded video representation to be used as a reference picture for prediction in decoding the second coded video presentation provided that the information on decoding pictures of the second coded video representation indicates that the second coded video representation is decodable using said skip-coded intra random access point picture as a reference picture for prediction, and wherein the apparatus is caused to decode at least the second set of pictures by decoding at least the second set of pictures of the second video representation using said decoded skip-coded intra random access point pictures as a reference picture for prediction.

24. An apparatus according to claim 9 wherein the apparatus is caused to decode the first set of pictures by decoding the first set of pictures of the first coded video representation including an intra random access point picture, a random access skipped leading picture and a clean random access picture, wherein the information indicates if the second coded video representation is decodable using skip-coded intra random access point pictures created for a reference picture of the random access skipped leading picture that precedes the associated clean random access picture in decoding order to be used as a reference picture for prediction in decoding the second coded video presentation, wherein the apparatus is further caused to decode the skip-coded intra random access point picture from the first coded video representation to be used as a reference picture for prediction in decoding the second coded video presentation provided that the information on decoding pictures of the second coded video representation indicates that the second coded video representation is decodable using said skip-coded intra random access point picture as a reference picture for prediction, and wherein the apparatus is caused to decode at least the second set of pictures by decoding at least the second set of pictures of the second video representation using said decoded skip-coded intra random access point pictures as a reference picture for prediction.

25. A computer readable storage medium according to claim 14 wherein the code, when executed by said at least one processor, causes the apparatus to decode the first set of pictures by decoding the first set of pictures of the first coded video representation including an intra random access point picture, wherein the information indicates if the second coded video representation is decodable using skip-coded intra random access point pictures encoded in the first coded video representation and containing information to be used as reference pictures for prediction in decoding the second coded video presentation, wherein the code, when executed by said at least one processor, further causes the apparatus to decode the skip-coded intra random access point picture from the first coded video representation to be used as a reference picture for prediction in decoding the second coded video presentation provided that the information on decoding pictures of the second coded video representation indicates that the second coded video representation is decodable using said skip-coded intra random access point picture as a reference picture for prediction, and wherein the code, when executed by said at least one processor, causes the apparatus to decode at least the second set of pictures by decoding at least the second set of pictures of the second video representation using said decoded skip-coded intra random access point pictures as a reference picture for prediction.

26. A computer readable storage medium according to claim 14 wherein the code, when executed by said at least one processor, causes the apparatus to decode the first set of pictures by decoding the first set of pictures of the first coded video representation including an intra random access point picture, a random access skipped leading picture and a clean random access picture, wherein the information indicates if the second coded video representation is decodable using skip-coded intra random access point pictures created for a reference picture of the random access skipped leading picture that precedes the associated clean random access picture in decoding order to be used as a reference picture for prediction in decoding the second coded video presentation, wherein the code, when executed by said at least one processor, further causes the apparatus to decode the skip-coded intra random access point picture from the first coded video representation to be used as a reference picture for prediction in decoding the second coded video presentation provided that the information on decoding pictures of the second coded video representation indicates that the second coded video representation is decodable using said skip-coded intra random access point picture as a reference picture for prediction, and wherein the code, when executed by said at least one processor, causes the apparatus to decode at least the second set of pictures by decoding at least the second set of pictures of the second video representation using said decoded skip-coded intra random access point pictures as a reference picture for prediction.

27. An apparatus according to claim 17 wherein the means for decoding the first set of pictures comprises means for decoding the first set of pictures of the first coded video representation including an intra random access point picture, wherein the information indicates if the second coded video representation is decodable using skip-coded intra random access point pictures encoded in the first coded video representation and containing information to be used as reference pictures for prediction in decoding the second coded video presentation, wherein the apparatus further comprises means for decoding the skip-coded intra random access point picture from the first coded video representation to be used as a reference picture for prediction in decoding the second coded video presentation provided that the information on decoding pictures of the second coded video representation indicates that the second coded video representation is decodable using said skip-coded intra random access point picture as a reference picture for prediction, and wherein the means for decoding at least the second set of pictures comprises means for decoding at least the second set of pictures of the second video representation using said decoded skip-coded intra random access point pictures as a reference picture for prediction.

28. An apparatus according to claim 17 wherein the means for decoding the first set of pictures comprises means for decoding the first set of pictures of the first coded video representation including an intra random access point picture, a random access skipped leading picture and a clean random access picture, wherein the information indicates if the second coded video representation is decodable using skip-coded intra random access point pictures created for a reference picture of the random access skipped leading picture that precedes the associated clean random access picture in decoding order to be used as a reference picture for prediction in decoding the second coded video presentation, wherein the apparatus further comprises means for decoding the skip-coded intra random access point picture from the first coded video representation to be used as a reference picture for prediction in decoding the second coded video presentation provided that the information on decoding pictures of the second coded video representation indicates that the second coded video representation is decodable using said skip-coded intra random access point picture as a reference picture for prediction, and wherein the means for decoding at least the second set of pictures comprises means for decoding at least the second set of pictures of the second video representation using said decoded skip-coded intra random access point pictures as a reference picture for prediction.

29. A video decoder according to claim 19 wherein the video decoder being configured to decode the first set of pictures comprises the video decoder being configured to decode the first set of pictures of the first coded video representation including an intra random access point picture, wherein the information indicates if the second coded video representation is decodable using skip-coded intra random access point pictures encoded in the first coded video representation and containing information to be used as reference pictures for prediction in decoding the second coded video presentation, wherein the video decoder is further configured to decode the skip-coded intra random access point picture from the first coded video representation to be used as a reference picture for prediction in decoding the second coded video presentation provided that the information on decoding pictures of the second coded video representation indicates that the second coded video representation is decodable using said skip-coded intra random access point picture as a reference picture for prediction, and wherein the video decoder being configured to decode at least the second set of pictures comprises the video decoder being configured to decode at least the second set of pictures of the second video representation using said decoded skip-coded intra random access point pictures as a reference picture for prediction.

30. A video decoder according to claim 19 wherein the video decoder being configured to decode the first set of pictures comprises the video decoder being configured to decode the first set of pictures of the first coded video representation including an intra random access point picture, a random access skipped leading picture and a clean random access picture, wherein the information indicates if the second coded video representation is decodable using skip-coded intra random access point pictures created for a reference picture of the random access skipped leading picture that precedes the associated clean random access picture in decoding order to be used as a reference picture for prediction in decoding the second coded video presentation, wherein the video decoder is configured to decode the skip-coded intra random access point picture from the first coded video representation to be used as a reference picture for prediction in decoding the second coded video presentation provided that the information on decoding pictures of the second coded video representation indicates that the second coded video representation is decodable using said skip-coded intra random access point picture as a reference picture for prediction, and wherein the video decoder being configured to decode at least the second set of pictures comprises the video decoder being configured to decode at least the second set of pictures of the second video representation using said decoded skip-coded intra random access point pictures as a reference picture for prediction.

\* \* \* \* \*